US012590113B2

(12) United States Patent
Kruger et al.

(10) Patent No.: US 12,590,113 B2
(45) Date of Patent: Mar. 31, 2026

(54) CONTINUOUS PROCESSING OF LIGNIN FOR REDUCED SOLVENT USAGE IN REDUCTIVE CATALYTIC FRACTIONATION

(71) Applicants: Alliance for Energy Innovation, LLC, Golden, CO (US); Massachusetts Institute of Technology, Cambridge, MA (US)

(72) Inventors: Jacob S. Kruger, Arvada, CO (US); Gregg Tyler Beckham, Golden, CO (US); David Gregory Brandner, Golden, CO (US); Andrew Wolf Bartling, Golden, CO (US); Yuriy Román, Cambridge, MA (US); Jun Hee Jang, Lakewood, CO (US); Nicholas Earl Thornburg, Denver, CO (US); Gregory George Facas, Moorestown, NJ (US)

(73) Assignees: Alliance for Energy Innovation, LLC, Golden, CO (US); Massachusetts Institute of Technology, Cambridge, MA (US)

( * ) Notice: Subject to any disclaimer, the term of this patent is extended or adjusted under 35 U.S.C. 154(b) by 824 days.

(21) Appl. No.: 17/842,062

(22) Filed: Jun. 16, 2022

(65) Prior Publication Data

US 2022/0411454 A1 Dec. 29, 2022

Related U.S. Application Data

(60) Provisional application No. 63/211,238, filed on Jun. 16, 2021.

(51) Int. Cl.
*C07G 1/00* (2011.01)
*B01J 8/02* (2006.01)
(Continued)

(52) U.S. Cl.
CPC .............. *C07G 1/00* (2013.01); *B01J 8/0278* (2013.01); *B01J 21/18* (2013.01); *B01J 23/755* (2013.01)

(58) Field of Classification Search
CPC . C07G 1/00; B01J 8/0278; B01J 21/18; B01J 23/755
(Continued)

(56) References Cited

FOREIGN PATENT DOCUMENTS

| | | | | |
|---|---|---|---|---|
| JP | 2004083482 A | * | 3/2004 | |
| WO | WO-2019108959 A1 | * | 6/2019 | ......... B01D 11/0219 |
| WO | WO-2020002361 A1 | * | 1/2020 | .......... B01J 19/0013 |

OTHER PUBLICATIONS

Yamada et al., JP 2004-083482 A machine translation in English, Mar. 18, 2004. (Year: 2004).*

(Continued)

*Primary Examiner* — David T Karst
(74) *Attorney, Agent, or Firm* — Neal S. Vickery

(57) ABSTRACT

Described herein are devices and methods for the efficient and economic generation of lignin monomers from biomass. The provided devices and methods utilize reductive catalytic fractionation with an organic solvent to extract high-quality lignin from biomass and cleave specific lignin bonds to generate valuable lignin monomers with a relatively narrow product slate. Advantageously, the devices and methods described herein utilize solvent recycling, multiple solvolysis chambers with multiple biomass beds and/or physical agitation (e.g., use of a screw extruder) to reduce the amount of solvent required and increase economic efficiency and monomer yield.

13 Claims, 30 Drawing Sheets

(51) Int. Cl.
*B01J 21/18* (2006.01)
*B01J 23/755* (2006.01)

(58) Field of Classification Search
USPC .......................................................... 530/507
See application file for complete search history.

(56) References Cited

OTHER PUBLICATIONS

Abu-Omar et al., "Guidelines for performing lignin-first biorefining", Energy & Environmental Science, 2021, vol. 14, pp. 262-292.
Anderson et al., "Flowthrough Reductive Catalytic Fractionation of Biomass", Joule, Nov. 2017, vol. 1, No. 3, pp. 613-622.
Anderson et al., "Kinetic Studies of Lignin Solvolysis and Reduction by Reductive Catalytic Fractionation Decoupled in Flow-Through Reactors", ACS Sustainable Chemistry & Engineering, 2018, vol. 6, pp. 7951-7959.
Bartling et al., "Techno-economic analysis and life cycle assessment of a biorefinery utilizing reductive catalytic fractionation", Energy & Environmental Science, 2008, vol. 14, No. 8, pp. 4147-4168.
Brandner et al., "Flow-through solvolysis enables production of native-like lignin from biomass", Green Chemistry, 2021, vol. 23, No. 15, pp. 5437-5441.
Cooreman et al., "Perspective on Overcoming Scale-Up Hurdles for the Reductive Catalytic Fractionation of Lignocellulose Biomass", Industrial Research & Engineering Chemistry Research, 2020, vol. 59, No. 39, pp. 17035-17045.
Corona et al., "Life cycle assessment of adipic acid production from lignin", Green Chemistry, 2018, vol. 20, pp. 3857-3866.
Davis et al., "Process Design and Economics for the Conversion of Lignocellulosic Biomass to Hydrocarbons: Dilute-Acid Prehydrolysis and Enzymatic Hydrolysis Deconstruction of Biomass to Sugars and Biological Conversion of Sugars to Hydrocarbons", NREL Technical Report NREL/TP-5100-60223, Oct. 2013, pp. 1-147.
Huang et al., "Reductive fractionation of woody biomass into lignin monomers and cellulose by tandem metal triflate and Pd/C catalysis", Green Chemistry, 2017, vol. 19, No. 1, pp. 175-187.
Kumaniaev et al., "Lignin depolymerization to monophenolic compounds in a flow-through system", Green Chemistry, 2017, vol. 19, No. 24, pp. 5767-5771.
Lan et al., "Continuous hydrogenolysis of acetal-stabilized lignin in flow", Green Chemistry, 2021, vol. 23, No. 1, pp. 320-327.
Liao et al., "A sustainable wood biorefinery for low-carbon footprint chemicals production", Science, Feb. 2020, vol. 367, No. 6484, pp. 1385-1390.
Mansfield et al., "Whole plant cell wall characterization using solution-state 2D NMR", Nature Protocols, 2012, vol. 7, No. 9, pp. 1579-1589.
Muurinen, "Organosolv Pulping: A review and distillation study related to peroxyacid pulping", Academic Dissertation to be presented with the assent of the Faculty of Technology, University of Oulu, May 2000, pp. 1-314.
Ouyang et al., "Coupling organosolv fractionation and reductive depolymerization of woody biomass in a two-step catalytic process", Green Chemistry, 2018, vol. 20, No. 10, pp. 2308-2319.
Van Den Bosch et al., "Reductive lignocellulose fractionation into soluble lignin-derived phenolic monomers and dimers and processable carbohydrate pulps", Energy & Environmental Science, 2015, vol. 8, pp. 1748-1763.
Van Den Bosch et al., "Integrating lignin valorization and bioethanol production: on the role of Ni—Al2O3 catalyst pellets during lignin-first fractionation", Green Chemistry, 2017, vol. 19, pages pp. 3313-3326.
Questell-Santiago et al., "Stabilization strategies in biomass depolymerization using chemical functionalization", Nature Reviews Chemistry, Jun. 2020, vol. 4, pp. 311-330.
Rinaldi et al., "Paving the Way for Lignin Valorisation: Recent Advances in Bioengineering, Biorefining and Catalysis", Angewandte Chemie—International Edition, Jul. 2016, vol. 55, No. 29, pp. 8164-8215.
Schutyser et al., "Chemicals from lignin: an interplay of lignocellulose fractionation, depolymerisation, and upgrading", Chemical Society Reviews, 2018, vol. 47, No. 3, pp. 852-908.
Shuai et al., "Formaldehyde stabilization facilitates lignin monomer production during biomass depolymerization", Science, Oct. 2016, vol. 354, No. 6310, pp. 329-333.
Tschulkow et al., "Integrated techno-economic assessment of a biorefinery process: The high-end valorization of the lignocellulosic fraction in wood streams", Journal of Cleaner Production, Sep. 2020, vol. 266, pp. 1-11.
Yan et al., "Selective degradation of wood lignin over noble-metal catalysts in a two-step process", ChemSusChem, 2008, vol. 1, No. 7, pp. 626-629.
Zijlstra et al., "Efficient Mild Organosolv Lignin Extraction in a Flow-Through Setup Yielding Lignin with High β-O-4 Content", Polymers, 2019, vol. 11, No. 1913, pp. 1-17.
Zhou et al., "Rapid flow-through fractionation of biomass to preserve labile aryl ether bonds in native lignin", Green Chemistry, 2019, vol. 21, pp. 4625-4632.

* cited by examiner

β-5
Phenylcoumaran

X1
Cinnamyl Alcohol

βO4
β-Aryl ether

G
Guaiacyl

S
Syringyl

Resinol (ββ)

MeβO4
α-Methoxy
β-Aryl ether pBA
p-Hydroxybenzoate

CONTINUOUS PROCESSING OF LIGNIN FOR REDUCED SOLVENT USAGE IN REDUCTIVE CATALYTIC FRACTIONATION

CROSS-REFERENCE TO RELATED APPLICATIONS

This application claims priority from U.S. Provisional Patent Application No. 63/211,238 filed on Jun. 16, 2021, the contents of which are incorporated herein by reference in their entirety.

CONTRACTUAL ORIGIN

This invention was made with government support under Contract No. DE-AC36-08GO28308 awarded by the Department of Energy. The government has certain rights in the invention.

BACKGROUND

Reductive catalytic fractionation (RCF) is a promising approach to valorize lignin from a variety of biomass sources, but process development has been hindered by high solvent consumption, long residence times (in batch mode), and complex operation (in semi-continuous mode, requiring frequent switching of biomass batches). In particular, required solvent loadings are typically 9 g solvent to 1 g biomass or higher, while economic analysis indicates the solvent loading needs to be less than 4 g solvent to 1 g biomass for an economical process. This problem is exacerbated by the fact that the high porosity of biomass yields no "free" solvent below about 3 g solvent to 1 g biomass. Additionally, large-scale, high-pressure batch reactors are expensive, and semi-continuous reactors that require frequent changeout of biomass charges may be less expensive to build but are more expensive to operate. Thus, there is a need for both reduced solvent loading and less-expensive reactors to enable scale-up of RCF.

SUMMARY

Described herein are devices and methods for the efficient and economic generation of lignin monomers from biomass. The provided devices and methods utilize reductive catalytic fractionation with an organic solvent to extract high-quality lignin from biomass and cleave specific lignin bonds to generate valuable lignin monomers with a relatively narrow product slate. Advantageously, the devices and methods described herein utilize solvent recycling, multiple solvolysis chambers with multiple biomass beds and/or physical agitation (e.g., use of a screw extruder) to reduce the amount of solvent required and increase economic efficiency and monomer yield.

Reductive Catalytic Fractionation (RCF) uses an organic solvent to extract lignin and a reducing atmosphere with metal catalyst to cleave specific lignin bonds (esters and β-O-4 linkages), generating a suite of phenylpropanoid monomers that can be further upgraded by several means (oxidation, formulation into polymers, biological conversion to polymer precursors, etc.). This invention encompasses three related processes for semi-continuous or continuous lignin extraction and hydrogenolysis to reduce the cost of reactors and reduce the solvent loading, which TEA has identified as critical cost drivers in a scaled-up RCF process. The first process employs batch solvent recycling, which allows for reduced "effective" solvent usage by using a relatively high solvent loading (e.g., 9 g solvent to 1 g biomass), but recycling the lignin-loaded solvent in subsequent batch reactions with fresh biomass and catalyst. The second process employs a similar concept, but in flow-through mode, such that after lignin extraction or reductive stabilization, solvent is directly recycled to the biomass bed in a flow-around, semi-continuous configuration until the desired "effective" solvent loading is achieved. Extending both the first and second concepts to multiple biomass batches, the biomass batches could be configured in either series or parallel with each other. The parallel concept is advantageous in that the composition of the liquor entering and exiting each biomass bed is the same.

The third directly reduces the solvent loading by conducting the lignin extraction in a screw extruder. In this third process, lignin extraction is enhanced by the mechanical action of the extruder, which improves access of the solvent to the lignin in the biomass and also incorporates in-situ pressure filtering to recover a greater fraction of the solvent in a single unit operation. The extruder is furthermore configured to compact the biomass into a "dynamic plug" upstream and downstream of a heated zone, which enables the extruder body to maintain the temperature and pressure required for lignin extraction. The extruder process is also amenable to incorporation of the first two processes, i.e., recycling the lignin-loaded solvent for multiple passes through the screw extruder.

Additionally, the described systems and methods illustrate that immediate catalytic reaction after solvolysis is not required, and monomer yields can be maintained even after the generated solvolysis liquor is stored for a significant time period. Reductive catalytic treatment of the isolated lignin in a flow-through system produces monomer yields equivalent to a two-stage in situ flow-through setup, indicating that the aryl-ether bonds are conserved in the flow-based methanol extraction. From a lignin-first biorefining research perspective, these results demonstrate that immediate catalyst action is not necessary for passivation of reactive components of lignin, and that the lignin extract can be dried to an oil for storage or stored in methanol and processed at a later time without losing substantial reactivity. Similarly, it may also be feasible to use the extracted lignin in materials applications. Taken together, these results suggest that lignin can be successfully isolated without significant chemical modification, which can enable both improved understanding of the native lignin structure and continuous catalytic processing of this important biopolymer.

In an aspect, provided is a method comprising: a) treating biomass with a solvent, thereby extracting lignin and generating a solvolysis liquor; b) reacting the solvolysis liquor in the presence of a catalyst, thereby generating at least one lignin monomer. The method may further comprise retreating the biomass with the solvolysis liquor to increase the concentration of lignin in the solvolysis liquor. The step of treating biomass may occur in a plurality of solvolysis chambers and each of the solvolysis chambers may comprise a biomass bed. The plurality of solvolysis chambers may be arranged in parallel.

The step of treating biomass may be performed in the presence of a screw extruder. For example, each of the plurality of solvolysis chambers may comprise a screw extruder.

The provided method may further comprise a step of storing the solvolysis liquor prior to reacting the solvolysis liquor in the presence of a catalysis, for example, storing the solvolysis liquor for a time period greater than or equal to 1 day, 2 days, 1 week, 2 weeks, or optionally, 1 month. The step of storing the solvolysis liquor may further comprise analyzing the solvolysis liquor, for example, to allow for optimization of the catalytic reaction step.

The solvent may comprise an alcohol, for example, an alkyl alcohol such as methanol. The catalyst may comprise a Ni/C catalyst.

The step of treating the biomass may comprise providing a solvent at a ratio less than or equal to 4:1 wt % solvent to biomass, less than or equal to 3:1 wt % solvent to biomass, or optionally, selected from the range of 3:1 wt % to 4:1 wt %, inclusive. The method may yield greater than or equal to 15 wt %, 20 wt %, 25 wt %, 30 wt %, or optionally, 35 wt % lignin monomers with respect to lignin weight.

In an aspect provided is a solvolysis device comprising: a solvent inlet; a plurality of solvolysis chambers in fluid communication with the solvent inlet; a solvolysis liquor outlet in fluid communication with the solvolysis chamber; and a recycle stream in fluid communication with the solvolysis liquor outlet and the solvent inlet for recycling a solvolysis liquor through the plurality of solvolysis chambers.

The plurality of solvolysis chambers may be arranged in parallel. Each of the plurality of solvolysis chambers may comprise a biomass bed, for example, a biomass bed comprising lignin.

The solvolysis device may further comprise at least on catalytic reaction chamber in fluid communication with the solvolysis liquor outlet. For example, a catalyst reaction chamber comprising a catalyst bed of Ni/C catalyst.

BRIEF DESCRIPTION OF DRAWINGS

Some embodiments are illustrated in referenced figures of the drawings. It is intended that the embodiments and figures disclosed herein are to be considered illustrative rather than limiting.

FIG. 1A In situ flow-through solvolysis of biomass with methanol and hydrogenolysis with a Ni/C catalyst. FIG. 1B Ex situ flow-through solvolysis setup in flow, where catalysis is subsequently conducted in batch reactors or a flow reactor with isolated solvolysis liquor.

FIG. 2A Results from in situ batch and flow-through RCF experiments, including an in situ flow-through control reaction with biomass and carbon support in methanol. FIG. 2B Results from ex situ flow solvolysis and subsequent batch and flow-through hydrogenolysis reactions after 1 week of solvolysis liquor storage, as well as an ex situ control of solvolysis liquor run over carbon support only in flow. These data are also provided in Table 2. All experiments were conducted in duplicate, and the error bars are the range for total monomer yield. Batch reactions: either 30 mL (23.76 g) of ex situ solvolysis liquor or 0.313 g poplar in 30 mL methanol, 0.05 g catalyst (either 15 wt % Ni/C or activated carbon support), 30 bar $H_2$ at 225° C., 3 h (exclusive of 30 min heating ramp). Flow reactions: 2 mL $min^{-1}$ methanol or ex situ solvolysis liquor, 5 g poplar (in situ) or no biomass (ex situ), 0.9 g catalyst (either 15 wt % Ni/C or activated carbon support), 1,600 psig, 200 sccm $H_2$, 225° C., 3 h (exclusive of 1 h heating ramp for in situ runs).

(FIG. 3B) hourly sample time points of in situ flow through RCF and in situ batch RCF. Reaction conditions: 30 mL ex situ solvolysis liquor, 0.1 g 15 wt % Ni/C catalyst, 30 bar $H_2$ at room temperature, 225° C., 3 h (not including 35 min temperature ramp). For batch RCF, 0.03 g poplar in 30 mL methanol, 30 bar $H_2$ at room temperature, 225° C. (not including 35 min heating ramp), 3 h. All data are normalized by total area.

FIG. 4A 2D HSQC NMR spectrum of the native poplar biomass sample. FIG. 4B 2D HSQC NMR spectrum of the ex situ flow-through solvolysis liquor.

FIG. 20 illustrates.

FIG. 28 is related to FIG. 27.

DETAILED DESCRIPTION

Figure 1:
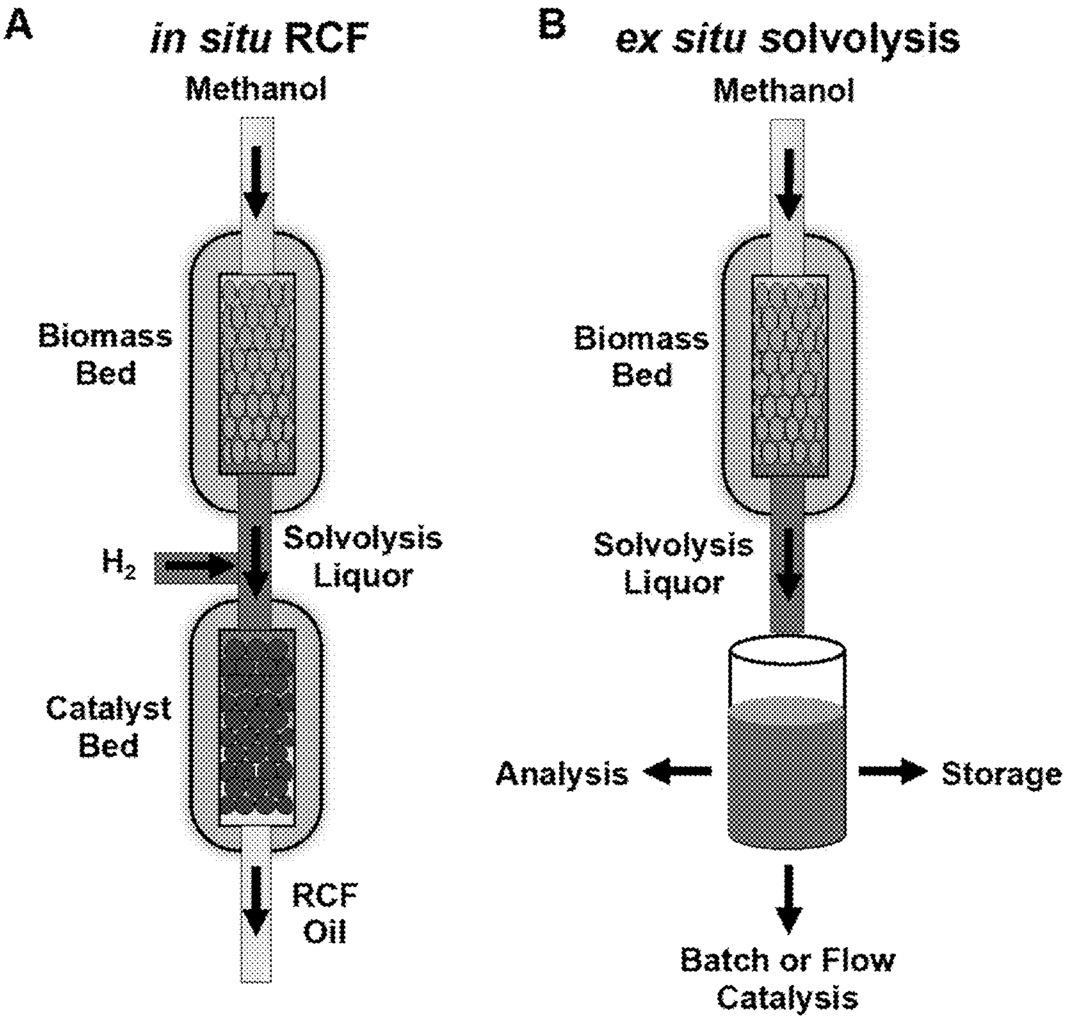
FIG. 1 provides an example schematic of flow-through solvolysis and reductive catalytic fractionation (RCF) configurations used in the present study.

The embodiments described herein should not necessarily be construed as limited to addressing any of the particular problems or deficiencies discussed herein. References in the specification to "one embodiment", "an embodiment", "an example embodiment", "some embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used herein the term "substantially" is used to indicate that exact values are not necessarily attainable. By way of example, one of ordinary skill in the art will understand that in some chemical reactions 100% conversion of a reactant is possible, yet unlikely. Most of a reactant may be converted to a product and conversion of the reactant may asymptotically approach 100% conversion. So, although from a practical perspective 100% of the reactant is converted, from a technical perspective, a small and sometimes difficult to define amount remains. For this example of a chemical reactant, that amount may be relatively easily defined by the detection limits of the instrument used to test for it. However, in many cases, this amount may not be easily defined, hence the use of the term "substantially". In some embodiments of the present invention, the term "substantially" is defined as approaching a specific numeric value or target to within 20%, 15%, 10%, 5%, or within 1% of the value or target. In further embodiments of the present invention, the term "substantially" is defined as approaching a specific numeric value or target to within 1%, 0.9%, 0.8%, 0.7%, 0.6%, 0.5%, 0.4%, 0.3%, 0.2%, or 0.1% of the value or target.

As used herein, the term "about" is used to indicate that exact values are not necessarily attainable. Therefore, the term "about" is used to indicate this uncertainty limit. In some embodiments of the present invention, the term "about" is used to indicate an uncertainty limit of less than or equal to ±20%, ±15%, ±10%, ±5%, or ±1% of a specific numeric value or target. In some embodiments of the present invention, the term "about" is used to indicate an uncertainty limit of less than or equal to ±1%, ±0.9%, ±0.8%, ±0.7%, ±0.6%, ±0.5%, ±0.4%, ±0.3%, ±0.2%, or ±0.1% of a specific numeric value or target.

The provided discussion and examples have been presented for purposes of illustration and description. The foregoing is not intended to limit the aspects, embodiments, or configurations to the form or forms disclosed herein. In the foregoing Detailed Description for example, various features of the aspects, embodiments, or configurations are grouped together in one or more embodiments, configurations, or aspects for the purpose of streamlining the disclosure. The features of the aspects, embodiments, or configurations, may be combined in alternate aspects, embodiments, or configurations other than those discussed above. This method of disclosure is not to be interpreted as reflecting an intention that the aspects, embodiments, or configurations require more features than are expressly recited in each claim. Rather, as the following claims reflect, inventive aspects lie in less than all features of a single foregoing disclosed embodiment, configuration, or aspect. While certain aspects of conventional technology have been discussed to facilitate disclosure of some embodiments of the present invention, the Applicants in no way disclaim these technical aspects, and it is contemplated that the claimed invention may encompass one or more of the conventional technical aspects discussed herein. Thus, the following claims are hereby incorporated into this Detailed Description, with each claim standing on its own as a separate aspect, embodiment, or configuration.

Example 1—Flow-Through Solvolysis Enables Production of Native-Like Lignin from Biomass The inherent reactivity of lignin in conventional biomass processing commonly prevents isolation of native lignin and limits monomer yields from catalytic depolymerization strategies that target aryl-ether bonds. Described herein is flow-through solvolysis with methanol at 225° C. produces native-like lignin from poplar, enabling the study of intrinsic lignin properties and evaluation of steady-state lignin depolymerization processes.

Lignin valorization is important for the economics and sustainability of biomass conversion and catalytic deconstruction to valuable monomers is a common strategy to that end. The abundant aryl-ether linkage in lignin is the most frequent target of catalysis, but condensation reactions ultimately limit monomer yields from C—O bond cleavage. To address this challenge, the lignin-first biorefining approach catalytically passivates reactive intermediates or uses stoichiometric reagents to functionalize the β-O-4 linkage. Lignin-first strategies typically yield a narrow slate of aromatic monomers, bounded by the aryl-ether content of the lignin.

Many lignin-first biorefining examples employ reductive catalytic fractionation (RCF) in batch reactors where biomass, a reducing catalyst, and a hydrogen donor are combined in polar protic solvents. Given the typical reaction times and temperatures of RCF processes, a catalyst must be present during reaction to prevent condensation. However, physical mixing of the biomass and catalyst complicates kinetics studies and post-reaction analyses.

Several reactor configurations have been applied to physically separate the biomass and catalyst for RCF processes, including conducting solvolysis and hydrogenolysis as separate batch reactions or in tandem flow-through reactors, or by using catalyst baskets in batch reactors. In batch solvolysis reactions, the typical multi-hour residence time without catalytic stabilization results in lower monomer yields. In flow-through RCF configurations (FIG. 1A), the catalyst performance is not measured at steady-state because lignin solubilization varies temporally. To overcome this, Lan et al. recently applied a protection-group method to produce isolated lignin for subsequent depolymerization in a flow reactor. Wang et al. also demonstrated that aqueous formic acid extracts lignin from biomass, with an estimated 75% retention of aryl-ether linkages. Generally, the ability to isolate native-like lignin for lignin property studies and to evaluate steady-state catalytic lignin depolymerization activity with intact C—O linkages would be useful, but with these few exceptions, the ability to isolate native-like lignin in a solubilized form has not been widely reported to our knowledge. In addition, reducing solvent usage in RCF is critical for process economics, and the ability to isolate a native-like lignin may facilitate solvent recycling and enable more efficient use of a downstream catalytic step, thus reducing the costs in an RCF process.

It is hypothesized that solubilized lignin from whole biomass at typical RCF conditions must be rapidly exposed to a catalyst and hydrogen, otherwise it will undergo condensation. Described herein are RCF reactions in either an in situ or ex situ mode with a multi-bed flow system (FIG. 1) and in batch reactors. Throughout, 'in situ' denotes that the lignin is exposed to the catalyst directly after solvolysis (either in batch or flow), and 'ex situ' denotes that lignin is first isolated, then in a separate processing step, subjected to hydrogenolysis. Throughout, we used methanol as a solvent, hybrid poplar as the substrate (Table 1), a reaction time of 3 h, a reaction temperature of 225° C., and 15 wt % Ni/C as the catalyst. The methanol-to-biomass ratio used in all batch and flow reactions was ~93 L/kg. All lignin monomer yields are reported on a wt % basis with respect to the total lignin content.

TABLE 1

Compositional analysis of parent and post-solvolysis poplar.

| Run | Substrate | Ash | Extractives | Lignin | Glucan | Xylan |
|---|---|---|---|---|---|---|
| 1 | Poplar | 0.69 | 3.54 | 25.95 | 45.31 | 13.24 |
| 2 | Post-Solvolysis Poplar | 0.77 | 0 | 13.72 | 65.42 | 19.69 |

| Run | Galactan | Arabinan | Mannan | Acetyl | Total |
|---|---|---|---|---|---|
| 1 | 1.34 | 0.14 | 2.79 | 3.84 | 97.43 |
| 2 | 1.43 | 0 | 3.41 | 0.07 | 104.51 |

Figure 2:
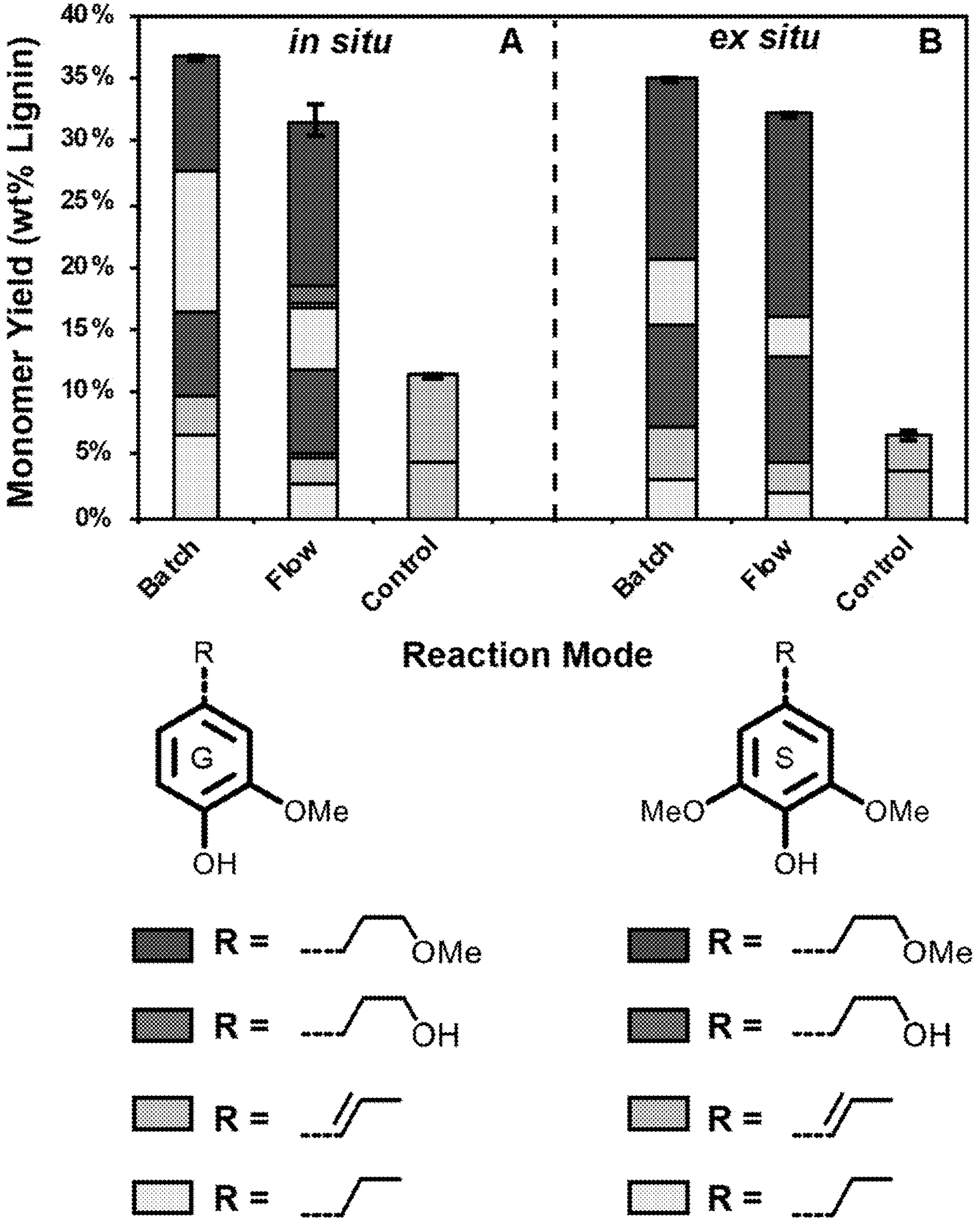
FIG. 2 illustrates monomer yield and selectivity data from in situ and ex situ RCF experiments in batch and flow-through modes.
Figure 3:
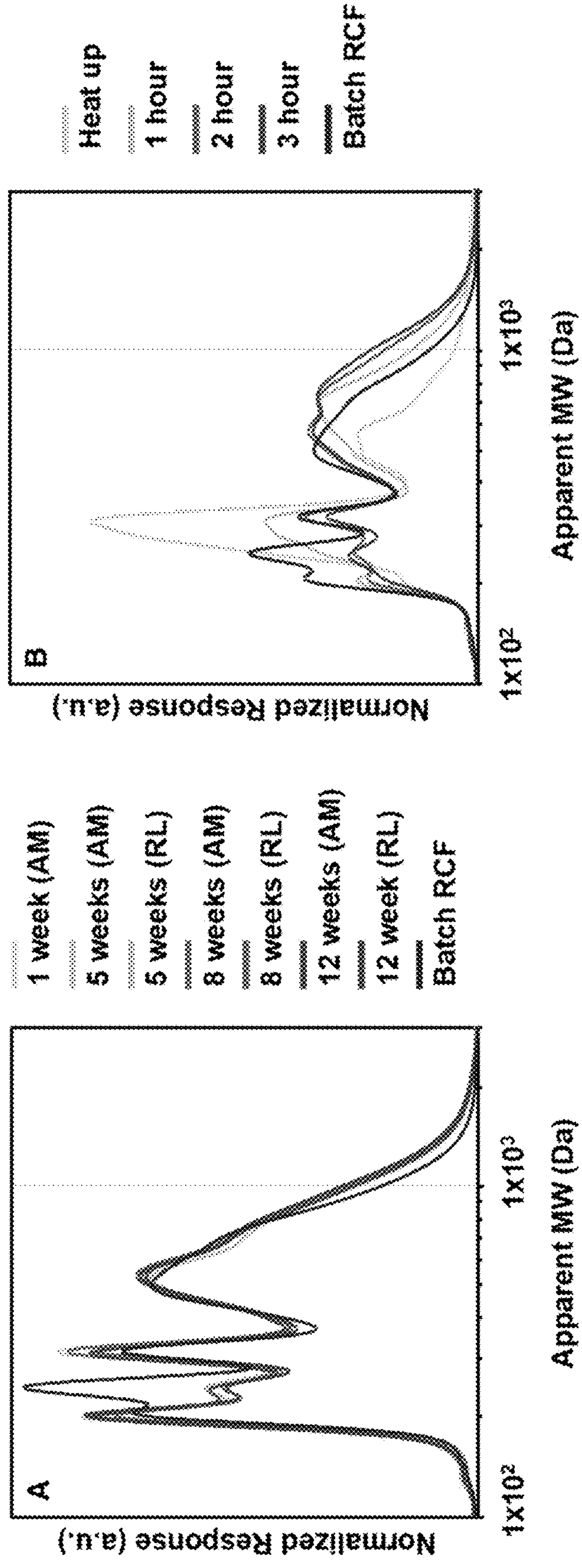
FIG. 3 provides GPC traces of RCF product oils from (FIG. 3A) as-made (AM) and reconstituted (RC) solvolysis liquor at different room-temperature aging time points.

The aryl-ether bond content in poplar lignin is benchmarked based on aromatic monomer yield from in situ batch and flow-through RCF reactions. From these experiments, we obtained monomer yields of 36.8±0.2% in a batch reaction and 31.6±1.3% in a flow-through RCF experiment (FIGS. 2-3, Tables 1-3). For all flow-through reactions, we ran at temperature for 3 h, which resulted in a delignification extent of 63.1%±0.1% (duplicate). A control in situ batch reaction with an activated carbon support alone resulted in a monomer yield of 11.3±0.3%.

TABLE 2

Monomer yield and selectivity data from in situ and ex situ RCF experiments in batch and flow-through modes. All experiments were conducted in duplicate, and the error bars are the average and range of the data.

| Run | Substrate | PG | IEG | P(OMe)G | PS | P(OH)G | P(ene)S | P(OMe)S | P(OH)S | Total | Error +/− |
|---|---|---|---|---|---|---|---|---|---|---|---|
| 1 | In situ Batch RCF | 6.5% | 3.3% | 0.0% | 11.4% | 6.6% | 0.0% | 0.0% | 9.1% | 36.8% | 0.2% |
| 2 | In situ Flow RCF | 2.8% | 1.9% | 0.4% | 4.8% | 6.9% | 0.2% | 1.4% | 13.2% | 31.6% | 1.3% |
| 3 | In situ Batch Control | 0.0% | 4.6% | 0.0% | 0.0% | 0.0% | 6.7% | 0.0% | 0.0% | 11.3% | 0.3% |

TABLE 2-continued

Monomer yield and selectivity data from in situ and ex situ RCF experiments in batch and flow-through modes. All experiments were conducted in duplicate, and the error bars are the average and range of the data.

| Run | Substrate | PG | IEG | P(OMe)G | PS | P(OH)G | P(ene)S | P(OMe)S | P(OH)S | Total | Error +/− |
|---|---|---|---|---|---|---|---|---|---|---|---|
| 4 | Batch ex situ (Aged 1 week) | 2.9% | 4.3% | 0.0% | 5.4% | 8.0% | 0.0% | 0.0% | 14.5% | 35.2% | 0.0% |
| 5 | Flow ex situ (Aged 4 weeks) | 2.1% | 2.2% | 0.1% | 3.3% | 8.3% | 0.0% | 0.0% | 16.2% | 32.3% | 0.0% |
| 6 | Flow ex situ Control (Aged 6 weeks) | 0.0% | 3.7% | 0.0% | 0.0% | 0.0% | 2.9% | 0.0% | 0.0% | 6.6% | 0.4% |
| 7 | Ex situ Batch RCF | 0.0% | 3.6% | 0.0% | 1.7% | 3.7% | 0.0% | 0.0% | 9.6% | 18.6% | 0.2% |

TABLE 3

Time-resolved study of ex situ batch RCF reactions on aged solvolysis liquor produced in flow that is stored in the methanol solvent as well as reconstituted after solvent evaporation. All experiments were conducted in duplicate, and the error bars are the average and range of the data.

| Run | Substrate | PG | IEG | P(OMe)G | PS | P(OH)G | P(ene)S | P(OMe)S | P(OH)S | Total | Error +/− |
|---|---|---|---|---|---|---|---|---|---|---|---|
| 1 | 1 week | 2.9% | 4.3% | 0.0% | 5.4% | 8.0% | 0.0% | 0.0% | 14.5% | 35.2% | 0.0% |
| 2 | 2 weeks | 2.9% | 4.2% | 0.0% | 5.3% | 7.8% | 0.0% | 0.0% | 14.1% | 34.4% | 0.3% |
| 3 | 3 weeks | 3.2% | 4.1% | 0.0% | 5.5% | 7.5% | 0.0% | 0.0% | 13.6% | 33.9% | 0.2% |
| 4 | 5 weeks | 3.2% | 4.2% | 0.0% | 5.7% | 7.8% | 0.0% | 0.0% | 13.8% | 34.6% | 0.3% |
| 5 | 5 weeks (reconstituted) | 2.8% | 4.2% | 0.0% | 5.3% | 7.9% | 0.0% | 0.0% | 13.8% | 34.0% | 0.3% |
| 6 | 8 weeks | 3.0% | 4.1% | 0.0% | 5.3% | 8.0% | 0.0% | 0.0% | 14.1% | 34.5% | 0.1% |
| 7 | 8 weeks (reconstituted) | 2.7% | 4.2% | 0.0% | 5.1% | 7.8% | 0.0% | 0.0% | 13.1% | 32.7% | 0.1% |
| 8 | 12 weeks | 3.1% | 4.1% | 0.0% | 5.5% | 8.1% | 0.0% | 0.0% | 14.1% | 34.8% | 0.1% |
| 9 | 12 weeks (reconstituted) | 2.8% | 4.3% | 0.0% | 5.0% | 7.6% | 0.0% | 0.0% | 12.7% | 32.5% | 0.0% |

To compare the degree of lignin condensation without employing hydrogenolysis immediately upon extraction, we conducted an ex situ batch solvolysis reaction. The isolated lignin oil was then subjected to batch hydrogenolysis, where we obtained a monomer yield of 18.6±0.2% (Table 2). Relative to the in situ reactions, this result indicates that substantial lignin condensation (compared to 36.8±0.2%, above) occurs over 3 h without catalyst and hydrogen.

To examine condensation extents when lignin is rapidly quenched, we produced solvolysis liquor with methanol over multiple biomass beds at 225° C. via ex situ flow-through solvolysis (FIG. 1B). We collected the solvolysis liquor in a knockout pot, pooled the liquor from 12 consecutive reactor beds (producing ~5.5 L total), and stored the sample at room temperature in a translucent LDPE bottle. After one week of storage at room temperature, we performed batch and flow-through hydrogenolysis on the solvolysis liquor, again using 15 wt % Ni/C at an equivalent catalyst to biomass ratio at 225° C. The monomer yields from these experiments were 35.2±0.0% and 32.3±0.0%, respectively, similar to the in situ RCF results (FIG. 2, Table 2). A control ex situ flow-through experiment over the carbon support yielded 6.6±0.4% monomer yield.

Figure 4:
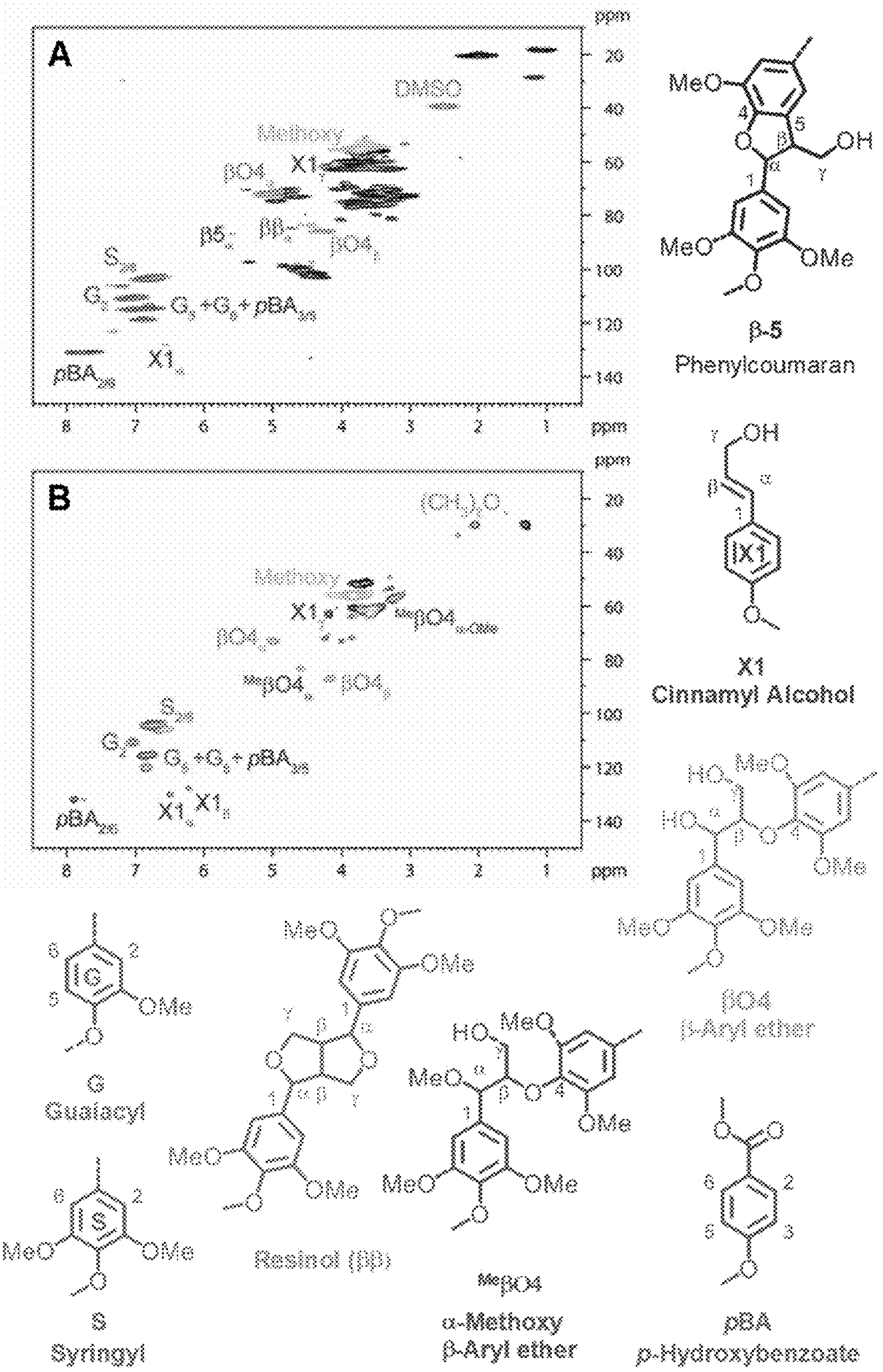
FIG. 4 provides NMR spectra of solvolysis liquor demonstrates the production of native-like lignin.
Figure 5:
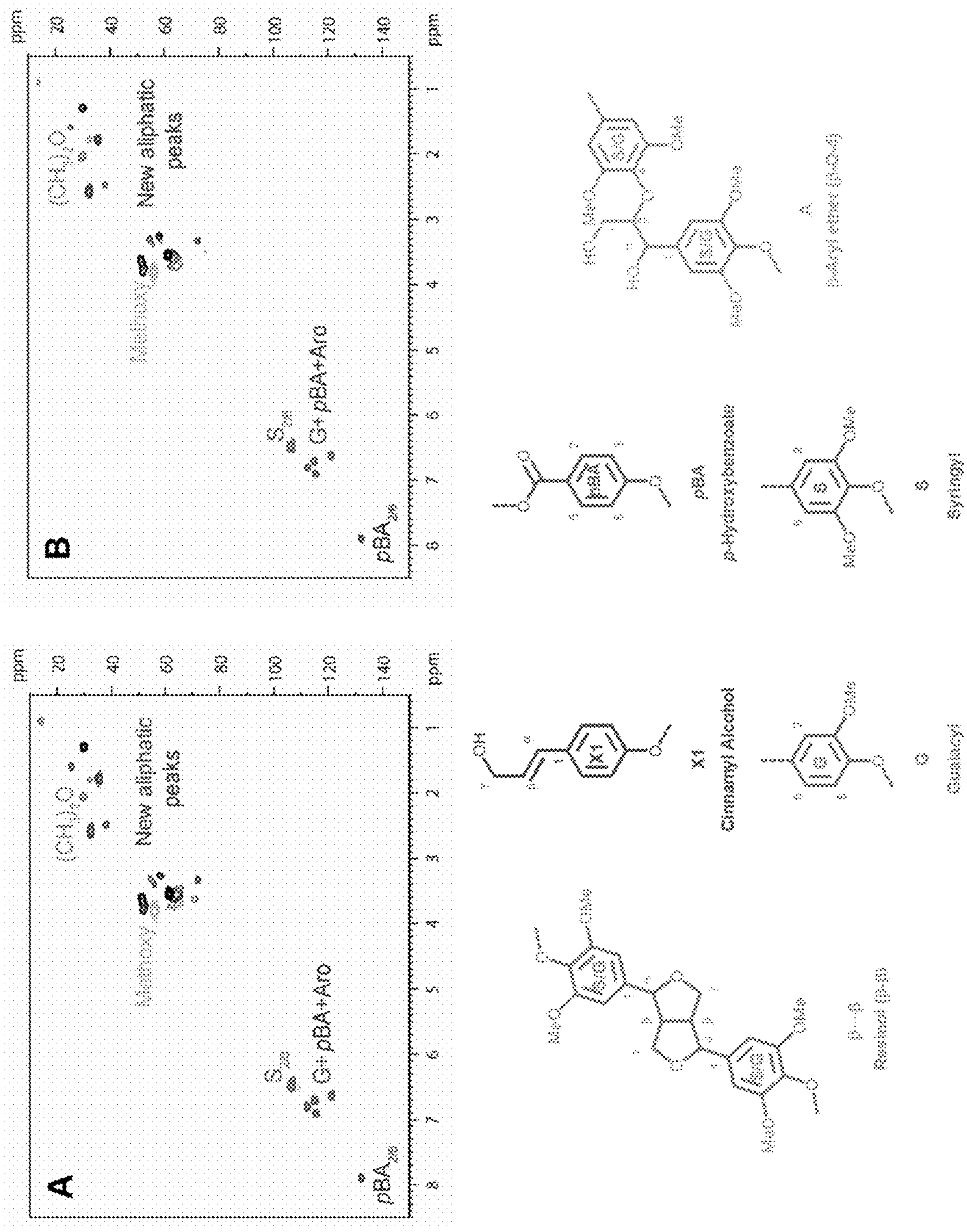
FIG. 5 provides Time-resolved study of ex situ batch RCF reactions on solvolysis liquor produced in flow and stored in methanol or reconstituted after solvent evaporation (denoted as RC). The monomer yield and selectivity for batch hydrogenolysis reactions of solvolysis liquor produced in flow. The as-made flow solvolysis liquor was tested at 1, 2, 3, 6, 8, and 12 weeks. Removing the methanol before aging was also tested at 5, 8, and 12 weeks. These data are also provided in Table 3. All experiments were conducted in duplicate, and the error bars are the range of the total monomer yield. Reaction conditions: 30 mL ex situ solvolysis liquor, 0.1 g 15 wt % Ni/C catalyst, 30 bar $H_2$ at room temperature, 225° C., 3 h (exclusive of 30 min heating ramp).

The observation of similar monomer yields from in situ and ex situ RCF reactions suggests that flow-through solvolysis retains intact b-O-4 linkages in lignin. The ex situ liquor did not contain coniferyl alcohol, sinapyl alcohol, or any of the monomers shown in FIG. 2 at detectable levels, suggesting that flow-through solvolysis alone does not produce monomers. To ascertain the presence of intact aryl-ether linkages, we conducted 2D hetero-nuclear single quantum coherence (HSQC) NMR spectroscopy. As shown in FIG. 4, the HSQC NMR spectra of the ex situ flow-through solvolysis liquor exhibits intact aryl-ether linkages. We note that partial methoxylation of the a-C (in the b-O-4 linkage) is observed, suggesting that methanol protection is occurring at this position. Conversely, both the in situ flow-through RCF oil and the ex situ flow-through RCF oil exhibit complete disappearance of aryl-ether linkages (FIG. 5). Overall, the lignin extracted by ex situ flow-through solvolysis produces similar RCF monomer yields, and NMR spectra compared to the original poplar, suggesting that the extracted lignin is a "native-like" substrate.

We were additionally interested in the duration that the solvolysis liquor could be stored and to understand if the methanol could be removed from the solvolysis liquor without compromising lignin reactivity. These questions are relevant for downstream chemistries that require catalytic processing in different solvents, processing neat RCF oil, studies of lignin properties, and applications of native-like lignin in materials or other direct-use applications.

Figure 6:
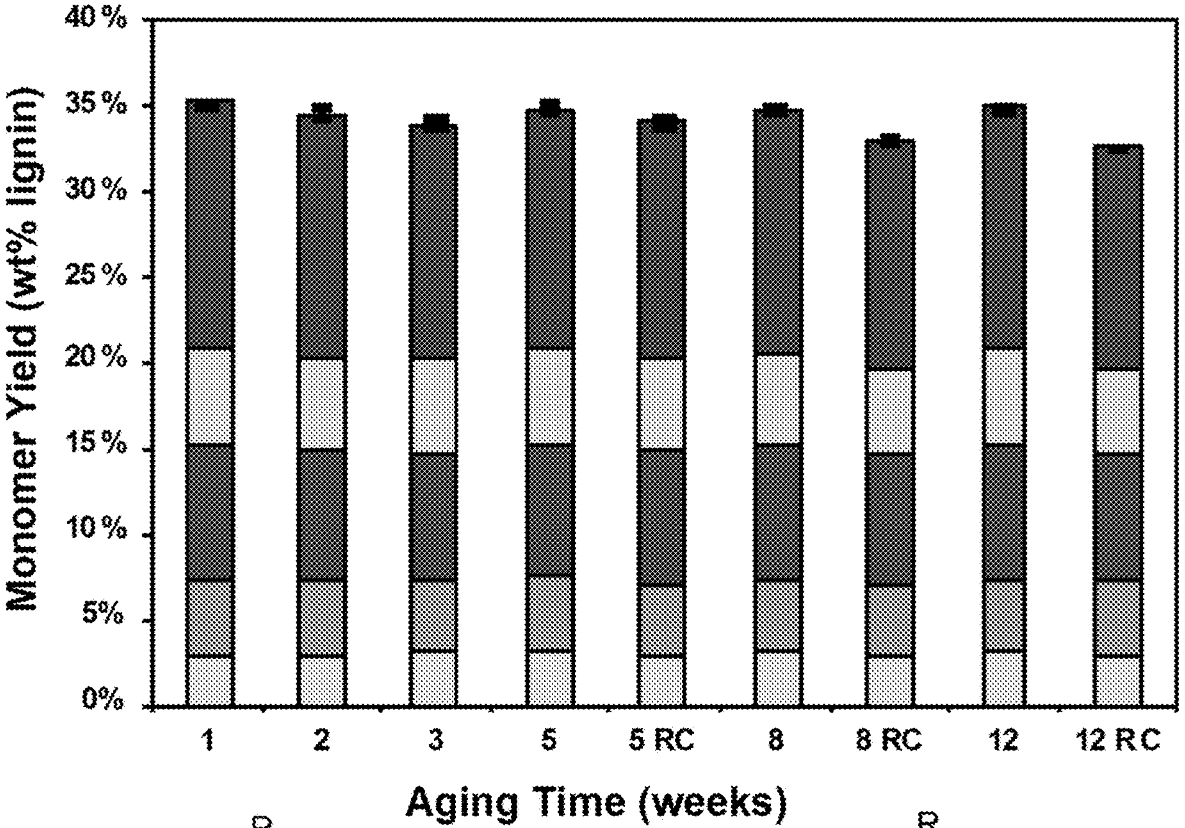
FIG. 6 provides 2D HSQC NMR spectra of in situ (FIG. 6A) and ex situ (FIG. 6B) flow RCF. Representative samples collected from 60-90 minutes illustrating the disappearance of β-O-4 linkage. Conditions for flow RCF: 5 g poplar (in situ), 2 mL $min^{-1}$ methanol (in situ) or solvolysis liquor (ex situ), 225° C., 3 h (not including 1 h temperature ramp).
Figure 6:
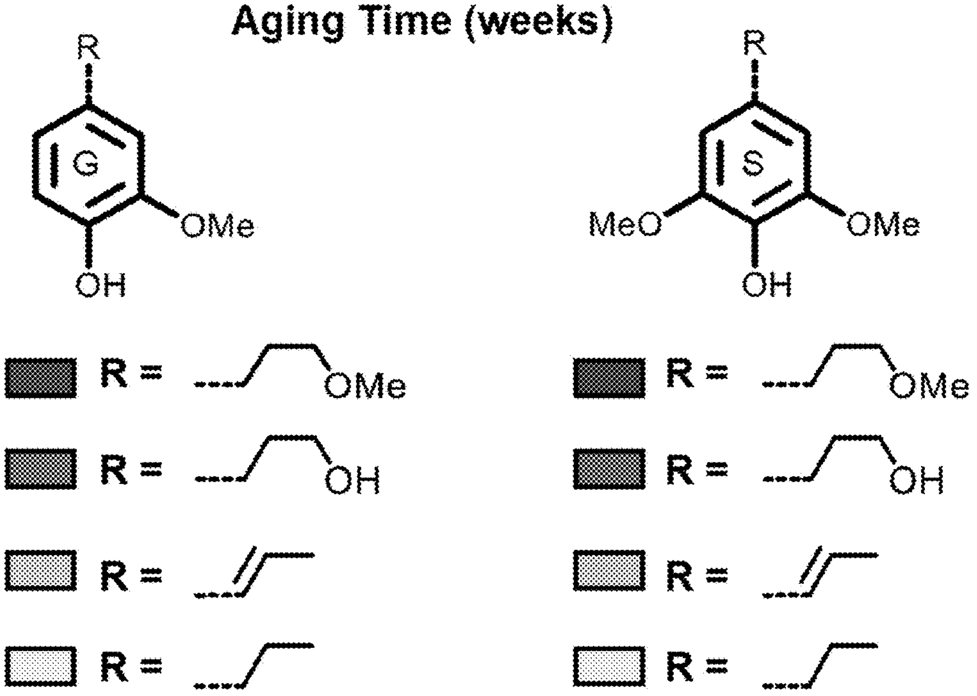

To address these questions, we conducted a 12-week experiment in which a fraction of the solvolysis liquor was maintained at room temperature in methanol, and duplicate ex situ batch RCF reactions were conducted after storage for 1 (vide supra), 2, 3, 5, 8, and 12 weeks. For a fraction of the solvolysis liquor, we used rotary evaporation to produce a methanol-free oil. At three time points over the same 12 weeks, we reconstituted a fraction of this solvent-less solvolysis liquor in methanol for conducting equivalent ex situ batch RCF reactions. In both the stored samples in methanol and the reconstituted samples, the monomer yields are essentially invariant over the 12-week period, with only a 1.8±0.1% and 2.0±0.0% decrease in monomer yields in the 8- and 12-week reconstituted samples, respectively, as shown in FIG. 6 and Table 3. We also characterized the molecular weight distributions of the ex situ flow-through solvolysis liquor after batch hydrogenolysis experiments as-is and reconstituted after 1, 5, 8, and 12 weeks (FIG. 3). As shown, the post-hydrogenolysis molecular weight distributions are invariant as a function of storage time. Together, these data indicate that the solvolysis liquor is shelf-stable at least for 3 months.

Figure 7:
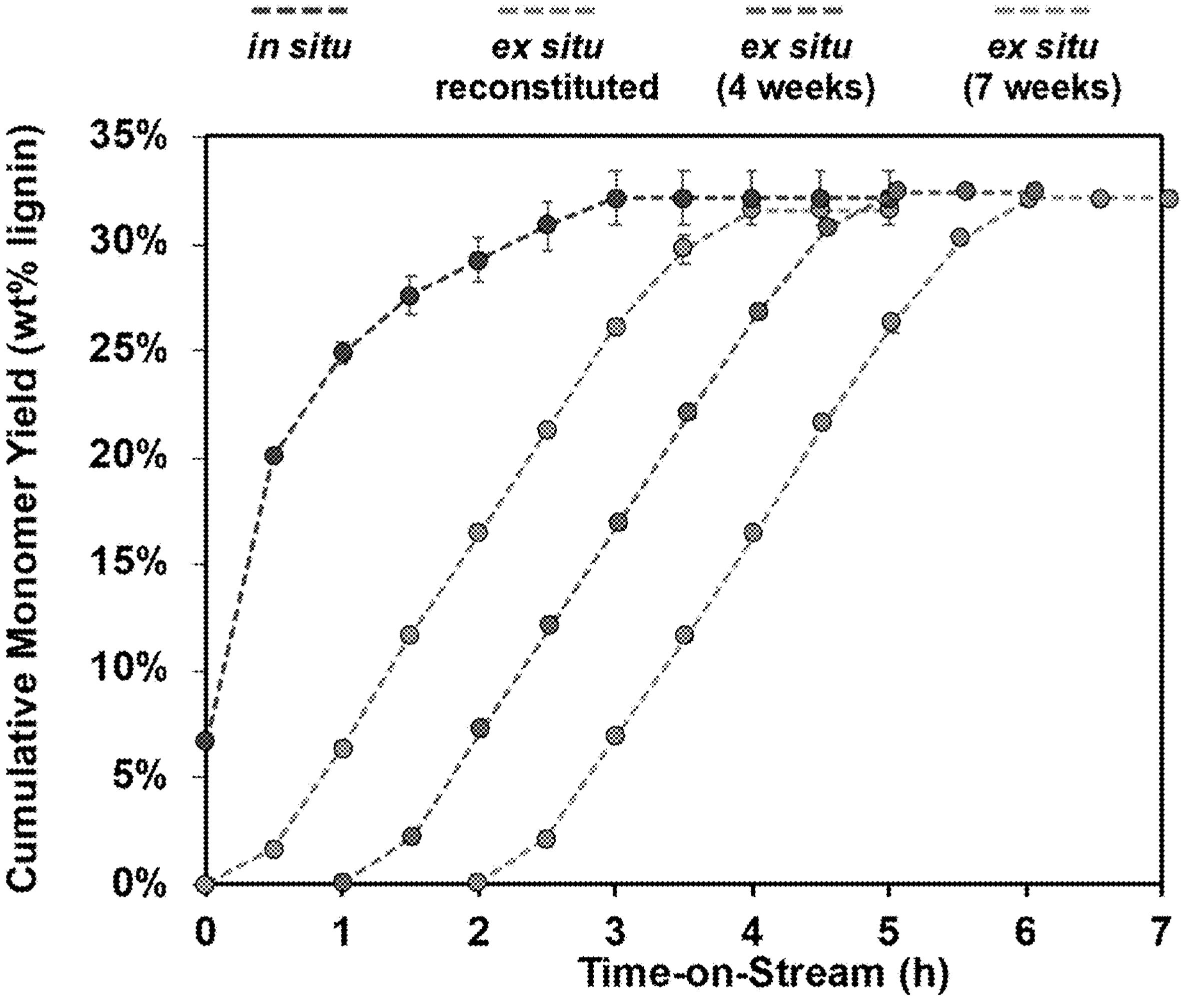
FIG. 7 provides time-on-stream measure of cumulative monomer yields for in situ and ex situ hydrogenolysis. Ex situ flow-through RCF provides a consistent feed to the catalyst bed, resulting in a linear increase in monomer production, compared to the nonlinear, transient monomer production during in situ flow-through RCF. These data are also provided in Table 4. All experiments were conducted in duplicate, and the error bars show the range. Reaction conditions: 2 mL $min^{-1}$ methanol or ex situ solvolysis liquor, 5 g poplar (in situ) or no biomass (ex situ), 0.9 g 15 wt % Ni/C, 1,600 psig, 200 sccm $H_2$, 225° C., 3 h (not including 1 h temperature ramp for in situ runs). Ex situ runs included a 1.5 h methanol flush at the end of the reaction. 4-week and 7-week ex situ runs profiles are offset by 1 h and 2 h time-on-stream, respectively, for visual clarity.
Figure 8:
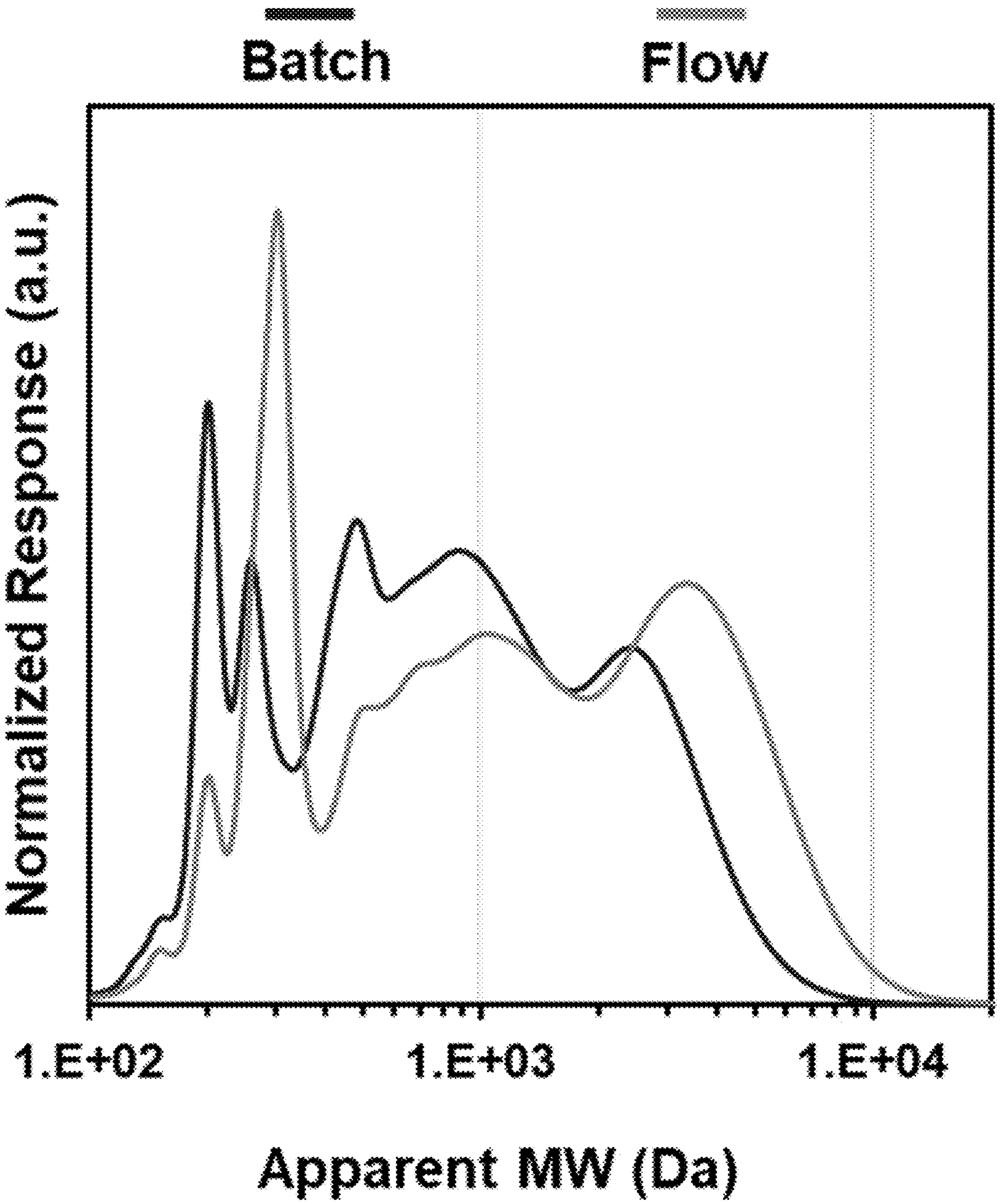
FIG. 8 provides GPC traces for batch and flow solvolysis liquors. Conditions for batch solvolysis: 0.03 g poplar in 30 mL methanol, He headspace, 225° C., 3 h (not including 35 min temperature ramp). Conditions for flow solvolysis: 5 g poplar, 2 mL $min^{-1}$ methanol, 225° C., 3 h (not including 1 h heating ramp). All data are normalized by total area.

One application of the ex situ solvolysis liquor is the ability to conduct flow experiments where the catalyst subjected to a continuous feed of uniform lignin. As shown in FIG. 7, the ex situ solvolysis liquor, including a reconstituted sample and two stored samples (4 and 7 weeks of storage in methanol), exhibits a linear increase in monomer yield (using the total lignin fed as the baseline for yield), while the nonlinear increase apparent for the in situ flow-through solvolysis indicates a transient lignin stream.

While an in-depth exploration of solvolysis residence times is outside the scope of this work, it is worth considering the present results with respect to previous batch solvolysis work. Previous batch solvolysis residence times have been 2-3 h. The flow-through solvolysis reported here employed a 5 g biomass bed centered inside a tube of approximately 35 cm total length and 1.6 cm inner diameter. The 5 g bed occupied approximately 5 cm in the axial dimension, thus the lignin traveled through a heated zone ranging between 15 and 20 cm in length, depending on where in the biomass bed it originated. At a 2 mL $min^{-1}$ flow rate of methanol, the mean residence time for the lignin fragments to be quenched was thus ~17 min.

TABLE 4

Transient measure of cumulative monomer yields for in situ and ex situ hydrogenolysis. All experiments were conducted in duplicate, and the error bars are the average and range of the data.

| Time (hours) | 0 | 0.5 | 1.0 | 1.5 | 2.0 | 2.5 | 3.0 | 3.5 | 4.0 | 4.5 | 5.0 |
|---|---|---|---|---|---|---|---|---|---|---|---|
| In situ | 6.7 +/− 0.4% | 20 +/− 0.3% | 24.9 +/− 0.5% | 27.6 +/− 0.9% | 29.3 +/− 1% | 30.9 +/− 1.1% | 32.2 +/− 1.2% | 32.2 +/− 1.2% | 32.2 +/− 1.2% | 32.2 +/− 1.2% | 32.2 +/− 1.2% |
| Ex situ (4 weeks) | 0 +/− 0% | 2.2 +/− 0.1% | 7.2 +/− 0.3% | 12 +/− 0.2% | 16.9 +/− 0.1% | 21.9 +/− 0.2% | 26.6 +/− 0% | 30.6 +/− 0% | 32.3 +/− 0% | 32.3 +/− 0% | 32.3 +/− 0% |
| Ex situ Reconstituted | 0 +/− 0% | 1.7 +/− 0.2% | 6.4 +/− 0.3% | 11.7 +/− 0.1% | 16.5 +/− 0% | 21.3 +/− 0.3% | 26.1 +/− 0.4% | 29.8 +/− 0.7% | 31.6 +/− 0.7% | 31.6 +/− 0.7% | 31.6 +/− 0.7% |
| Ex situ Aged (7 weeks) | 0 +/− 0% | 2.1 +/− 0% | 6.8 +/− 0.1% | 11.5 +/− 0.1% | 16.3 +/− 0.1% | 21.5 +/− 0.2% | 26.1 +/− 0.4% | 30.1 +/− 0.1% | 32 +/− 0.2% | 32 +/− 0.2% | 32 +/− 0.2% |

Described in the demonstration flow-through solvolysis can produce native-like lignin using poplar and methanol at 225° C. Specifically, reductive catalytic treatment of the isolated lignin from a flow-through system produces monomer yields equivalent to a two-stage in situ flow-through setup, indicating that the aryl-ether bonds are conserved in the flow-based methanol extraction. From a lignin-first biorefining research perspective, these results demonstrate that immediate catalyst action is not necessary for passivation of reactive components of lignin, and that the lignin extract can be dried to an oil for storage or stored in methanol and processed later without losing substantial reactivity. Similarly, it may also be feasible to use the extracted lignin in materials. Taken together, these results suggest that lignin can be successfully isolated without significant chemical modification, which can enable both improved understanding of lignin structure and continuous catalytic processing of this important biopolymer.

Experimental Information

Biomass Substrate

Clean chips of hybrid poplar clone OP-367 (*P. deltoides*× *P. nigra*) harvested by Greenwood Resources in 2013 from Morrow County, OR The chips were dried in a bale dryer at 135° F. for 8 hours, before being ground to pass a 2-inch sieve using a Vermeer BG480 grinder. They were further refined in a bliss hammermill to pass through a ¼" sieve.[1] The final milled particles were sieved through a 2 mm screen.

Catalyst Preparation

A 15 wt % Ni/C catalyst was prepared as described by Anderson et al. One modification was made to this procedure to ensure the catalyst was fully reduced: namely, the catalyst was reduced under 4% $H_2$ and 96% $N_2$, relative to the pure $N_2$ as described in the original procedure. Briefly summarizing this procedure, nickel nitrate on carbon was heated to 450° C. at a rate of 7° C. $min^{-1}$ under a flow of 100 mL $min^{-1}$ $N_2$. Then, the catalyst was held at 450° C. for 2 hours under a flow of 4 mL $min^{-1}$ $H_2$ and 96 mL $min^{-1}$ $N_2$. The temperature was reduced to 30° C. under a flow of 100 mL $min^{-1}$ $N_2$. To passivate the catalyst surface, the catalyst was held under a flow of 5 mL $min^{-1}$ zero air and 95 mL $min^{-1}$ $N_2$ for 1 hour, followed by a 1-hour hold under flow of 100 mL $min^{-1}$ $N_2$. This process was repeated twice. A final hold under 5 mL $min^{-1}$ zero air and 95 mL $N_2$ was carried out until the catalyst was retrieved from the tube furnace.

In Situ RCF

Flow

In situ RCF experiments (FIG. 1A in the main text) were prepared by loading the flow reactor with two 5 g beds of hybrid poplar and one 0.9 g bed of 15 wt % Ni/C. The Ni/C was diluted in 2.1 g of fused silica (Dupre Minerals 30/50 grade) to avoid a significant pressure drop across the catalyst bed. Each bed was plugged with glass wool at both ends. The biomass and catalyst were located in the center of the respective reactor tube with residual space packed with coarse $SiO_2$ (Sigma-Aldrich fused 4-20 mesh). Additional glass wool plugs were used to separate the inert packing from the reactive material. Each bed was loaded vertically utilizing VCR fittings, and pressure tested to 1.2× reaction operating pressure.

Once the reactors were loaded and pressure tested, one biomass bed was filled with methanol (Sigma-Aldrich reagent ≥99.6%) to a pressure of 1,600 psi. The second biomass bed remained idle for this experiment. Simultaneously, the remainder of the reactor was filled with $H_2$ to a pressure of 1,600 psi, while heating to 225° C. Once pressure was equilibrated, the biomass bed was heated to 225° C. while open to the system with a methanol flow rate of 2.0 mL $min^{-1}$ and $H_2$ flow rate of 200 SCCM. The biomass bed reached reaction temperature typically in one hour. Initial time points (denoted as time zero in the main text figures) was noted as the time when the biomass bed reached 225° C. Samples of the effluent were then collected every 30 minutes. Upon completion, the reactor was depressurized and cooled under 200 SCCM of $N_2$. Replicate experiments were completed in the same fashion using the alternate biomass bed.

Batch

In situ RCF reactions were conducted by loading 75 mL Parr reactors with 0.313 g poplar, 50 mg of 15 wt % Ni/C, and 30 mL methanol. Parrs were sealed, flushed 3× with 30 bar He, and pressure tested prior to charging with 30 bar $H_2$. The reactors were heated to 225° C. (usually over 30 mins) and held at temperature for 3 hours, all while stirring at 800 rpm. The pressure at 225° C. was ~85 bar. The reactors were quenched in a cold water bath and cooled to room temperature for 30 mins. Finally, the RCF liquor was filtered through 0.2 μm filter.

Ex Situ RCF

Flow Solvolysis

Ex situ solvolysis (FIG. 1B in the main text) was conducted in flow to produce solvolysis liquor by packing the biomass beds as described above. The biomass beds were subsequently filled to 1,600 psi with methanol then heated to 225° C. with 2 mL $min^{-1}$ methanol flow. The effluent was directed immediately to knockout pots for collection. A total of twelve 5 g beds of poplar were used to produce 5.5 L of solvolysis liquor.

Batch Solvolysis

Batch solvolysis was conducted in the same manner as batch RCF with two exceptions. No catalyst was loaded to the reactor and the headspace was purged with He but not charged with $H_2$. The resulting reaction pressure at 225° C. was approximately 62.5 bar.

Flow Hydrogenolysis

Ex situ hydrogenolysis experiments were conducted by loading the catalyst bed as described for in situ RCF. However, instead of loading the biomass beds, the HPLC pump was used to deliver 2 mL $min^{-1}$ of ex situ solvolysis liquor once the catalyst bed has reached 225° C. This feed continued for 3 hours with sampling every 30 minutes as described above. At the three hour mark, the feed was changed from ex situ solvolysis liquor to fresh methanol, which was fed for an additional 2 hours to ensure all residual solvolysis liquor was flushed through the reactor. Lignin content for these reactions were calculated based on the difference between the initial and final mass of the solvolysis feed times the equivalent biomass lignin content per unit volume of solvolysis liquor.

Batch Hydrogenolysis

For ex situ batch hydrogenolysis, 23.76 g solvolysis liquor was loaded into the Parr reactors, along with 50 mg 15% Ni/C. The reaction was then conducted as described for batch in situ RCF.

Solvolysis Liquor Aging Study

As-Made

The 5.5 L of solvolysis liquor produced in batch were combined in a 20 L translucent LDPE container. This container was stored, sealed, and placed in secondary containment in a walk-in hood at ambient temperature and pressure. Samples were taken from this container at subsequent aging time points to test in either batch or flow hydrogenolysis experiments.

Reconstituted

To make the reconstituted liquor, 23.76 g aliquots of solvolysis oil was dried by rotary evaporation and stored in clear glass vials at room temperature. To prepare the samples for hydrogenolysis, each was brought up in enough MeOH to have a final mass of 23.76 g. This sample was then run according to the batch hydrogenolysis procedure.

GC-FID Analysis

A 200 μL aliquot from each sample was diluted 1:1 with 2 g/L 1,3,5-tri-tert-butylbenzene (Sigma Aldrich 97%) as an internal standard. Linear calibrations were created for each hydrogenolysis monomer using authentic standards. All available standards were purchased from Sigma Aldrich. 4-propenylsyringol was purchased from AKos GmbH. Several standards, 4-(3-methoxy)propylguaiacol, 4-propylsyringol, 4-(3-methoxy)propylsyringol, and 4-propanolsyringol, were synthesized in house (vida infra) and purity was verified by $^1$H NMR spectroscopy and GC-MS (data not shown).

Due to the low absolute concentration of monomers in the final hydrogenolysis liquor, the variability of quantification across multiple calibration curves was high. Accordingly, we utilized one calibration curve injected shortly after all standards were synthesized. Calibration verification standards (CVSs) were used to verify that no instrument drift occurred over the course of this study. Freshly injected CVSs proved to be stable over the time of this study, excluding 4-propenylsyringol which appears to degrade rapidly.

Compositional Analysis

Compositional analysis on the solids followed the NREL Laboratory Analytical Procedure (LAP). Due to a small quantity of sample, this procedure was scaled down to 100 mg opposed to 300 mg as stated in the LAP. Sulfuric acid and water volumes were also scaled down proportionally.

Monomer Synthesis

1

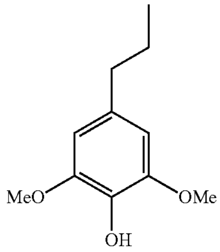

2

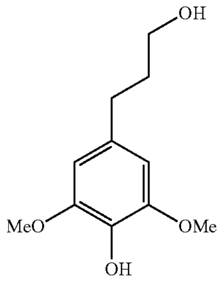

3

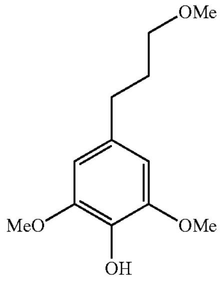

-continued

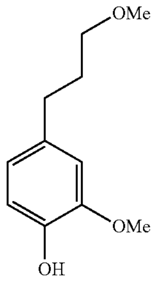

4

4-Propylsyringol (1)

10 wt % Pd/C (0.38 g) was added to a solution of 4-allylsyringol (2.62 g, 13.5 mM) in methanol (6 mL). The reaction mixture was kept stirring under $H_2$ atmosphere. After 19 hours, the Pd/C catalyst was removed by filtration. The solvent in the filtration was then removed by a rotary evaporator. Crude product was purified by flash chromatography (Teledyne CombiFlash equipped with Teledyne 80 and 120 g prepared column) with EtOAc-hexane (1:4) as an eluent to isolate 4-propylsyringol (1) (2.30 g, 86.8 mol %).

4-Propanolsyringol (2)

$BH_3$ (10.6 mM) was added dropwise over 0.5 hour at 0° C. to a solution of 4-allylsyringol (1.91 g, 9.83 mM) in THF (90 mL). After stirring the mixture for 2.5 hours, $H_2O$ (3.8 mL) was added slowly to quench the reaction. NaOH aq (3 M, 4.71 mL) and $H_2O_2$ aq (30 wt %, 2.74 mL) were added at the same temperature. After 1.0 hour stirring, HCl (3 M) was added to acidify the reaction mixture. The product was then extracted with EtOAc (4×60 mL), washed with brine and dried under $Na_2SO_4$. Following evaporation of the solvent, the residue was purified by a flash chromatography to obtain 4-propanolsyringol (2) (1.14 g, 54.7 mol %).

4-(3-Methoxy)-propylsyringol (3)

Compound 3 was prepared from compound (2) in 3 steps. In the first step, BnBr (0.17 mL, 1.41 mM) and $K_2CO_3$ (0.52 g, 3.77 mM) were added at ambient temperature to a solution of 4-propanolsyringol (2) (0.2 g, 0.94 mM) in DMF (2 mL). After stirring the contents for 12 hours, the reaction solution was diluted with $H_2O$ (20 mL) and then acidified with 3 M HCl. The reaction mixture was then extracted with EtOAc (3×30 mL), washed with brine and dried under $Na_2SO_4$. The solvent was removed by evaporation, and then the residue was purified by preparative TLC with EtOAc-hexane (1:1) to produce 3-(4-O-benzyl-3,5-dimethoxyphenyl)-1-propanol (5) (0.11 g, 39.0 mol %). In the second step, iodomethane (0.4 mL, 6.26 mM) and silver oxide (I) (174 mg, 0.75 mM) were added at ambient temperature to a solution of compound (5) (94.6 mg, 0.31 mM) in acetonitrile (10 mL). After stirring the contents at 70° C. for 29 hours, silver oxide was removed by filtration. The filtrate was diluted with $H_2O$ (30 mL) and then extracted with EtOAc. The solid residue was purified by a p-TLC to obtain 3-(4-O-benzyl-3,5-dimethoxyphenyl)-1-methoxypropanol (6) (76.8 mg, 77.6 mol %). In the third step, 10 wt % Pd/C (30 mg) was added and then the reaction mixture was kept stirring under $H_2$ atmosphere to a solution of compound (6) (75.0 mg, 0.24 mM). After 2.5 hours, the Pd/C catalyst was removed by filtration. The solvent in the filtration was removed under reduced pressure. The solid residue was purified by a p-TLC to isolate 4-(3-methoxy)-propylsyringol (3) (27.0 mg, 50.3 mol %).

4-(3-Methoxy)-propylguaiacol (4)

Compound (4) was prepared from eugenol in 4 steps. In the first steps, $BH_3$ (60 mM) was added dropwise over 1 hour at 0° C. to a solution of eugenol (7.78 g, 46.9 mM) in THF (50 mL). After stirring the contents for 1.5 hours, $H_2O$ (8 mL) was added slowly, and then NaOH aq (3 M, 20 mL) and $H_2O_2$ aq (30 wt %, 20 mL) were added at the same temperature. After 1.5 hours stirring, HCl (3 M) was added to acidify the reaction mixture which was then extracted with EtOAc (3×100 mL), washed with brine and dried under $Na_2SO_4$. After removal of the solvent by evaporation, the residue was purified by flash chromatography to obtain 4-propanolguaiacol (7) (2.61 g, 30.3 mol %). In the second step, BnBr (0.24 mL, 1.99 mM) and $K_2CO_3$ (1.14 g, 8.25 mM) were added at 0° C. to a solution of compound (7) (0.3 g, 1.65 mM) in DMF (3 mL). After stirring the contents for 44 hours, $K_2CO_3$ was removed by filtration. The reaction mixture was extracted with EtOAc, washed with brine and dried under $Na_2SO_4$. The solvent was removed by evaporation, and then the residue was purified by a preparative TLC with EtOAc-hexane (1:1) to produce 3-(4-O-benzyl-3-methoxyphenyl)-1-propanol (8) (0.32 g, 71.0 mol %). In the third step, iodomethane (0.12 mL, 2.0 mM) and silver oxide (I) (54.2 mg, 0.23 mM) were added to a solution of compound (8) (53.0 mg, 0.20 mM) in acetonitrile (7 mL). After refluxing for 23 hours, silver oxide was removed by filtration. The filtrate was acidified with 1 N HCl and then extracted with EtOAc. The solid residue was purified by a p-TLC to obtain 3-(4-O-benzyl-3-methoxyphenyl)-1-methoxypropanol (9) (36.3 mg, 65.2 mol %). In the fourth step, the product from step three was dissolved in methanol (2 mL) and stirred with 10% Pd/C (30 mg) under $H_2$ atmosphere. After 2.5 hours, the Pd/C catalyst was removed by filtration. The solvent in the filtration was removed under reduced pressure to yield 4-(3-methoxy)-propylguaiacol (4) (23.1 mg, 93.6 mol %).

2D HSQC NMR Spectroscopy

Heteronuclear single quantum coherence (HSQC) NMR spectra were acquired on 6 mL aliquots of solvolysis and hydrogenolysis liquors dried to oils and solubilized in 500 μL acetone-$d_6$ at 25° C. on a Bruker Avance III 600 MHz spectrometer at 11.7 T using a room temperature broadband probe. Spectra were acquired with 1,024 points and a SW of 12 ppm in the F2 ($^1H$) dimension and 128 points and SW of 220 ppm in the F1 ($^{13}C$) dimension using a standard phase sensitive, gradient selected pulse sequence. Native poplar biomass was prepared as describe previously (Happs et al 2021). Briefly, spectra were acquired on 50 mgs of ball milled sample dissolved in DMSO-d6 and pyridine-d5 (4:1, 500 μL) at 25° C. on a Bruker Avance Neo 300 MHz spectrometer at 7.05 T with a room-temperature broadband probe using a standard adiabatic HSQC pulse sequence.

Gel Permeation Chromatography

An appropriate amount of solvolysis or hydrogenolysis liquor was dried down to produce 15-20 mg of oil. Samples are then acetylated using 0.5 mL pyridine (Sigma-Aldrich anhydrous 99.8%) and 0.5 mL of acetic anhydride (Sigma-Aldrich reagent plus ≥99%) sealed and heated to 40° C. for 24 hours while stirring. Subsequently, 1 mL aliquots of methanol were then added to each sample and dried under $N_2$. This was repeated five times. Samples are then dried under vacuum at 40° C. overnight. Samples are then diluted in THF and stirred for 30 minutes. The THF solution is filtered through a 0.2 μm syringe filter into an HPLC vial. 20 μL of sample is injected on an HPLC fitted with three PLgel 7.5×300 mm columns in series: 10 μm×50 Å, 10 μm×$10^3$ Å, 10 μm×$10^4$ Å (Agilent Technologies, Stockport, UK) at ambient temperature with an isocratic 1 mL $min^{-1}$100% tetrahydrofuran (Sigma-Aldrich inhibitor-free ≥99.9%) for 45 minutes. Analytes are monitored at 210 nm, 260 nm, and 270 nm on the DAD.

Example 2—Multi-Pass Flow-Through Reductive Catalytic Fractionation

As described herein, Reductive catalytic fractionation (RCF) is a prevalent lignin-first biorefining technique, wherein lignin is extracted from native biomass with a polar protic solvent and ether and ester bonds are cleaved in the presence of a metal catalyst and a hydrogen source to generate stable aromatic monomers and C≡C linked oligomers. RCF processes in batch reactors can produce lignin oil with near-theoretical maximum yields of lignin-derived monomers based on the C—O—C inter-unit bond content of the substrate and a carbohydrate-rich pulp with high polysaccharide retention. However, batch reactions commonly mix the catalyst and biomass physically, thus complicating studies of solvolysis and catalysis as well as catalyst recovery from the pulp. Recently, several groups demonstrated flow-through (FT)-RCF processes, wherein the biomass and catalyst are packed into separate beds and a protic solvent is flowed over the biomass bed to extract lignin and send the solubilized lignin fragments to a catalyst bed for reductive stabilization. FT-RCF resolves the catalyst and pulp separation problem and enables intrinsic kinetic studies while achieving comparable lignin monomer yields and carbohydrate retention as batch RCF.

Figure 9:
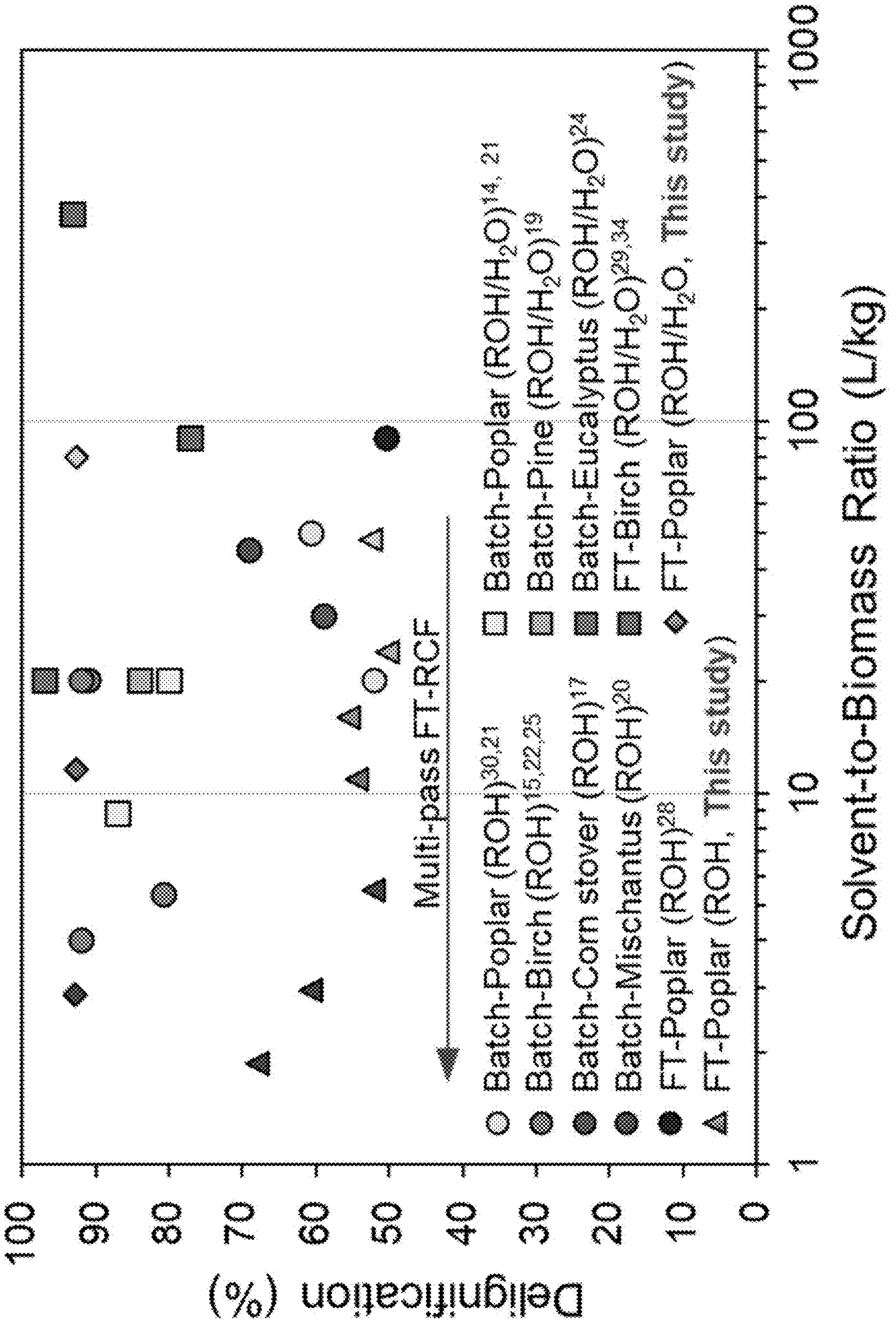
FIG. 9 compares delignification percentage of different feed materials to solvent to biomass ratio. The systems and methods described herein are marked as "This study."

For any RCF process configuration at scale, a key challenge is high solvent usage, which for FT-RCF has ranged between 90 and 360 L solvent/kg biomass. These values are drastically higher compared to those traditionally obtained in batch reactors, which range between 4 and 50 L solvent/kg biomass (FIG. 9, Table 5). High solvent usage substantially increases the energy demand, capital costs, and operating costs of the process. In batch RCF, the impact of reduced solvent loadings have been examined, wherein they varied the solvent-to-biomass ratio from 4 L/kg to 20 L/kg for batch RCF of birch in methanol and confirmed similar delignification and monomer yields regardless of the tested solvent loadings. Additionally, others have recirculated the product and solvent mixture multiple times to reduce solvent usage for solubilization of birch bark in a batch system. Three consecutive recycles of the solubilized bark and solvent reduced the solvent-to-biomass ratio from 10 L/kg to 3.3 L/kg, which did not affect the solubilization efficiency of new portions of bark. Recent process modelling and life cycle assessment from our group estimated that reducing solvent loading from 9 L/kg to 4 L/kg would reduce the overall energy demand for the RCF process by 15% and the minimum selling price of RCF oil by 20%. Additionally, this extent of solvent loading reduction would result in a net negative greenhouse gas (GHG) process, wherein the potential for GHG uptake in growing biomass is greater than GHG emissions in the RCF process. However, the high solids content (26%) at a solvent loading of 4 L/kg in a batch system approaches the intrinsic limit of lignin extraction due to mass transfer limitations.

TABLE 5

Solvent usage in previous RFC studies

| No. | Rxn type | Biomass (g) | Solvent (mL) | Solvent/bio mass (L/kg) | Delignification (%)[a] | Catalyst (g) | Reaction conditions |
|---|---|---|---|---|---|---|---|
| 1 | Batch | Poplar (1) | Methanol (50) | 50 | 61 | 15 wt % Ni/C (0.2) | 30 bar $H_2$, 200° C., 700 rpm, 1 h |
| 2 | | Miscanthus (1) | Methanol (45) | 45 | 69 | 15 wt % Ni/C (0.15) | 35 bar $H_2$, 225° C., 12 h |
| 3 | | Corn stover (1) | Methanol (30) | 30 | 59 | 5 wt % Ru/C (0.1) | 30 bar $H_2$, 200/250° C., 1000 rpm, 6 h |
| 4 | | Birch (2) | Methanol (40) | 20 | 91[c] | 21% Ni-$Al_2O_3$ (0.2) | 30 bar $H_2$, 250° C., 750 rpm, 6 h |
| 5 | | Poplar (2) | Methanol/Water (40) | 20 | 80[c] | 5 wt % Pd/C (0.2) | 30 bar $H_2$, 200° C., 750 rpm, 6 h |
| 6 | | Poplar (2) | Methanol (40) | 20 | 52[c] | 5 wt % Pd/C (0.2) | 30 bar $H_2$, 200° C., 750 rpm, 6 h |
| 7 | | Eucalyptus (2) | n-Butanol/Water (1:1 v/v, 40 mL) | 20 | 97 | 5 wt % Pd/C (0.2) | 30 bar $H_2$, 200° C., 750 rpm, 6 h |
| 8 | | Pine (10) | Ethanol/Water (1:1 v/v, 200 mL) | 20 | 84[b] | Pd/C (5 mol %) | 210° C., 15 h, 700 rpm |
| 9 | | Birch (2) | Methanol (40) | 20 | 92[c] | 5 wt % Ru/C (0.3) | 30 bar $H_2$, 250° C., 700 rpm, 3 h |
| 10 | | Poplar (16) | 2-Propanol/ Water (7:3 v/v, 140 mL) | 8.8 | 87[b] | Raney Ni (10) | 180-220C, 3 h |

TABLE 5-continued

Solvent usage in previous RFC studies

| No. | Rxn type | Biomass (g) | Solvent (mL) | Solvent/bio mass (L/kg) | Delignification (%)[a] | Catalyst (g) | Reaction conditions |
|---|---|---|---|---|---|---|---|
| 11 | | Birch (150) | Methanol (800) | 5.3 | 81[c] | 5 wt % Ru/C (1) | 30 bar $H_2$, 235° C., 720 rpm, 3 h |
| 12 | | Birch (60) | Methanol (240) | 4 | 92[c] | 5 wt % Ru/C (6) | 30 bar $H_2$, 250° C., 700 rpm, 3 h |
| 13 | | Poplar (1) | Methanol (90) | 90 | 50 | 15 wt % Ni/C (0.15) | 60 bar $H_2$ 50 sccm, feed 0.5 mL/min, 3 h, 180° C. |
| 14 | FT | Birch (0.15) | Methanol/Water (7:3 v/v, 54 mL), 2.8 g/L | 360 | 39[b] | 5 wt % Pd/C (0.15) | Feed 0.3 mL/min, 3 h, 180° C. (biomass bed), 200° C. (catalyst bed) |
| 15 | | Birch (1) | $H_3PO_4$ Ethanol/Water (9:1 v/v, 90 mL) | 90 | 77 | β-zeolite (2) | Feed 0.5 mL/min, 3 h, 220° C. |

[a]Calculated based on lignin oil and total lignin.
[b]Calculated using lignin residual in pulp instead of ignin oil.
[c]Calculated using Klason lignin (acid insoluble lignin) instead of total lignin.

In this example, we describe the concept of multi-pass FT as a means to study lignin oil recycling and solvent reduction in RCF processes. Reuse of FT-RCF effluent without additional separations, other than recovery of the gases including $H_2$, CO, and $CO_2$, could lead to a net solvent reduction on a per mass of biomass basis. Specifically, if effective, each pass through the FT-RCF system without lignin-solvent separation would increase the effective concentration of RCF-derived lignin oil in the solvent, thus decreasing the solvent-to-biomass ratio. Compared to reducing solvent loads in batch RCF, multi-pass FT-RCF enables reaching solvent-to-biomass ratio below 4 L/kg without the process challenges associated with slurries. Furthermore, this multi-pass concept could be extended to other RCF process configurations including batch reactions with a catalyst basket and truly continuous reactions.

Results

Figure 10:
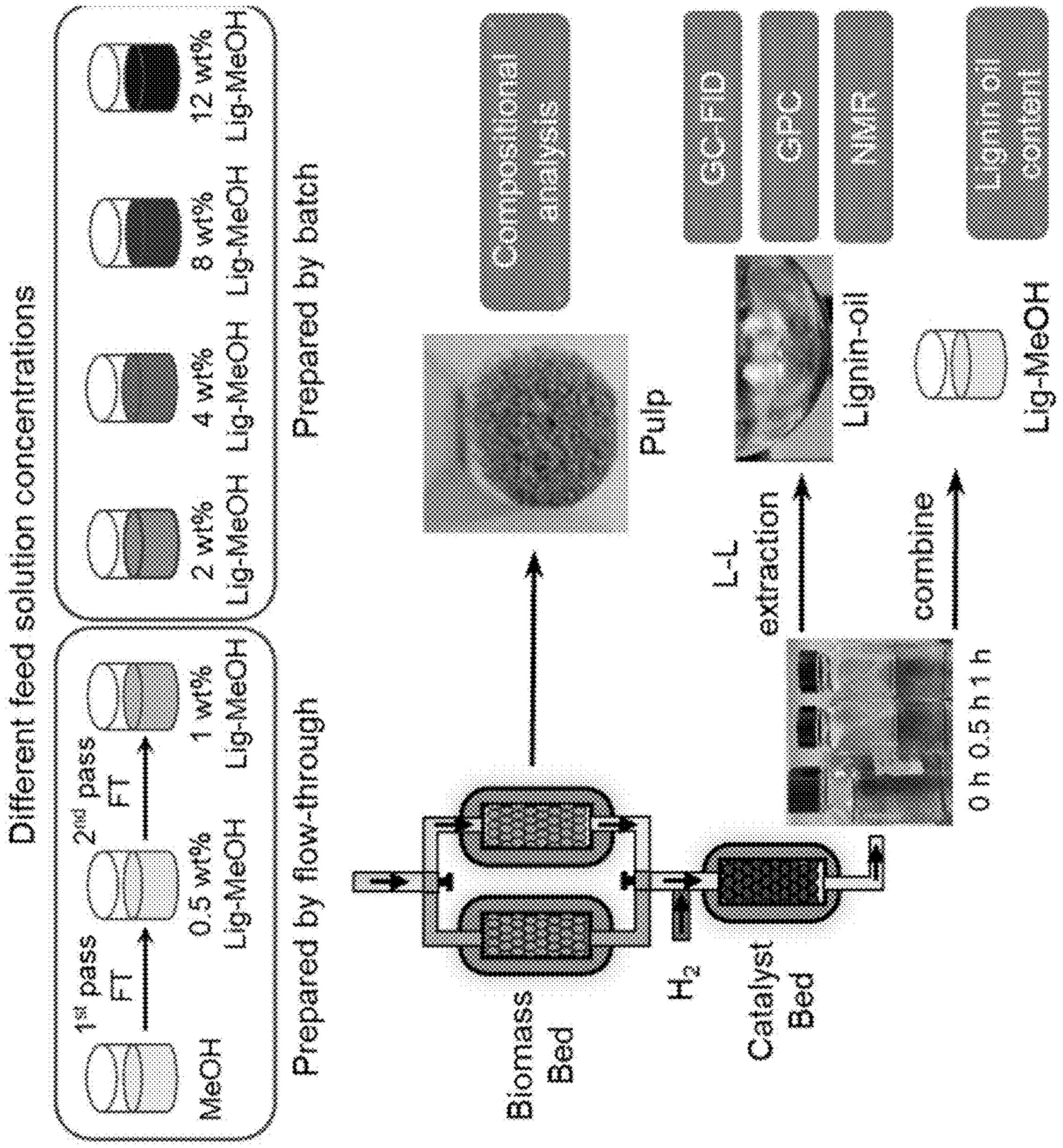
FIG. 10 provides examples of both batch and flow through configurations.
Figure 11:
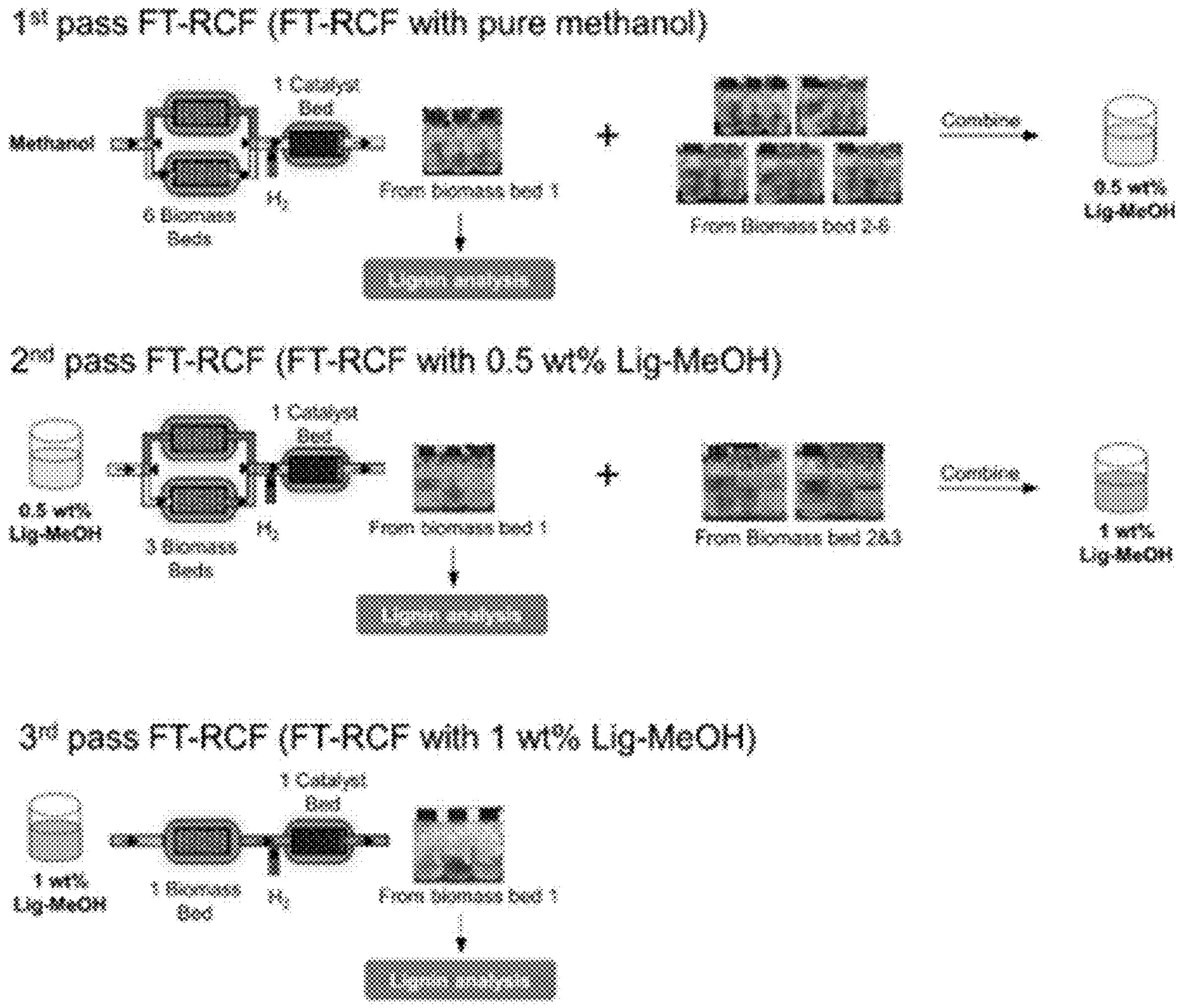
FIG. 11 provides an example of biomass produced in a flow through reactor as described in Example 2 and illustrates preparation of 0.5 and 1 wt % Lig-MeOH and FT-RCF reactions with the prepared feed solutions.
Figure 12:
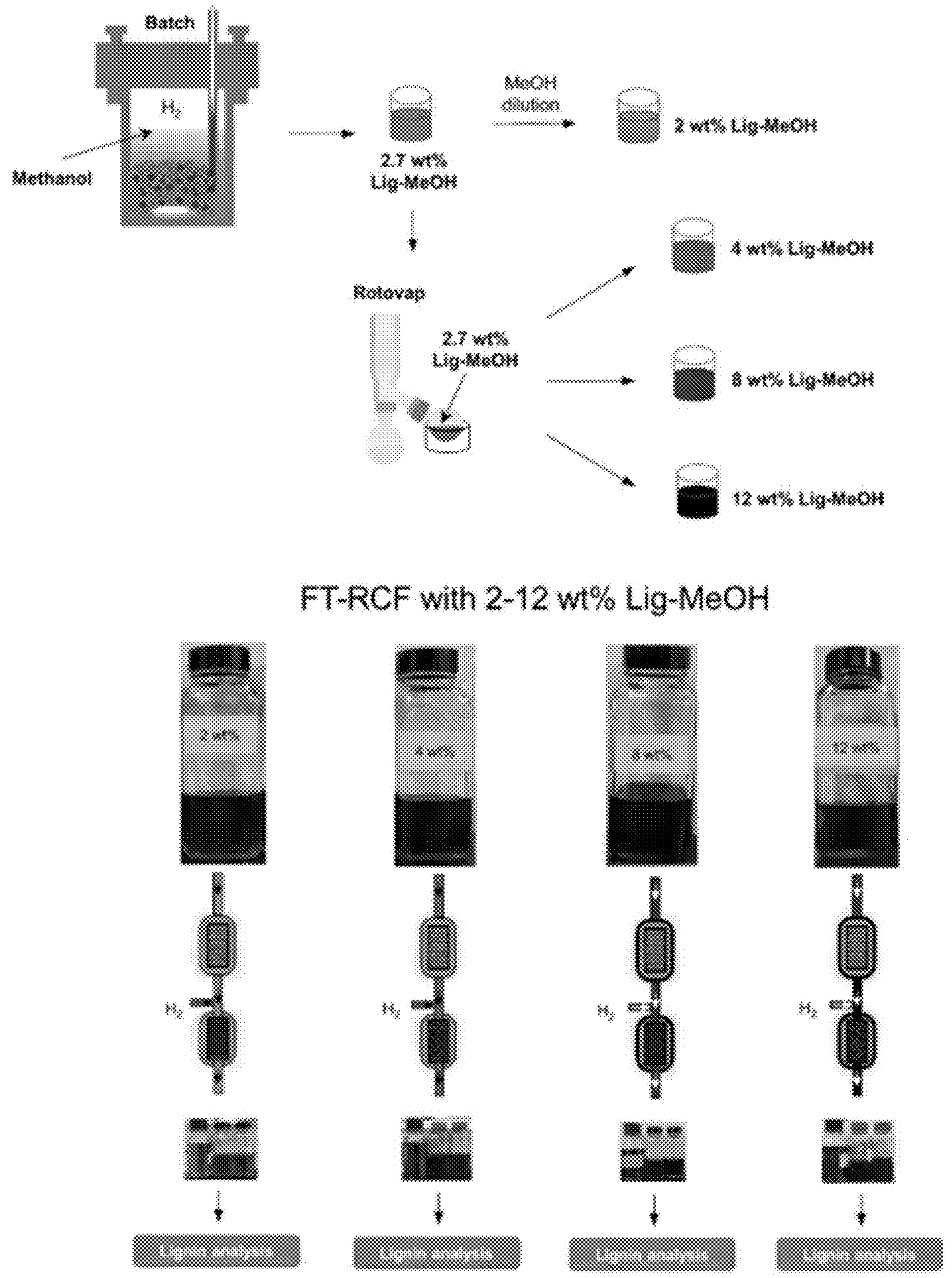
FIG. 12 provides an example of biomass produced in a batch reactor as described in Example 2 and illustrates preparation of 2-12 wt % Lig-MeOH and FT-RCF reactions with the prepared feed solutions.

To evaluate the ability to recycle lignin oil using the multi-pass FT-RCF concept, we first prepared seven feed solutions of varying lignin oil concentration from 0-12 wt %, conducted tandem solvolysis and catalysis reactions with the feed solutions in a FT reactor, and characterized the lignin oil and pulp from each FT-RCF reaction (FIGS. 10-12). For all flow reactions, we used a custom-built flow reactor, which consists of two biomass beds (5/8" ID) and one catalyst bed (9/32" ID). For each experiment, we packed 5 g of hybrid poplar (26% lignin) and 0.9-1.2 g of 15 wt % Ni/C in the biomass and catalyst beds, respectively. The tandem solvolysis and catalysis reactions were conducted at 225° C. in flowing methanol or a lignin oil-containing methanol solution (denoted hereafter as "Lig-MeOH") as a solvent. All experiments and analyses were conducted in duplicate and the error bars in figures are the range of duplicates, unless stated otherwise.

Figure 13:
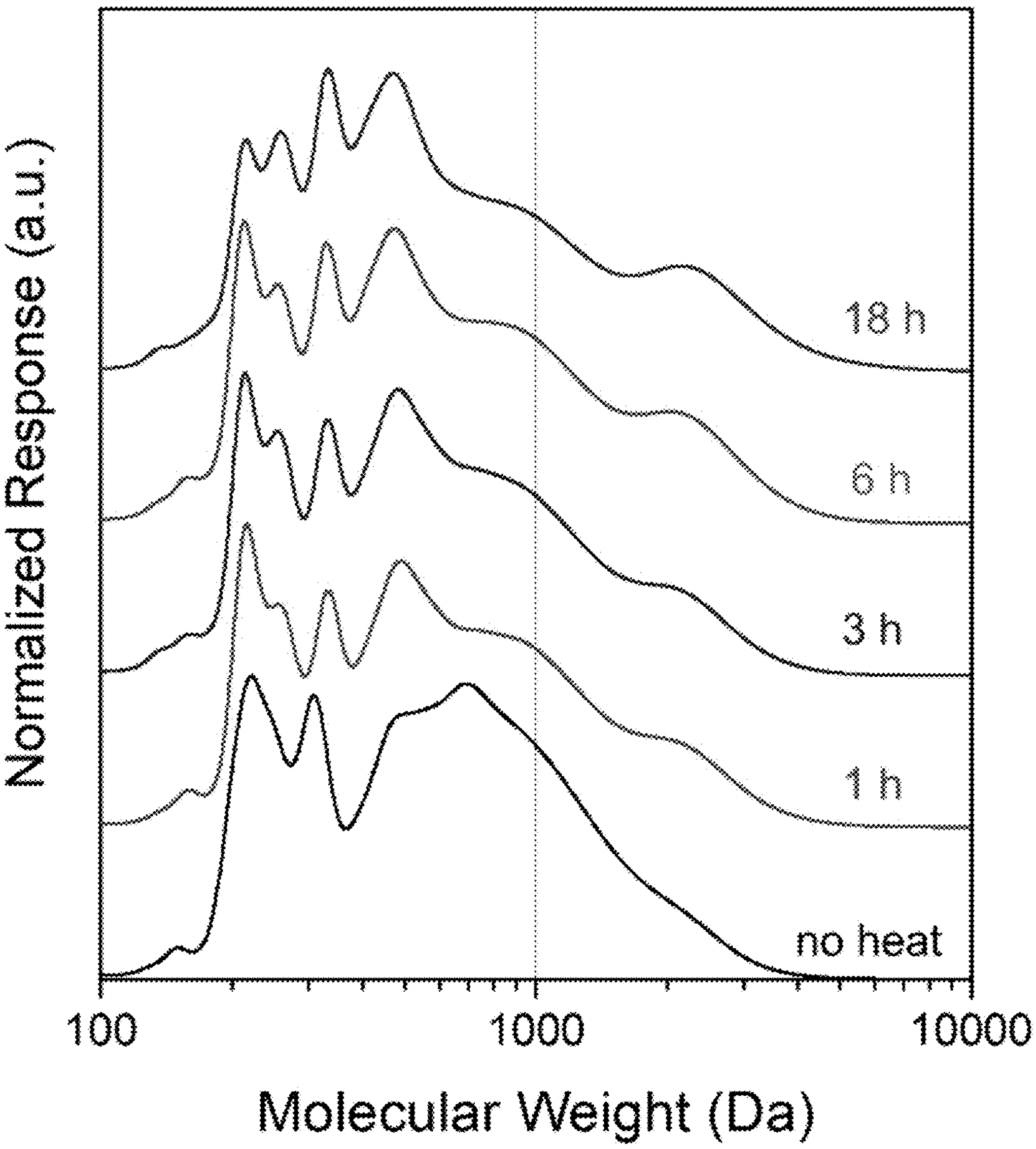
FIG. 13 shows changes in GPC traces of the isolated lignin oil from FT-RCF of poplar after heating at 225° C. The 'no heat' sample is 1 wt % Lig-MeOH prepared by two consecutive FT passes. Heating conditions: 30 mL of 1 wt % Lig-MeOH in a pressurized reactor at 225° C. To investigate the stability of lignin oil at the reaction temperature of 225° C., 30 mL of 1 wt % Lig-MeOH solution, prepared by two consecutive FT-RCF reactions of poplar, was heated to 225° C. in a pressurized vessel for different times (1, 3, 6, or 18 h). The heating time started after 30 min the heating ramp from room temperature to 225° C. After the vessels were cooled, the treated liquid samples underwent solvent removal and L-L extraction and the isolated lignin was characterized with GPC.

Thermal stability of lignin oil. In a multi-pass FT-RCF process, the lignin oil obtained from a typical RCF experiment, including monomers, dimers, and oligomers as well as solvent and any extracted carbohydrates extracted from the biomass and stabilized in the metal catalyst are recycled without further modifications and contacted with a new biomass bed in a subsequent cycle. Thus, first understanding the stability of the lignin components in the RCF effluent at the reaction temperature (here, 225° C.) is important to ensure that no deleterious reactions can impart yield losses. To examine this, we first prepared stabilized lignin oil in methanol via FT-RCF of poplar and heated the lignin-rich solution to 225° C. in a pressurized batch reactor. Gel permeation chromatography (GPC) traces were collected as a function of time at 225° C. In the first hour, modifications were observed in the molecular weight (MW) range of 600-1,500 Da, with an increasing trimer peak (470 Da) and higher MW oligomers (1,500-4,000 Da). Then, the GPC traces were mostly invariant until 6 h (FIG. 13), and slight changes in the low molecular weight peaks were apparent only after 18 h. The reactor operating conditions here resulted in a residence time of 40 minutes, such that the lignin components in RCF solution will be stable across multiple passes in the FT reactor.

Single-pass FT-RCF with methanol. As a first step, we conducted single-pass FT-RCF with methanol (denoted "1$^{st}$ pass FT-RCF"), which selectively extracted lignin from the biomass and exhibited an expected time profile of cumulative monomer production and delignification (experiments with MeOH in FIG. 14). With a fixed amount of biomass, lignin extraction rates and the resulting lignin oil concentration in the effluent decreased as the reaction time increased (FIG. 15). Thus, to prepare a more concentrated lignin oil solution for the purposes of testing the multi-pass FT-RCF concept, we stopped the reaction at 1 h. We note that the 1 h time for delignification was chosen for experimental convenience, and as described below, we also ran several additional experiments with higher delignification extents.

Pooled samples were collected at the 0 h timepoint (sampled when the beds reached reaction temperature after a 1 h heating ramp), 0.5 h, and 1 h and were subjected to solvent removal and liquid-liquid extraction to isolate lignin oil from methanol and any extracted carbohydrates. Based on the mass of the collected sample and the isolated lignin oil, the lignin oil concentration of each sample was calculated and shown in FIG. 14 (Top). The higher lignin oil concentration of the 0.5 h sample (0.65±0.02 wt %) compared to those of the 0 and 1 h samples (0.28±0.01 and 0.29±0.01 wt %, respectively) indicates a higher lignin extraction rate in the first half-hour at 225° C. (FIG. 14 (Top), Table 6). The cumulative delignification, which is equivalent to lignin oil yield, during the 1 h heating ramp and the 1 h run reached 54.0±0.9%. The average lignin oil concentration of the collected samples was 0.38 wt %. We note that while a 3 h reaction reached 63% cumulative delignification, the average lignin oil concentration decreased to 0.22 wt % (FIG. 15).

catalyst bed (denoted as "0.5 wt % Lig-MeOH", detailed in FIG. 11). We used this product as a solvent in the FT-RCF reactor with fresh poplar and fresh catalyst for a second pass (denoted as the "2$^{nd}$ pass FT-RCF"). Compared to the lignin oil concentration from a single run of the 1$^{st}$ pass FT-RCF (i.e., 0.38 wt %), consecutive runs resulted in a higher lignin oil concentration because the remainder of Lig-MeOH in the reactor system between runs was collected in the subsequent run. It is worth noting that the 0.5 wt % Lig-MeOH did not undergo separation, thus it included lignin monomers and oligomers, soluble sugars, acetate, water, and extractives from biomass during the 1$^{st}$ pass.

TABLE 6

Lignin oil concentration, cumulative delignification, monomer concentration, and incremental monomer mass fraction from FT-RCF reactions of poplar with various feed concentrations. Table 6 is related to FIG. 14.

| Sample | | | Lignin oil concentration (wt %)[a] | Cumulative delignification (%)[b] | Monomer Conc. (wt %)[c] | Incremental monomer mass fraction (%)[d] | Est. solvent/biomass (L/kg)[e] |
|---|---|---|---|---|---|---|---|
| MeOH | Post | 0 h | 0.28 ± 0.01 | 21.72 ± 1.89 | 0.14 ± 0.01 | 0.077 ± 0.008 | |
| | RCF | 0.5 h | 0.65 ± 0.02 | 44.27 ± 0.40 | 0.22 ± 0.02 | 0.129 ± 0.011 | 48.0 |
| | | 1 h | 0.29 ± 0.01 | 54.02 ± 0.93 | 0.08 ± 0.02 | 0.147 ± 0.011 | |
| 0.5 wt % | Feed | | 0.47 ± 0.02 | | 0.13 ± 0.004 | | 48.0 |
| Lig-MeOH | Post | | 0.70 ± 0.05 | 18.21 ± 5.56 | 0.25 ± 0.02 | 0.064 ± 0.01 | |
| | RCF | 0 h | 1.23 ± 0.12 | 45.19 ± 2.23 | 0.39 ± 0.02 | 0.128 ± 0.014 | 24.0 |
| | | 0.5 h | | | | | |
| | | 1 h | 0.66 ± 0.05 | 51.78 ± 4.30 | 0.23 ± 0.01 | 0.151 ± 0.012 | |
| 1 wt % | Feed | | 1.04 ± 0.05 | | 0.27 ± 0.02 | | 24.0 |
| Lig-MeOH | Post | 0 h | 1.27 ± 0.06 | 18.25 ± 1.05 | 0.37 ± 0.01 | 0.055 ± 0.03 | |
| | RCF | 0.5 h | 1.90 ± 0.03 | 48.85 ± 1.72 | 0.52 ± 0.03 | 0.117 ± 0.011 | 16.0 |
| | | 1 h | 1.28 ± 0.12 | 57.26 ± 0.82 | 0.36 ± 0.01 | 0.137 ± 0.014 | |
| 2 wt % | Feed | | 1.94 ± 0.13 | | 0.60 | | 14.1 |
| Lig-MeOH | Post | 0 h | 2.05 ± 0.01 | 8.95 ± 0.59 | 0.70 ± 0.02 | 0.054 ± 0.01 | |
| | RCF | 0.5 h | 2.88 ± 0.06 | 41.87 ± 1.06 | 0.88 ± 0.02 | 0.125 ± 0.001 | 10.9 |
| | | 1 h | 2.36 ± 0.01 | 56.04 ± 1.12 | 0.69 ± 0.006 | 0.145 ± 0.001 | |
| 4 wt % | Feed | | 4.27 ± 0.01 | | 1.10 | | 6.3 |
| Lig-MeOH | Post | 0 h | 4.28 ± 0.11 | 0.39 ± 9.03 | 1.16 ± 0.06 | 0.031 ± 0.034 | |
| | RCF | 0.5 h | 5.30 ± 0.25 | 37.01 ± 0.03 | 1.34 ± 0.06 | 0.088 ± 0.021 | 5.5 |
| | | 1 h | 4.70 ± 0.15 | 51.53 ± 5.06 | 1.21 ± 0.04 | 0.112 ± 0.012 | |
| 4 wt % | Feed | | 4.16 | | 1.15 | | 6.4 |
| Lig-MeOH | Post | 0 h | 4.17 ± 0.11 | 0.72 ± 8.71 | 1.21 ± 0.01 | 0.035 ± 0.003 | |
| high | RCF | 0.5 h | 5.35 ± 0.15 | 42.32 ± 4.03 | 1.46 ± 0.001 | 0.109 ± 0.01 | 5.7 |
| catalyst | | 1 h | 4.49 ± 0.01 | 53.76 ± 4.15 | 1.33 ± 0.00 | 0.151 ± 0.015 | |
| 8 wt % | Feed | | 8.17 | | 2.39 | | 3.1 |
| Lig-MeOH | Post | 0 h | 8.22 ± 0.12 | 3.79 ± 10.00 | 2.31 ± 0.03 | −0.021 ± 0.009 | |
| high | RCF | 0.5 h | 9.39 ± 0.24 | 47.10 ± 2.29 | 2.68 ± 0.05 | 0.04 ± 0.005 | 2.9 |
| catalyst | | 1 h | 8.60 ± 0.02 | 62.77 ± 3.46 | 2.59 ± 0.11 | 0.083 ± 0.014 | |
| 12 wt % | Feed | | 12.47 | | 4.29 | | 2.0 |
| Lig-MeOH | Post | 0 h | 12.03 ± 0.02 | −35.08 ± 1.22 | 4.19 ± 0.06 | −0.053 ± 0.032 | |
| high | RCF | 0.5 h | 14.01 ± 0.03 | 19.41 ± 0.08 | 4.75 ± 0.07 | 0.054 ± 0.051 | 1.9 |
| catalyst | | 1 h | 13.79 ± 0.07 | 67.88 ± 2.83 | 4.46 ± 0.006 | 0.096 ± 0.049 | |

Figure 14:
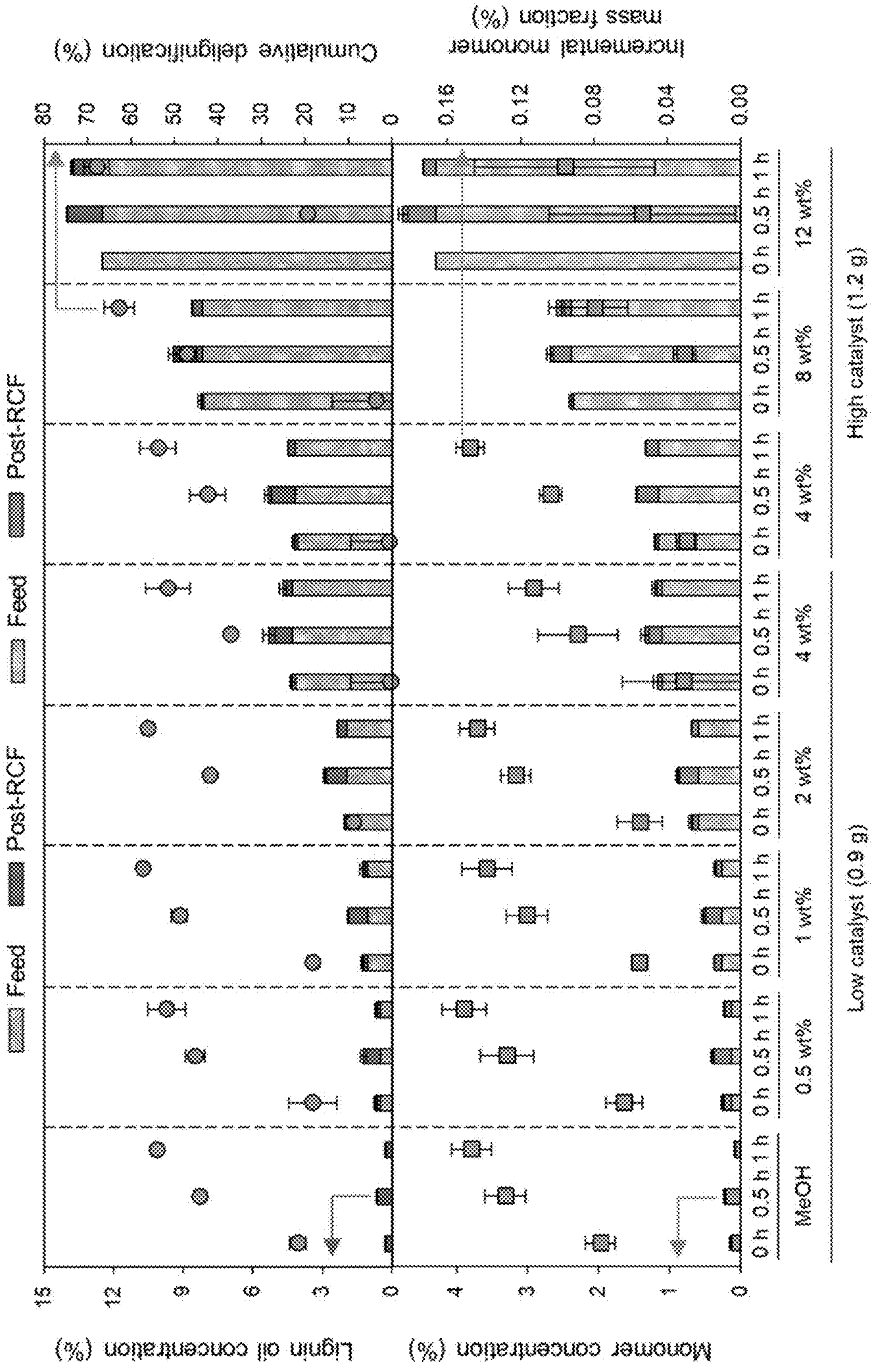
FIG. 14 provides the lignin oil concentration (top) and monomer concentration (bottom) as described in Example 2.
Figure 15:
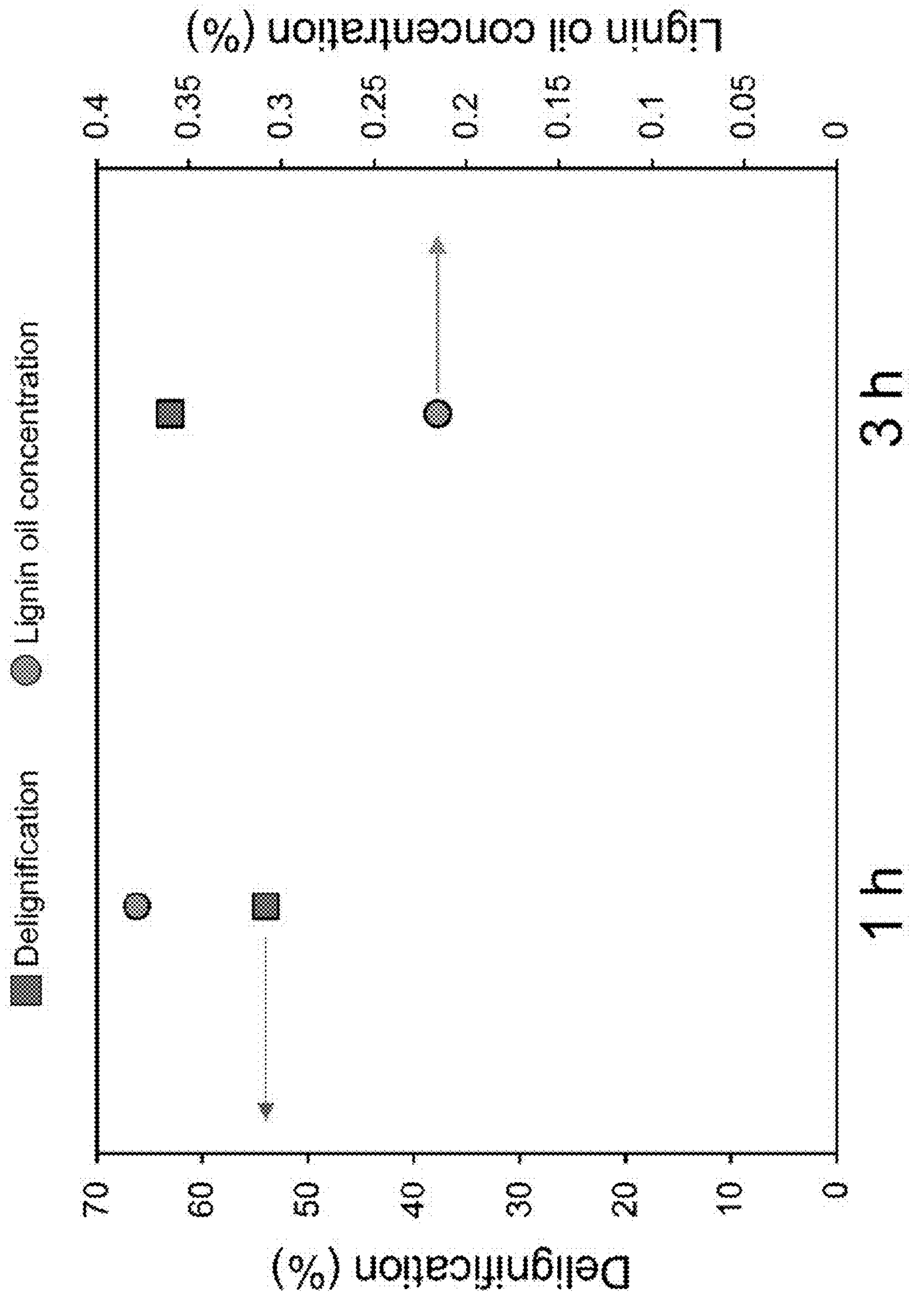
FIG. 15 illustrates the effect of time-on-stream on FT-RCF reactions of poplar and provides delignification and the resulting lignin oil concentration of single-pass RCF. Reaction conditions: 2 mL/min methanol, 5 g poplar, 0.9 g 15 wt % Ni/C (diluted with 2.1 g of fine fused silica), 1,600 psig, 200 sccm $H_2$ at 225° C. for 1 h or 3 h (with 1 h heating ramp).

The monomer concentration of the samples was analyzed by gas chromatography with flame ionization detection (GC-FID) and is shown in FIG. 14 (Bottom). Here, to track the monomers, we use a metric of "incremental monomer mass fraction", defined as the mass of monomers added by each experiment per total mass of product solution. In the case of FT-RCF with Lig-MeOH, monomers could be generated from the lignin oil solubilized in feed solution as well as from the fresh biomass. Thus, the metric of incremental monomer mass fraction reflects both monomers from the feed solution and from fresh biomass. We note that the commonly reported metric of monomer yield represents only monomers from fresh biomass. The incremental monomer mass fraction during the 1$^{st}$ pass FT-RCF was 0.147±0.011%. This value corresponds to a 22% monomer yield.

FT-RCF with 0.5 and 1 wt % feed solutions. To test the multi-pass FT-RCF concept, we produced 1.1 L of Lig-MeOH at a 0.47 wt % lignin oil concentration (0.13 wt % of monomers) by combining five consecutive 1$^{st}$ pass FT-RCF runs, switching biomass beds and maintaining the same The concentration values of the 0.5 wt % Lig-MeOH, 0.47 wt % of lignin oil and 0.13 wt % of monomers, were used as feed concentrations of the 2$^{nd}$ pass experiments (light patterned bars of experiments with the 0.5 wt % feed in FIG. 14). During the 2$^{nd}$ pass with the prepared 0.5 wt % Lig-MeOH feed, additional lignin oil was extracted from fresh poplar and depolymerized, leading to increased lignin oil and monomer concentrations. The increased lignin oil concentration from the feed concentration was used to estimate the cumulative delignification in this pass (51.8±4.3%). Importantly, the similar delignification extent in the 1$^{st}$ and 2$^{nd}$ passes are indicative of an equivalent solvolysis ability of the recycled methanol in 0.5 wt % Lig-MeOH relative to pure methanol. In addition, a similar temporal profile of the incremental monomer mass fraction suggests the same rate of depolymerization of the extracted lignin in methanol and 0.5 wt % Lig-MeOH. The incremental monomer mass fraction in the $2^{nd}$ pass FT-RCF was 0.151±0.012%.

Similarly, we conducted the 3rd pass FT-RCF with the 1 wt % Lig-MeOH feed including 1 wt % lignin oil and 0.27 wt % monomers, which was obtained from two consecutive runs of the $2^{nd}$ pass FT-RCF. The $3^{rd}$ pass FT-RCF achieved 57.3±0.8% cumulative delignification and 0.137±0.014% incremental monomer mass fraction with similar time profiles observed in the $1^{st}$ and $2^{nd\ passes}$. By using three consecutive passes, total solvent usage was reduced from 48 to 16 L solvent/kg biomass (Table 6).

FT-RCF with 2, 4, 8, and 12 wt % feed solutions. Inspired by the promising results of the three consecutive FT-RCF passes, we subsequently conducted FT-RCF with more concentrated feed solutions. Namely, 2, 4, 8, and 12 wt % Lig-MeOH feed solutions were prepared by diluting or concentrating 2.7 wt % Lig-MeOH that was collected from 3 L batch RCF reactions (FIG. 12).

Figure 16:
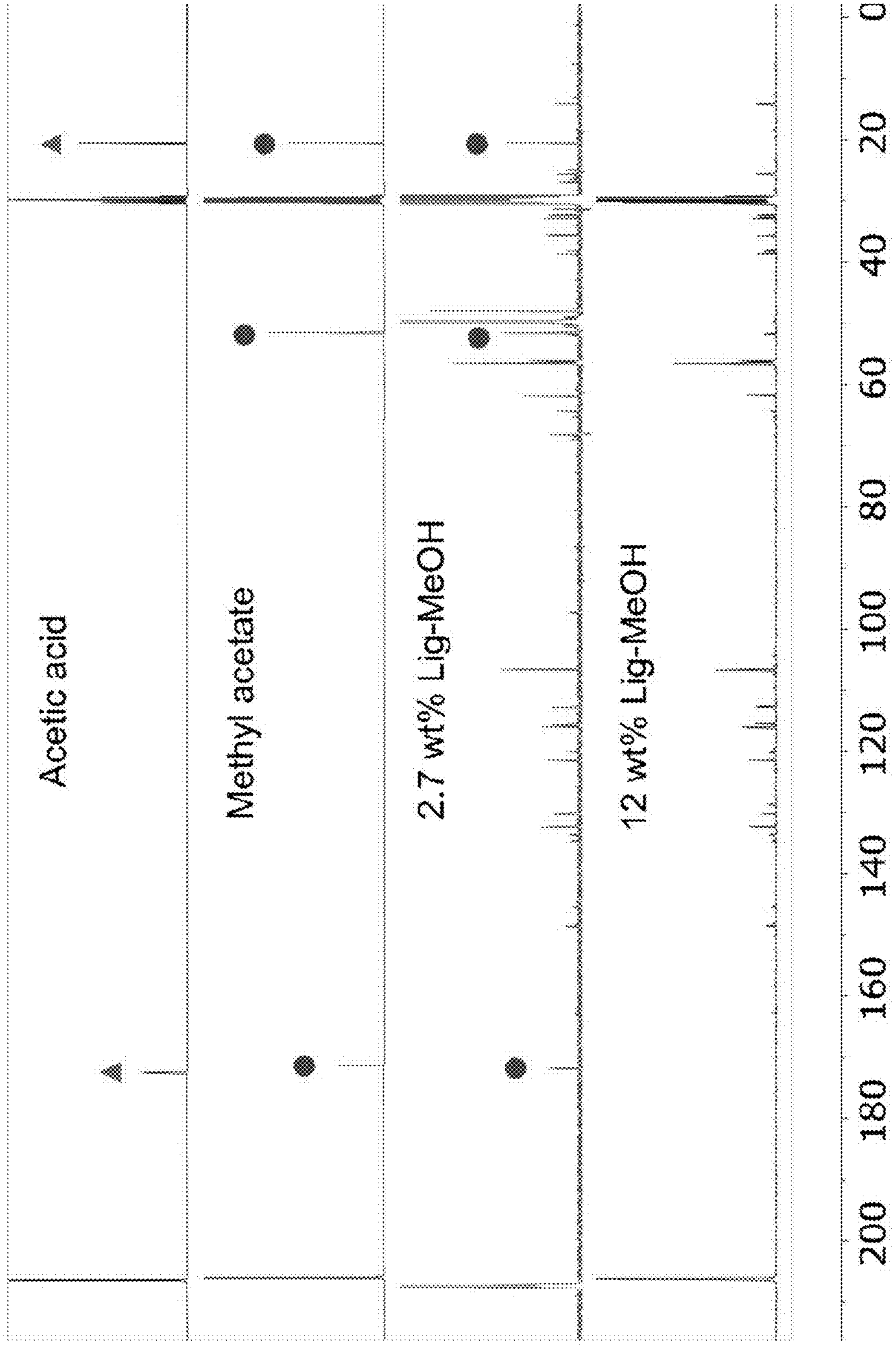
FIG. 16 provides $^{13}C$ NMR spectra of 2.7 and 12 wt % Lig-MeOH, acetic acid, and methyl acetate. Red circles represent methyl acetate peaks and blue triangles are acetic acid peaks. $^{13}C$ NMR methods are described in the SI methods section. RCF reaction extracts acetate in fresh poplar (FIG. 23). To investigate the existence of methyl acetate in the feed solutions, $^{13}C$ NMR was used with acetone-$d_6$ as a solvent. 3 L scale batch reaction produced 2.7 wt % Lig-MeOH and this solution includes methyl acetate. The acetates were not hydrolyzed to acetic acid. The methyl acetate was easily removed when 4-12 wt % Lig-MeOH feeds were prepared by concentrating the 2.7 wt % Lig-MeOH in a rotary evaporation.

Interestingly, FT-RCF reactions with the prepared 2 and 4 wt % solutions extracted lignin to a similar extent (56.0±1.1% and 51.5±5.1%, respectively), and reactions with 8 and 12 wt % solutions exhibited slightly higher delignification (62.8±3.5% and 67.9±2.8%, respectively). We posited that the improved delignification with higher feed concentrations could be due to accumulated components in the feed solutions, including carboxylic acids, extractives, and water, which may promote improved lignin extraction. Acetic acid extracted from hemicellulose was converted to methyl acetate in these conditions, and during the workup, we confirmed that methyl acetate dissolved in the 2.7 wt % Lig-MeOH was evaporated when the solution was concentrated to the 8 and 12 wt % Lig-MeOH (FIG. 16). Therefore, the increased delignification values at 8 and 12 wt % lignin in the feed solutions are likely not due to the presence of acetic acid and methyl acetate.

Higher lignin concentrations of the feed resulted in slightly different time profiles (orange circles in FIG. 14(Top)). Namely, when the concentration of the feed increased, delignification during the heating ramp (0 h sample) decreased. This effect might be due to the physical attachment of lignin components in the feed solution onto the biomass at low temperature. The attached lignin components could potentially then be released at reaction temperature, resulting in the sharp increase of lignin oil concentration in the 0.5 and 1 h samples and a similar cumulative delignification across the reaction duration.

In terms of the incremental monomer mass fraction, the FT-RCF reaction with 2 wt % Lig-MeOH exhibited a value of 0.145±0.001%, similar to those observed in FT-RCF reactions with 0-1 wt % Lig-MeOH (orange squares in FIG. 14(Bottom)). However, a lower incremental monomer mass fraction (0.112±0.012%) was observed with a 4 wt % feed solution while the delignification extent did not significantly change. We hypothesized that the reduced incremental monomer mass fraction was because the lignin oil in the feed solution competed for adsorption sites on the catalyst surface with lignin extracted from the biomass, thus inhibiting catalysis with the extracted lignin.

Overcoming catalyst-limited conditions in multi-pass FT-RCF. To avoid these catalyst-limited conditions, we increased the catalyst loading from 0.9 g to 1.2 g and repeated the FT-RCF reaction with the 4 wt % Lig-MeOH feed. The incremental monomer mass fraction reached 0.151±0.015%, demonstrating that a higher amount of catalyst is necessary to achieve a similar monomer production when using a higher concentration feed. Similarly, the 8 and 12 wt % lignin oil feeds resulted in only 0.083±0.014% and 0.096±0.049% incremental monomer mass fractions even with 1.2 g of catalyst. Due to physical limitations of our custom flow reactor system, catalyst loadings over 1.2 g could not be tested.

Figure 17A:
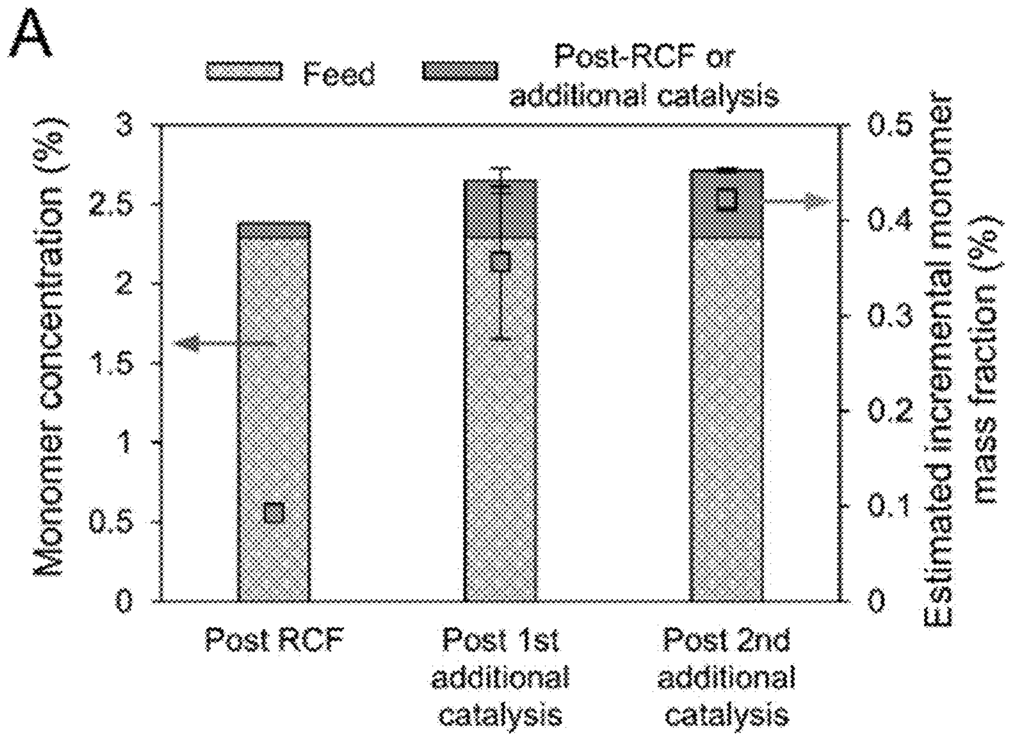
FIG. 17 shows monomer concentration and estimated incremental monomer mass fraction after FT-RCF or additional catalysis (FIG. 17A) and monomer selectivity of the 8 wt % Lig-MeOH, post FT-RCF, and post additional catalysis (FIG. 17B). FT-RCF reaction conditions: 2 mL/min 8 wt % Lig-MeOH, 5 g poplar, 1.2 g 15 wt % Ni/C, 1,600 psig, 200 sccm $H_2$ at 225° C. for 2 h (1 h heating ramp and 1 h run). Catalysis conditions: 2 mL/min the combined 8 wt % post RCF solution, 1.2 g 15 wt % Ni/C, 1,600 psig, 200 sccm $H_2$ at 225° C. All experiments were conducted in duplicate and the error bars in figures are the range of duplicates. FT-RCF of 8 wt % Lig-MeOH with high catalyst loading (1.2 g) exhibited 0.083±0.014% incremental monomer mass fraction, which was lower than the values of FT-RCF with lower feed concentrations (0-4 wt %). Here, we tested if the reduced incremental monomer mass fraction could increase with additional catalysis steps. First, the samples (0, 0.5, and 1 h) from FT-RCF of 8 wt % Lig-MeOH were combined. The monomer concentration of the combined solution was 2.38 wt %. 2 mL/min of the combined solution was fed to the preheated (225° C.) and pressurized (1,600 psig $H_2$) catalyst bed, packed with 1.2 g of fresh 15 wt % Ni/C and 2.8 g of fused silica, for 1 h with sampling every 30 min. The monomer concentration, analyzed with GC-FID, was 2.65±0.08 wt %. The remainder of the post-catalysis samples were combined and fed to the catalyst bed at 2 mL/min for 40 min with sampling every 20 min. The monomer concentration after two catalysis steps increased to 2.71±0.01 wt %. FT-RCF of the 8 wt % feed increased the monomer concentration from 2.29 wt % to 2.38 wt %, resulting in an incremental monomer mass fraction of 0.093%. To estimate incremental monomer mass fraction of post $1^{st}$ catalysis and post $2^{nd}$ catalysis, we assumed that each catalysis step produced the same mass of samples from FT-RCF (191 g) without loss for analysis.
Figure 18:
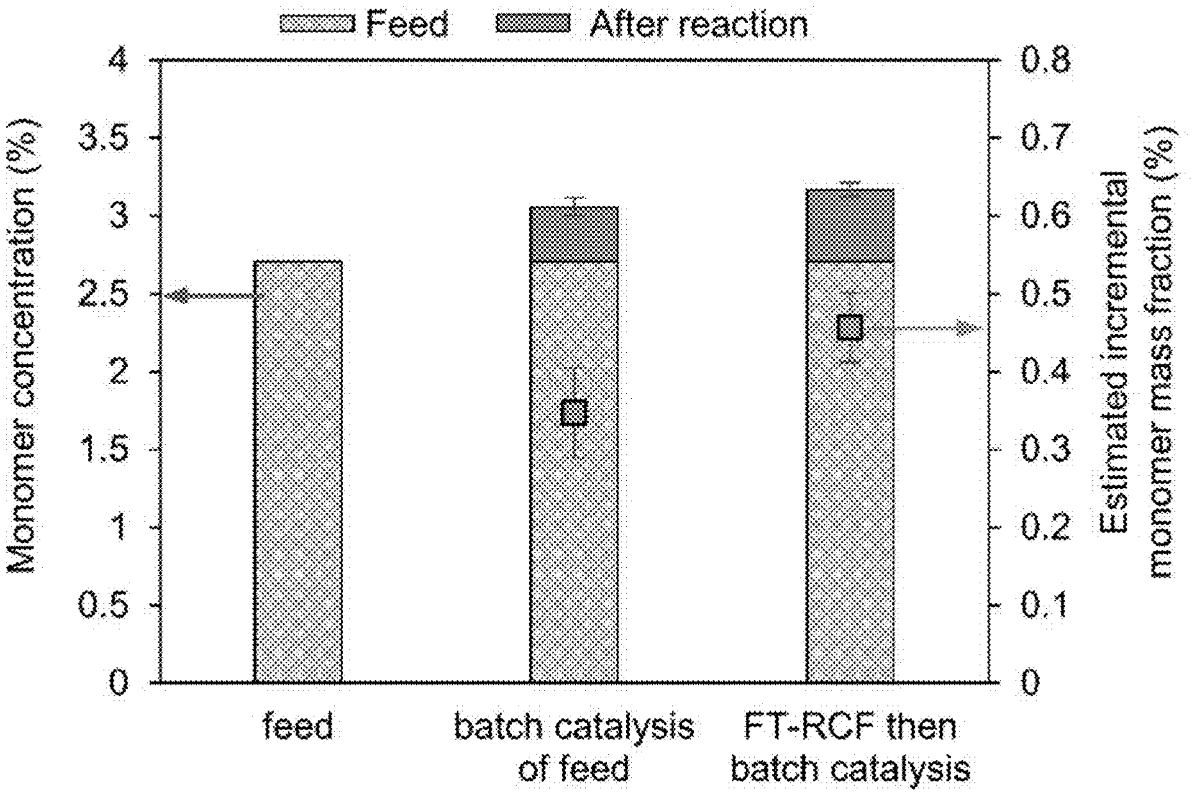
FIG. 18 provides monomer concentration and estimated incremental monomer mass fraction of the 8 wt % feed solution, post batch catalysis, and post FT-RCF/batch catalysis. Batch catalysis conditions: 30 mL of 8 wt % feed or post FT-RCF solution, 1.2 g 15 wt % Ni/C, 225° C. for 3.5 h (0.5 h heating ramp and 3 h run). FT-RCF reaction conditions: 2 mL/min 8 wt % feed, 5 g poplar, 1.2 g 15 wt % Ni/C, 1,600 psig, 200 sccm $H_2$ at 225° C. for 2 h (1 h heating ramp and 1 h run). All experiments were conducted in duplicate and the error bars in figures are the range of duplicates. The high incremental monomer mass fraction values after additional FT catalysis steps resulted from the cleavage of ether linkages in the feed, as well as depolymerization of lignin from fresh biomass. To prove this possibility, we conducted batch catalysis of the prepared 8 wt % feed solution. A new batch of 8 wt % feed solution exhibited 2.71 wt % monomer concentration. 30 mL of the feed solution and 1.2 g of 15 wt % Ni/C were added to a 75 mL Parr reactor with a magnetic stir bar. The reactor was sealed, purged, and pressure-tested with He at reaction pressure. Then, the reactor was pressurized with 30 bar of $H_2$. The reactor was heated to 225° C. (usually over 30 min) and held at temperature for 3 h, while stirring at 700 rpm. The reactor was quenched in a cold-water bath and cooled to room temperature. The liquid sample was filtered through 0.2 μm filter and analyzed with GC-FID. Batch catalysis increased the monomer concentration to 3.06±0.06 wt %, resulting in a 0.347±0.058% incremental monomer mass fraction. This suggests that the 8 wt % feed had significant amount of β-O-4 linked compounds, and the cleavage of the linkages contributed to the high incremental monomer mass fraction values from the multiple catalytic steps (FIG. 17). We also conducted batch catalysis of the post FT-RCF samples. After FT-RCF reaction with the 8 wt % feed and fresh poplar, the product solution underwent additional batch catalysis. The estimated incremental monomer mass fraction after FT-RCF and subsequent batch catalysis was 0.457±0.044%, agreeing with the value after FT-RCF and additional multiple FT-catalysis steps (0.422±0.012%).

Instead, the samples from FT-RCF with the 8 wt % feed were combined and flowed through two additional catalyst beds to test if the incremental monomer mass fraction increased. After the first additional catalysis step, the monomer concentration in the combined solution of post FT-RCF increased from 2.38 wt % to 2.65±0.08 wt % (FIG. 17A). Compared to 2.29 wt % monomer concentration of the 8 wt % feed, the estimated incremental monomer mass fraction was 0.356±0.08%. The second additional catalysis step slightly further increased the monomer concentration to 2.71±0.01 wt % and the estimated incremental monomer mass fraction to 0.422±0.012%. A similar value (0.457±0.044%) was observed when the FT-RCF samples underwent additional catalysis in a batch setup (FIG. 18).

The high estimated incremental monomer mass fraction values after additional catalysis might be attributed to the cleavage of β-O-4 bonds that were in the 8 wt % feed. The β-O-4 peaks in the 8 wt % feed that also remained after FT-RCF were significantly reduced after two additional catalysis steps via NMR analysis. Note that a hydrogenolysis reaction of the 8 wt % feed with fresh Ni/C in a batch setup exhibited 0.347±0.058% incremental monomer mass fraction (FIG. 18), indicating a significant amount of β-O-4 bonds in the 8 wt % feed. Thus, the cleavage of ether linkages in the feed, as well as depolymerization of lignin from fresh biomass, resulted in the high incremental monomer mass fraction values. This result indicates that higher catalyst loadings will be able to cleave C—O bonds both in the lignin extracted from the biomass and in the lignin oil solubilized in the feed solution.

Product distribution of monomers produced from multi-pass FT-RCF reactions. Lignin monomers produced via the $1^{st}$ pass FT-RCF with pure methanol consist mostly of propanol-substituted syringol and guaiacol, followed by propyl-substituted monomers and propenylguaiacol (MeOH RCF in FIG. 19). The 0.5 wt % Lig-MeOH solution, prepared via five consecutive $1^{st}$ pass FT-RCF runs with five biomass beds and one catalyst bed, includes more propenylguaiacol, likely because of catalyst deactivation as previously observed in FT-RCF reactions. Over the consecutive FT-RCF reactions with six fresh biomass beds and methanol, the catalyst was deactivated, evident from 1) the increase in propenyl chain monomers and 2) the decrease in the monomer mass fraction (FIG. 20A). When 0.5 wt % Lig-MeOH was used as a solvent, slightly more rapid catalyst deactivation was observed in the presence of lignin oil in the feed (FIG. 20B). The fraction of the unsaturated monomers in the 0.5 and 1 wt % feed was reduced after FT-RCF with fresh catalyst. This observation suggests that the catalyst reacts with lignin components in the feed as well as in the extracted lignin from fresh biomass. Except for the changes observed in propenylguaiacol, other monomers did not change significantly after the FT-RCF reaction at 0-1 wt % concentration.

Figure 19:
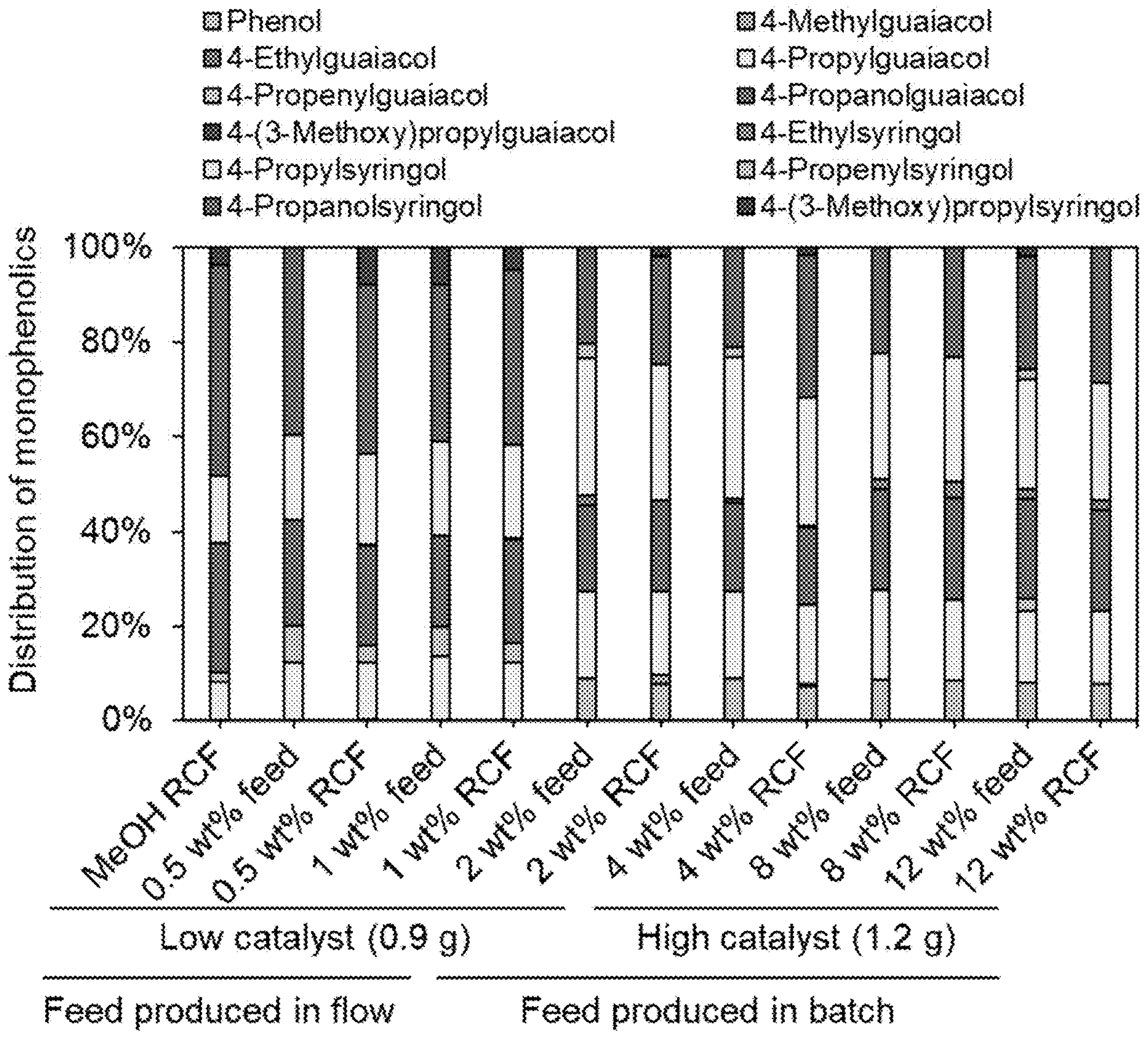
FIG. 19 provides the distribution of monophenolics for both flow and batch processes at different catalyst concentrations.
Figure 20A:
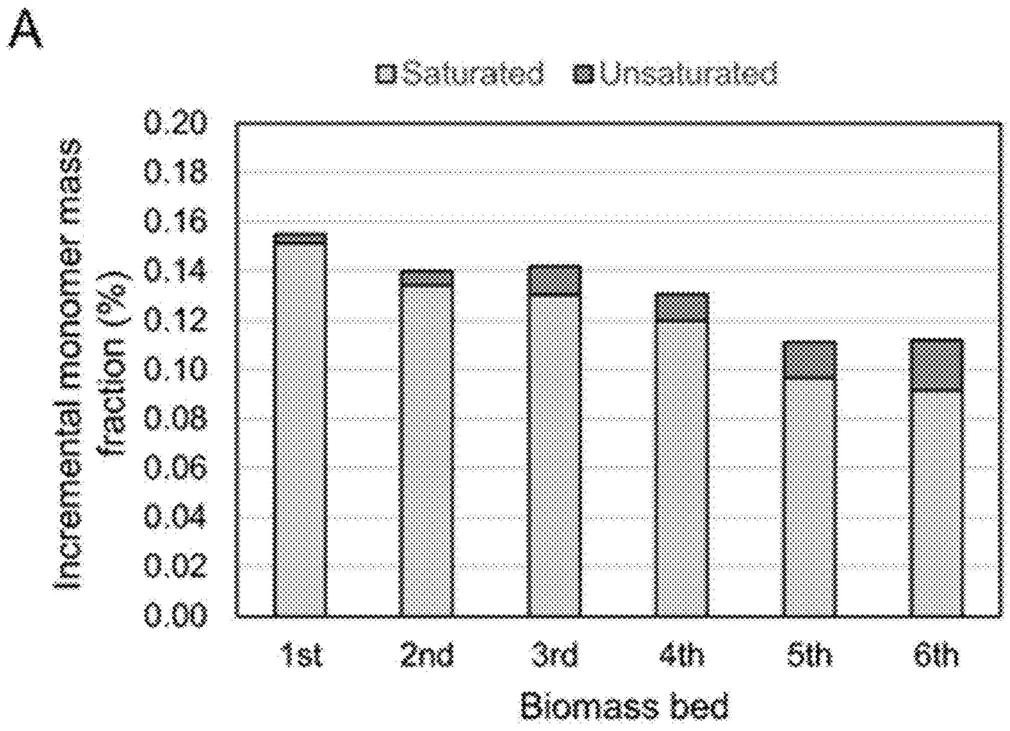
FIG. 20A Incremental monomer mass fraction of six consecutive FT-RCF reactions with methanol ($1^{st}$ FT-RCF in FIG. 11). After each reaction, the used biomass bed was replaced with a new bed, but one catalyst bed was used for all six reactions.
Figure 20B:
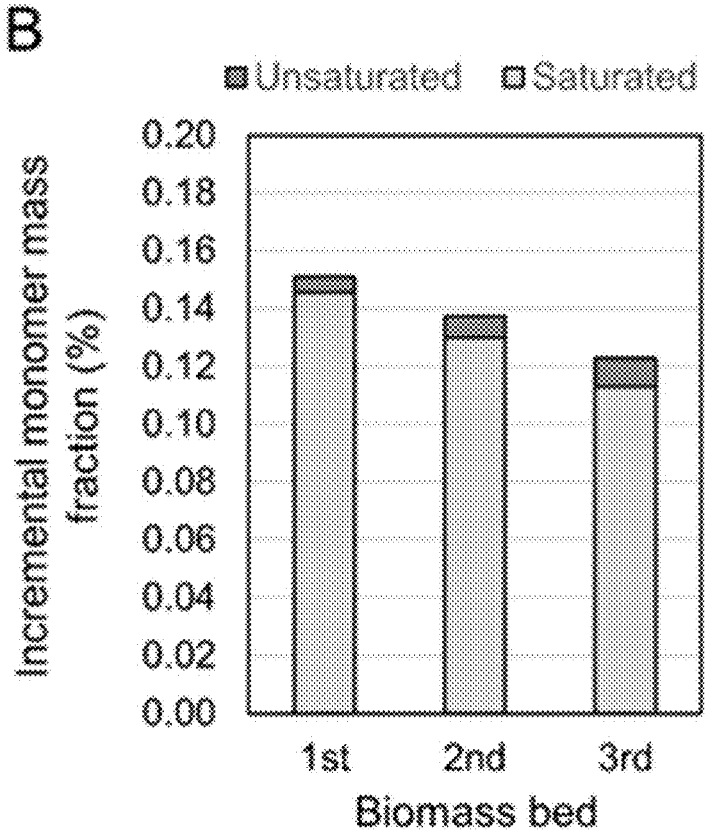
FIG. 20B Incremental monomer mass fraction of three consecutive FT-RCF reactions with 0.5 wt % Lig-MeOH ($2^{nd}$ FT-RCF in FIG. 11). After each reaction, the used biomass bed was replaced with a new bed, but one catalyst bed was used for all three reactions. Reaction conditions: 2 mL/min methanol, 5 g poplar, 0.9 g 15 wt % Ni/C (diluted with 2.1 g of fine fused silica), 1,600 psig, 200 sccm $H_2$ at 225° C. for 2 h (1 h heating ramp and 1 h run).

Compared to 0.5 and 1 wt % Lig-MeOH obtained via the FT-RCF setup, the feed solutions (2-12 wt %) from the batch reaction exhibited more propyl-substituted monomers and less propanol-substituted monomers (FIG. 19). In addition, phenol and ethyl-substituted monomers were also detected. At the higher feed concentrations (2-12 wt %), the distribution of monophenolic compounds remained similar after FT-RCF.

Figure 17B:
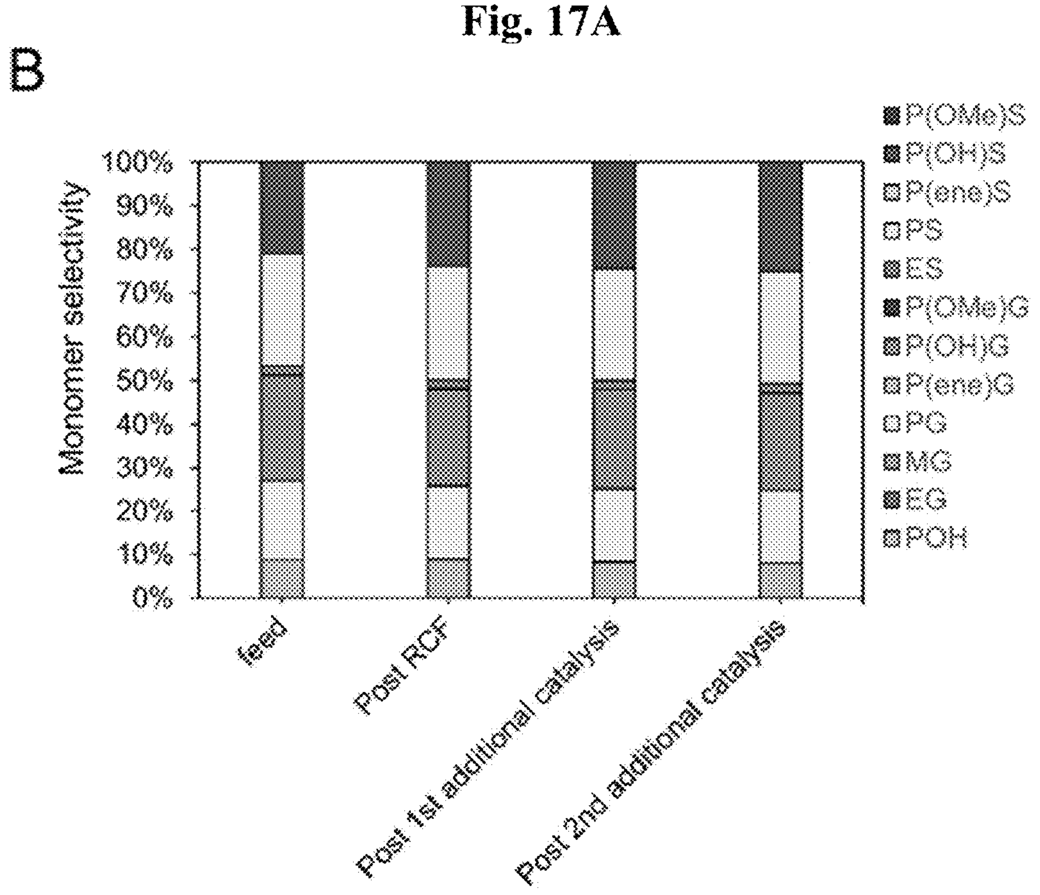
Figure 21A:
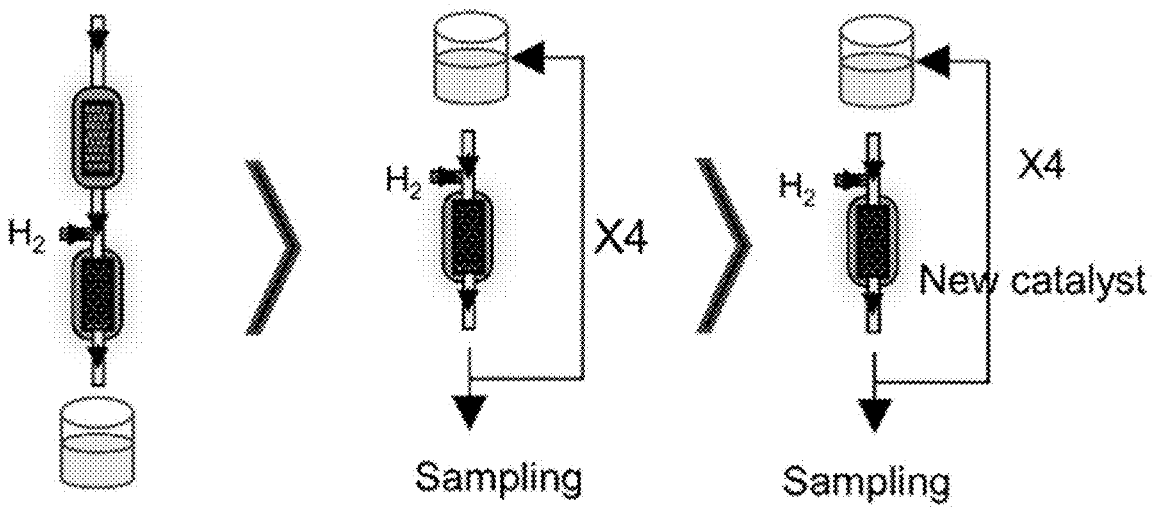
FIG. 21 shows additional details of the experiments described in Example 2, including the experimental scheme (FIG. 21A), distribution of monophenolics (FIG. 21B) and $^{1}H$ NMR spectra (FIG. 21C). Catalysis conditions: 2 mL/min feed, 1.2 g 15 wt % Ni/C, 1,600 psig, 200 sccm $H_2$ at 225° C.
Figure 21B:
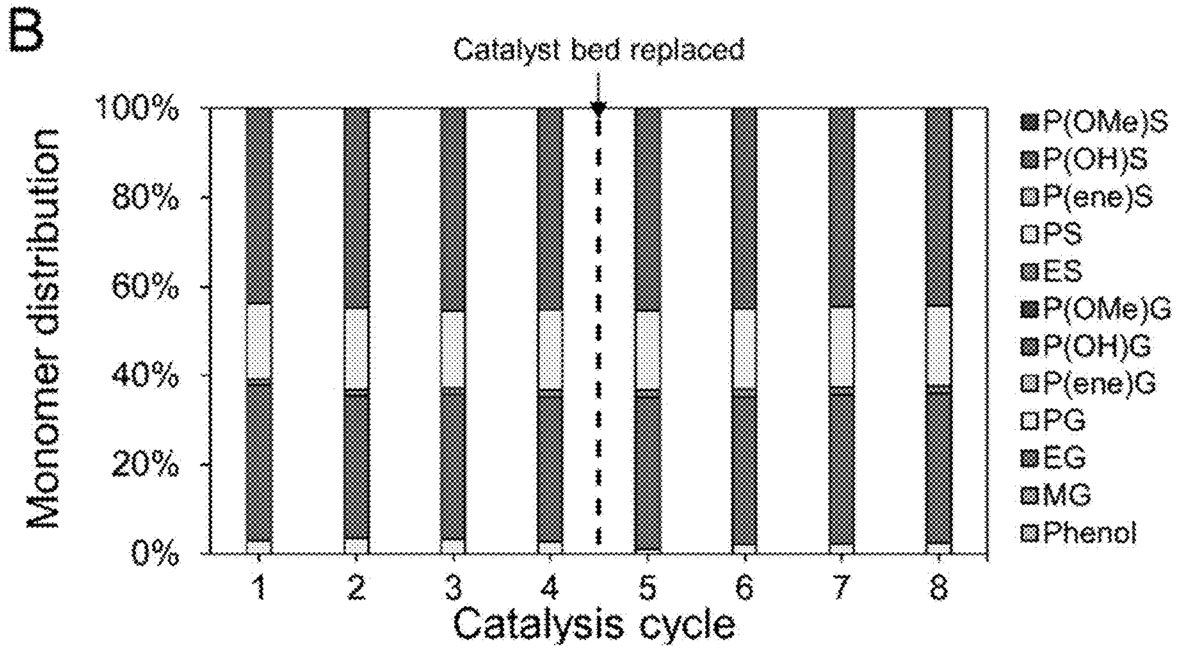
Figure 21C:
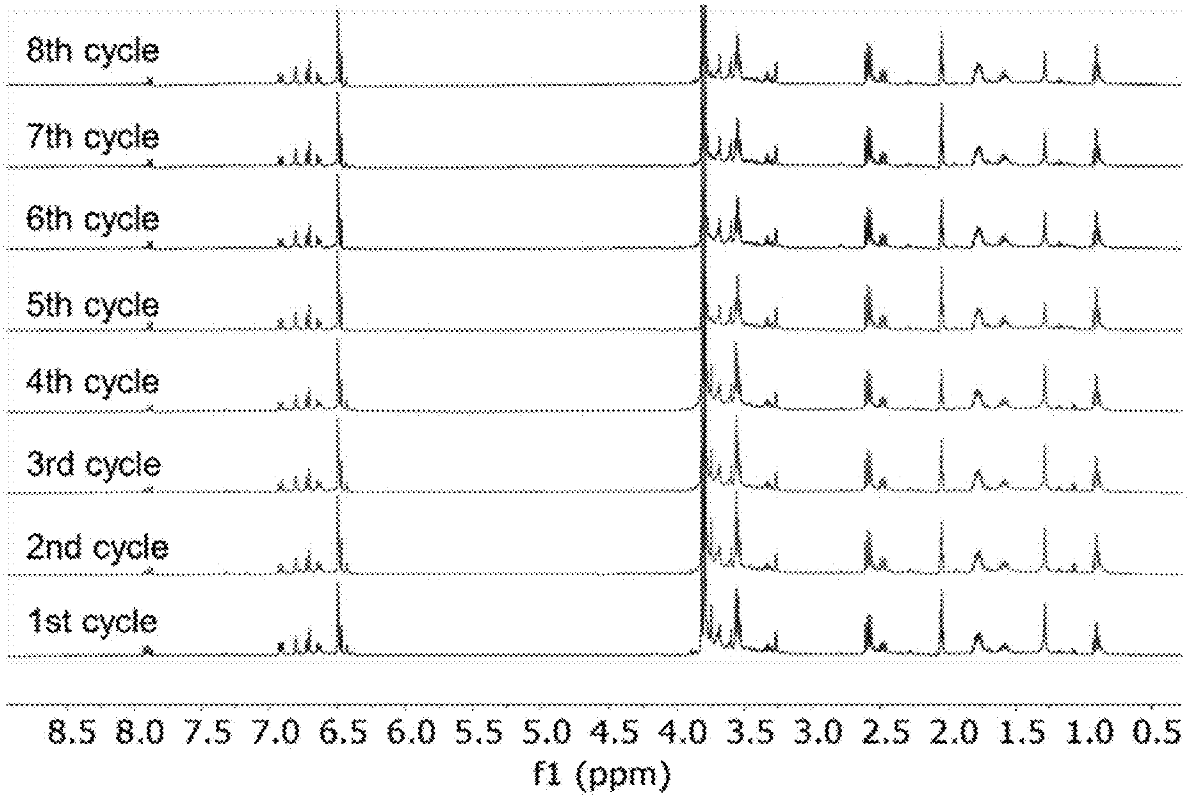

Stability of lignin monomers over multiple catalysis steps. In multi-pass FT-RCF, lignin monomers would be recycled, thus flowing over the catalyst beds multiple times. Therefore, changes in the monomer distribution over multiple catalysis steps are also worthwhile to investigate. We prepared and combined the $1^{st}$ pass FT-RCF samples and flowed the combined solution over catalyst beds eight times; specifically, after four catalysis steps, the spent catalyst was removed, and fresh catalyst was packed and used for an additional four catalysis steps (FIG. 21A). After each catalysis step, a sample was collected and the monomer distribution in each sample was analyzed. Even after eight additional catalysis steps, the distribution of monophenolics remained invariant (FIG. 21B). This indicates that the monomers stabilized during FT-RCF were not affected in the subsequent passes and remained stable over multi-pass FT-RCF. Consistently, the monomer distribution in the 8 wt % feed did not change when comparing compositions after the RCF reaction to those after two additional catalysis steps (FIG. 17B), suggesting the stability of lignin monomers in Lig-MeOH over multiple passes. The monomer stability seems dependent on the reaction conditions and catalysts. Previously, the prolonged reactions led to partial changes of propyl monomers to ethyl monomers.

Characterization of lignin oil. To characterize the lignin oil in the prepared Lig-MeOH feed solutions and post FT-RCF samples, we isolated lignin oil from each sample through solvent removal and liquid-liquid extraction and analyzed the samples with GPC and 2D heteronuclear single quantum coherence (HSQC) NMR spectroscopy. The GPC trace of the isolated lignin oil from the $1^{st}$ pass (MeOH RCF in FIG. 22) showed three narrow peaks and two broad peaks. Peaks at 200 and 250 Da represent monomers including propanol- and propyl-substituted syringol and guaiacol, which were also detected in the NMR spectra. Three oligomer peaks at 310, 470, and 700 were assigned to dimers, trimers, and tetramers, respectively.

Lignin oil in the 0.5 wt % feed showed not only monomers and low MW oligomers, but also high MW oligomer fragments up to 4,000 Da. The high MW values might arise because the catalyst was deactivated throughout the five consecutive $1^{st}$ pass FT-RCF runs.[28] This agrees with the higher β-O-4 peak intensity in the NMR spectrum of the isolated lignin oil from the 0.5 wt % feed relative to lignin oil from a single pass $1^{st}$ FT-RCF. After the $2^{nd}$ pass FT-RCF with the 0.5 wt % Lig-MeOH, fresh biomass, and fresh catalyst, the produced lignin oil exhibited reduced high MW oligomer fragments in the GPC chromatogram and a decreased β-O-4 peak intensity. These data suggest that, in the $2^{nd}$ pass, the fresh catalyst contributed to depolymerization of not only the extracted lignin from fresh biomass, but also the high MW oligomers in the 0.5 wt % feed. It is noteworthy that the β-O-4 peaks in the 0.5 and 1 wt % feed exhibited much lower intensities than monomer product peaks indicating a lower content of intact β-O-4 bonds in the feed solutions.

This also suggests that the monomer addition during the $2^{nd}$ and $3^{rd}$ pass FT-RCF resulted primarily from depolymerization of the lignin extracted from fresh biomass, and not from the cleavage of β-O-4 bonds in the lignin-enriched solvent.

Figure 22:
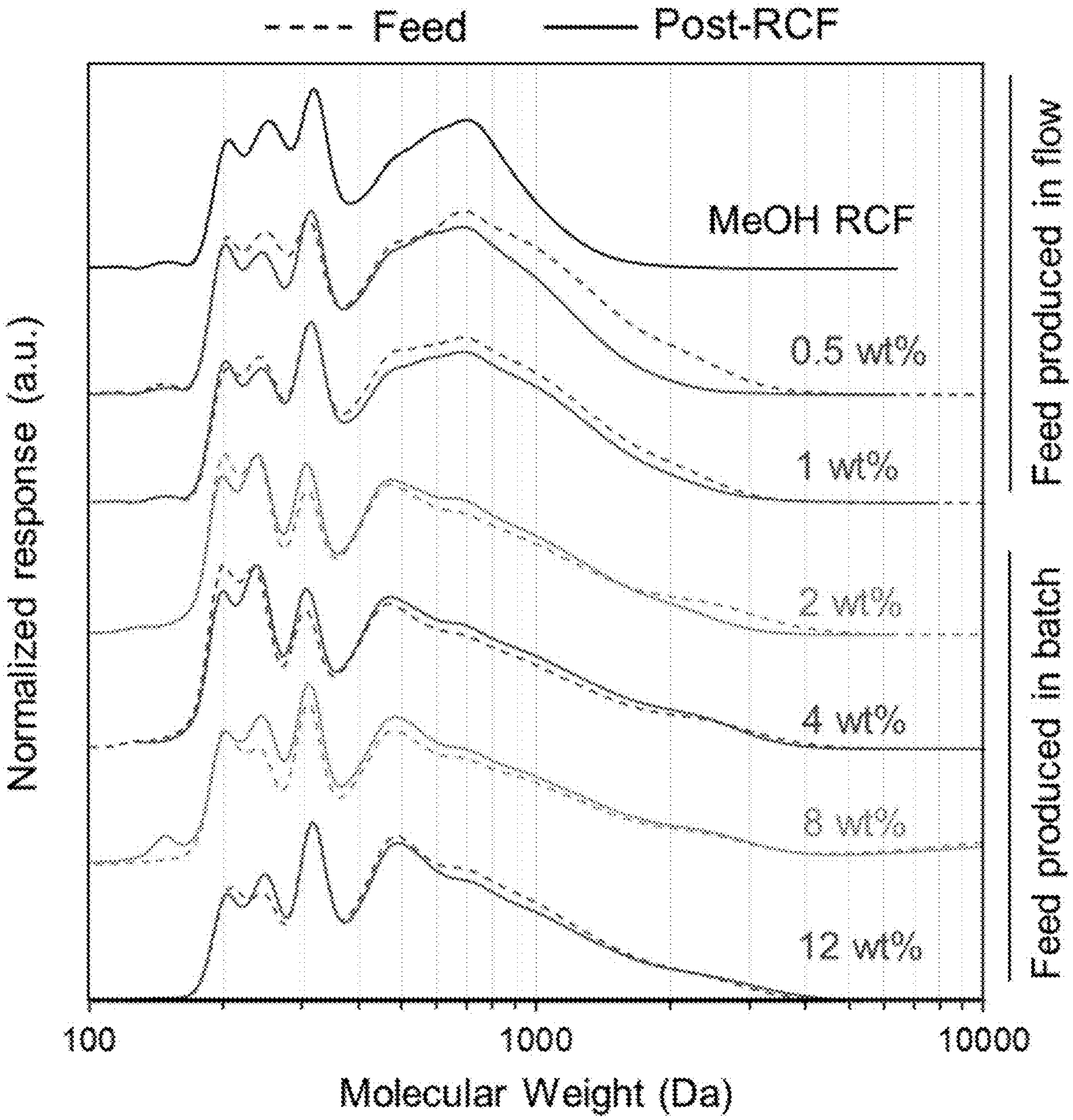
FIG. 22 illustrates the characterization of lignin oil using GPC for both batch and flow processes.

Compared to the 0.5 and 1 wt % feeds, the 2-12 wt % feed solutions, prepared in batch reactions, showed slightly different chromatograms: a larger trimer peak at 470 Da than the tetramer peak at 700 Da (FIG. 22). The similar overall GPC traces between the lignin oil in the feed and in the post-RCF sample suggests that the lignin oil in the feed is stable in the FT reactor and that similar quality lignin oil could be extracted from fresh biomass added to the feed during FT-RCF. This excludes the possibility that the accumulated components in the high concentration feeds promote the repolymerization of lignin oil. NMR spectra of lignin oil from each pass showed efficient removal of the aryl-ether linkage in poplar and production of monomers after FT-RCF or additional catalysis steps, suggesting that hydrogenolysis of the β-O-4 linkage of the extracted lignin was not affected by lignin oil concentration in feed solution under excess catalyst conditions.

Figure 23A:
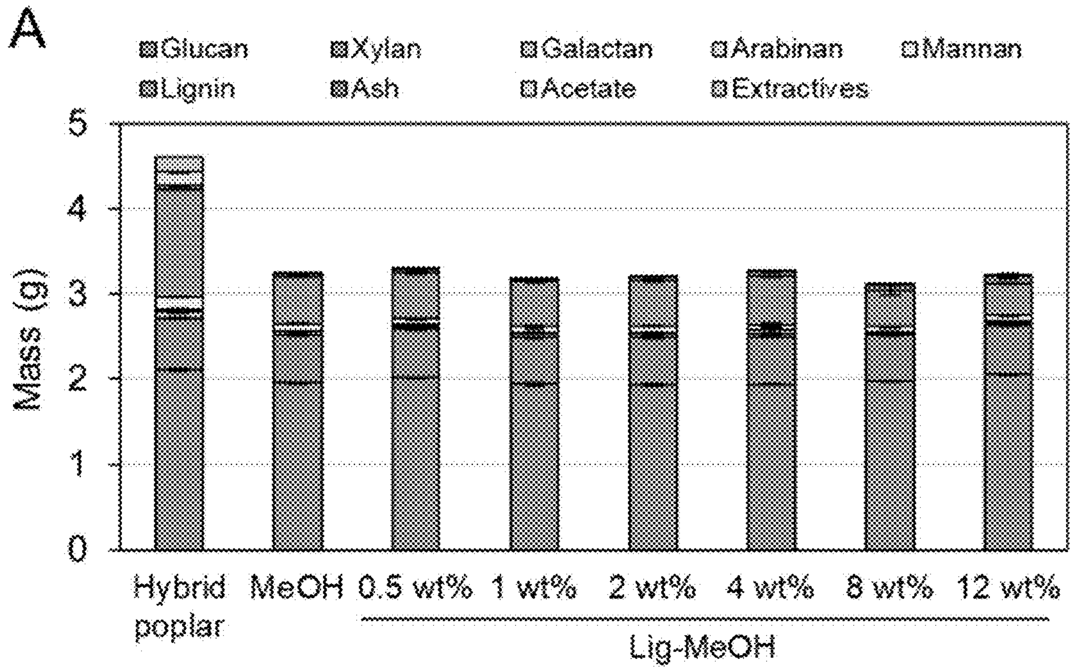
FIGS. 23A-23B show. compositional analysis of isolated residual pulp samples.
Figure 23B:
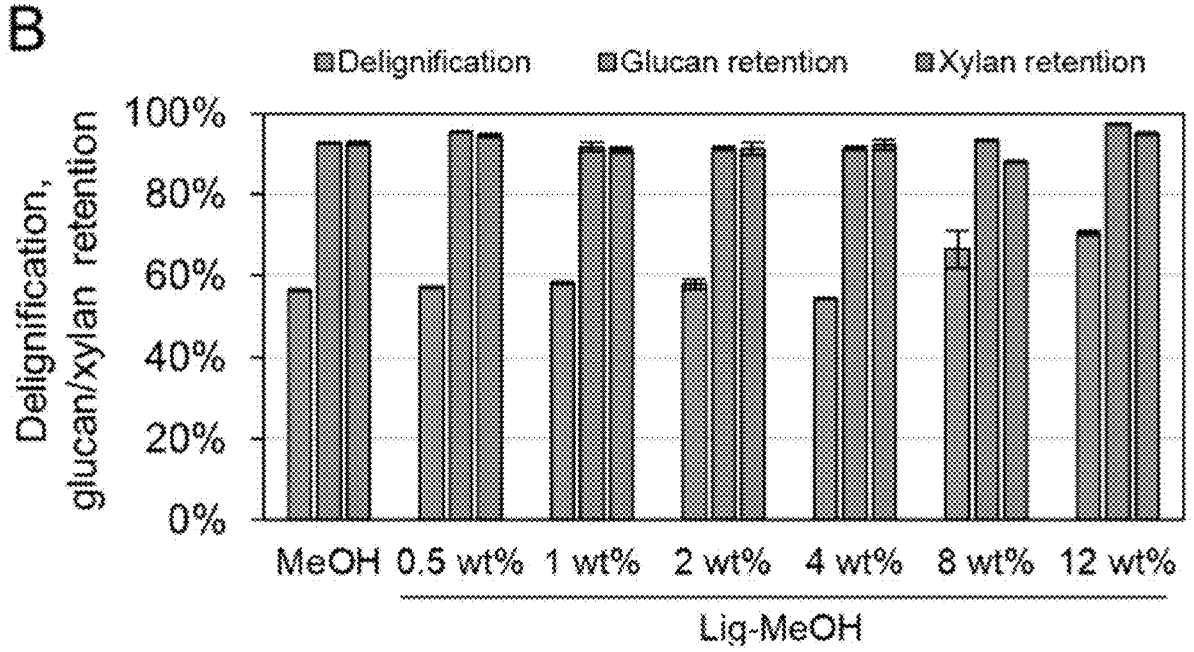

Characterization of carbohydrate pulp. Compositional analysis of the isolated residual pulp samples was also conducted to investigate the effect of the feed concentration on polysaccharide retention (FIGS. 23A-23B). Compared to native biomass (hybrid poplar), the composition of the pulp residue after FT-RCF with methanol clearly showed a high selectivity for lignin removal with high retention of carbohydrates. The calculated delignification and glucan and xylan retentions were 56.4±0.4%, 92.6±0.2%, and 92.6±0.4%, respectively. The small differences in the delignification values calculated based on the liquid sample and the solid residue likely arose because the liquid stream analysis did not include delignification by methanol remaining between the biomass bed and the sample collector. The use of 0.5-4 wt % Lig-MeOH solutions for FT-RCF instead of methanol resulted in similar delignification between 54.5±0.1% and 58.4±0.3%. With the 8 and 12 wt % feeds, FT-RCF reactions increased delignification values to 66.5±4.7% and 70.6±0.6%, respectively. This agrees with the higher delignification values from FT-RCF with the 8 and 12 wt % Lig-MeOH observed in the liquid stream analysis.

Glucan and xylan retentions were not significantly affected by the feed concentration of lignin. The glucan retention varied only from 91.4±0.5 to 97.5±0.3% and xylan retention remained between 88.1±0.1% and 95.0±0.2% (FIG. 23B). This solid stream analysis, combined with the liquid stream analysis, highlights the effectiveness of multi-pass FT-RCF.

Figure 24:
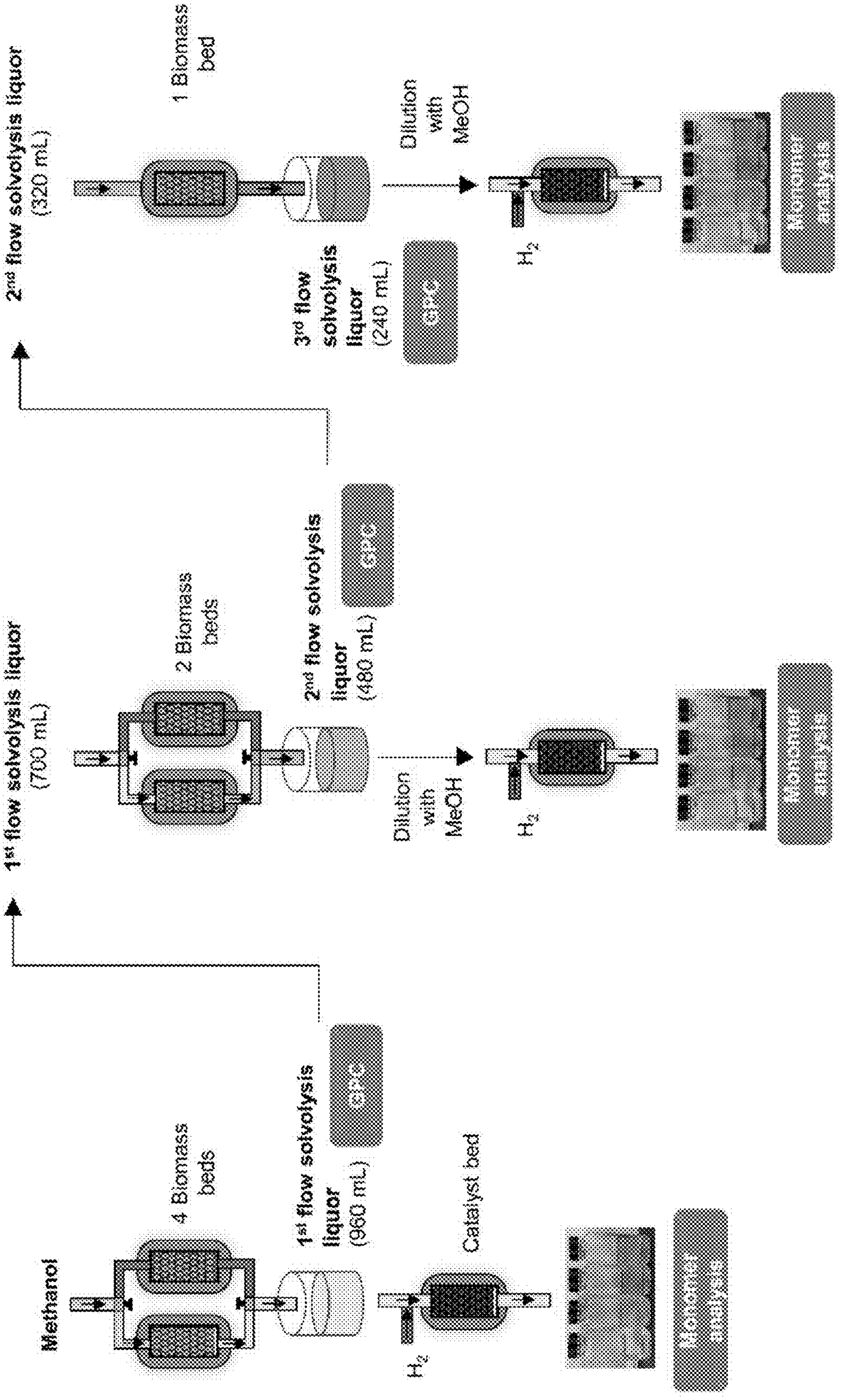
FIG. 24 provides an example of multi-pass solvolysis and the hydrogenolysis reaction with the prepared solvolysis liquors. Multi-pass solvolysis tests were performed in biomass beds. One of two biomass beds containing 5 g of poplar was filled with feed solution to a pressure of 1,600 psig, and the other biomass bed and the remainder of the reactor were pressurized to 1,600 psig of $N_2$. When the biomass bed filled with the feed solution was heated to 225° C., the feed solution was flowed into the biomass bed at 2 mL/min. The effluent was directed immediately to a separator to produce solvolysis liquor. A 1 h heating ramp and 1 h solvolysis run produced the $1^{st}$ solvolysis liquor. Four subsequent solvolysis runs produced ~960 mL of the $1^{st}$ solvolysis liquor. 700 mL of the solution was used as a solvent for two runs of the $2^{nd}$ solvolysis reaction, making 480 mL of the $2^{nd}$ solvolysis liquor. The $3^{rd}$ solvolysis liquor (~240 mL) was prepared by single solvolysis run with the prepared $2^{nd}$ solvolysis liquor. The lignin samples isolated by L-L extraction of the prepared $1^{st}$, $2^{nd}$, and $3^{rd}$ solvolysis liquors were characterized with GPC. The three solvolysis liquors underwent hydrogenolysis in a catalyst bed after the remainder of $2^{nd}$ and $3^{rd}$ solvolysis liquors was diluted to the same lignin concentration of the $1^{st}$ solvolysis liquor. 2 mL/min of the solvolysis liquor was fed to the preheated (225° C.) and pressurized (1,600 psig $H_2$) catalyst bed for 2 h with sampling every 30 min. The monomer concentration was analyzed with GC-FID.
Figure 25:
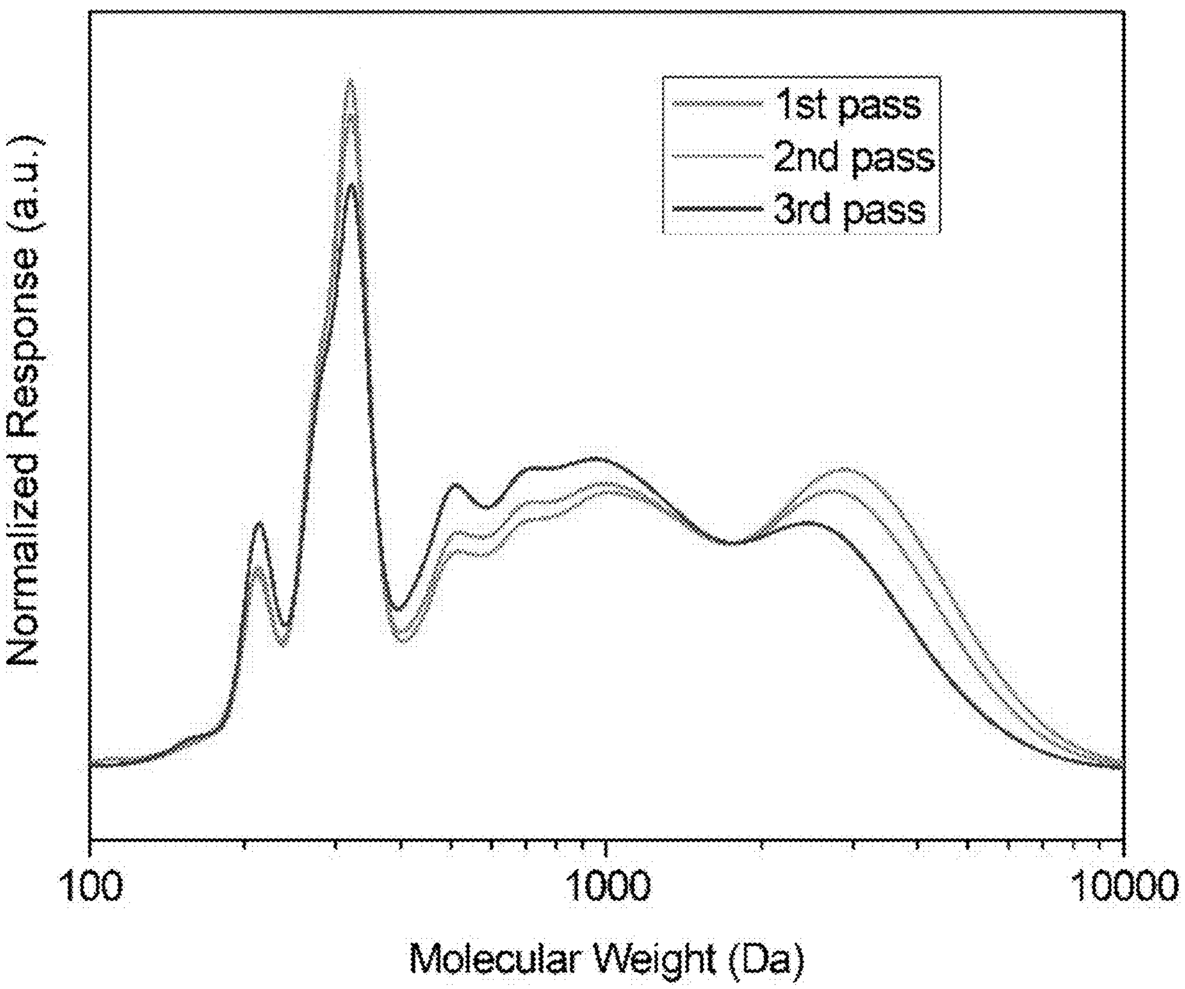
FIG. 25 provides GPC traces of the prepared $1^{st}$ 2nd and 3rd solvolysis liquors described in Example 2. All data are normalized by total area. FT-solvolysis reaction conditions: 2 mL/min methanol or solvolysis liquor, 5 g poplar, 1,600 psig $N_2$ at 225° C. for 2 h (1 h heating ramp and 1 h run). During the three solvolysis passes, the dimer fragment (310 Da) decreased and oligomer fragments between 400 and 1,100 Da increased due to repolymerization of the uncatalyzed solvolysis lignin. An increase in monomer peak at 200 Da and a decrease in high oligomer fragment (1,100-10,000 Da) indicate further depolymerization during additional solvolysis steps.
Figure 26:
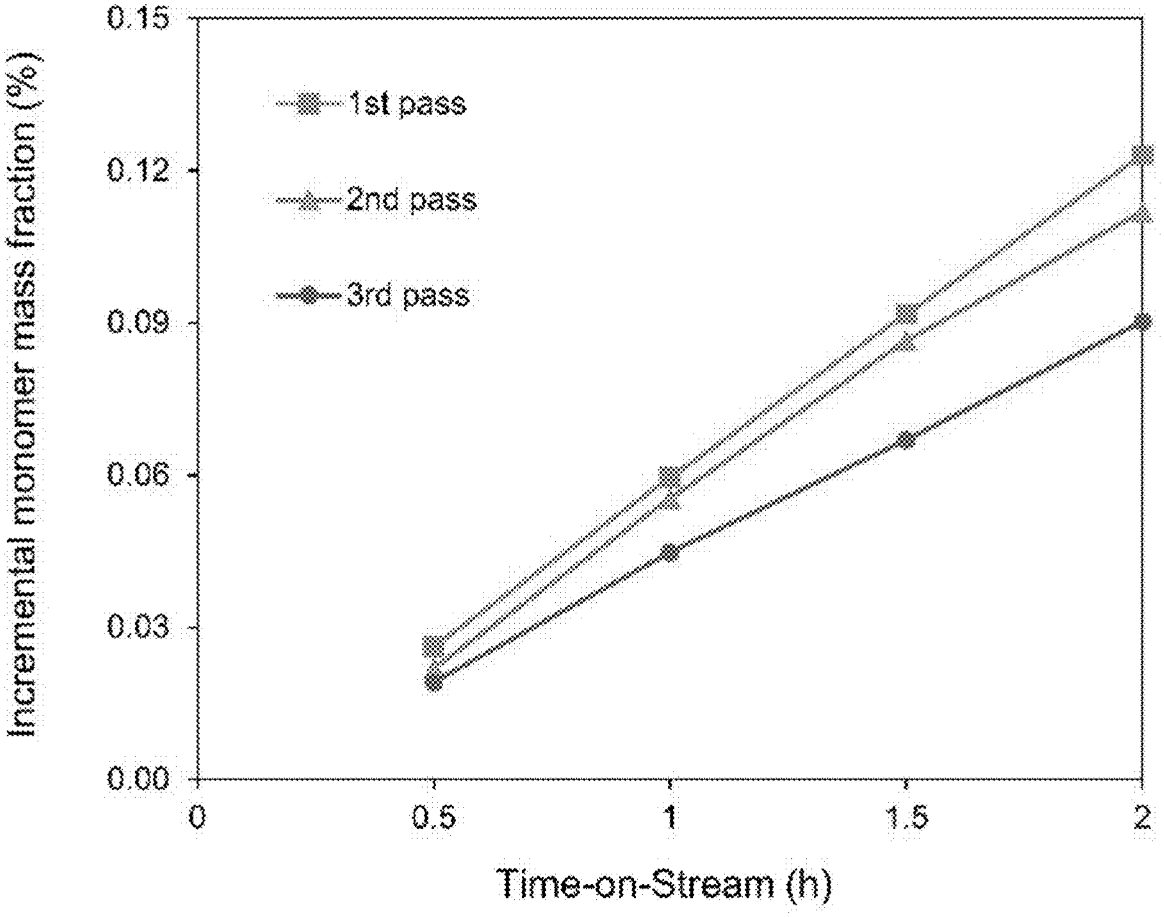
FIG. 26 shows incremental monomer mass fraction from FT hydrogenolysis reaction with the prepared $1^{st}$, $2^{nd}$, and $3^{rd}$ solvolysis liquors described in Example 2. FT hydrogenolysis reaction conditions: 2 mL/min the prepared and diluted solvolysis liquor, 1,600 psig $H_2$ at 225° C. for 2 h.

Multi-pass FT control experiments without stabilization. In addition to the multi-pass FT-RCF tests that reuse the Lig-MeOH solutions and undergo both solvolysis and catalysis, we conducted a control experiment to examine the multi-pass configuration in a solvolysis step only. Three consecutive solvolysis runs produced the $1^{st}$, $2^{nd}$, and $3^{rd}$ solvolysis liquors (FIG. 24). We previously reported that single-pass solvolysis produces native-like lignin with intact aryl-ether bonds. Here, due to the considerably longer residence times than our previous work, the native-like lignin from the $1^{st}$ solvolysis pass was repolymerized in the $2^{nd}$ and $3^{rd}$ solvolysis passes, evident from the increase in oligomer fragments (400-1,100 Da) and the decrease in the dimer peak (310 Da) in the GPC traces (FIG. 25). Uncatalyzed lignin was likely recondensed with additional solvolysis time at 225° C. during the $2^{nd}$ and $3^{rd}$ passes. The prepared solvolysis liquors underwent a FT hydrogenolysis reaction separately, and the recondensation that occurred during multi-pass solvolysis resulted in the decrease of incremental monomer mass fraction from 0.123% to 0.09% (FIG. 26). This control experiment indicates the importance of the catalytic stabilization in multi-pass FT-RCF to avoid repolymerization and reduced monomer yield.

Multi-pass FT-RCF at a higher delignification extent using methanol-water solvent mixtures. Methanol is a common solvent for RCF processes. The resulting delignification extents in the 50-70% range from FT-RCF with methanol or Lig-MeOH are close to the limit of methanol RCF that has been previously reported in batch and FT reactions (FIG. 9). To further examine the effect of recycling lignin oil, we were interested in studying the effect of higher levels of delignification. Thus, we additionally conducted FT-RCF with an equivalent 1:1 v/v methanol-water mixture (denoted as "MeOH/$H_2O$") and 2 and 8 wt % lignin oil-containing methanol-water solutions (denoted as "Lig-MeOH/$H_2O$"). Previously, RCF of poplar with an alcohol-water mixture has been reported to achieve delignification extents between 70-90% (FIG. 9).

Figure 27A:
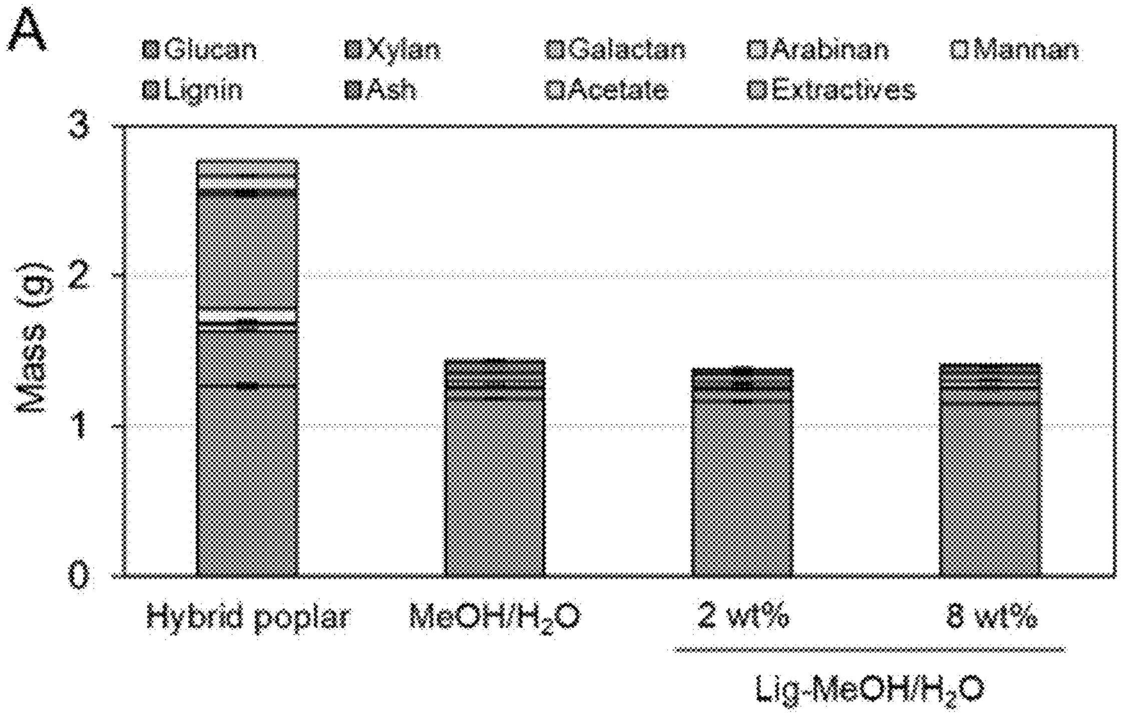
FIG. 27 shows mass (FIG. 27A), delignification (FIG. 27B) and monomer concentration (FIG. 27C) of multi-pass FT-RCF at a higher delignification extent using methanol and water solvent mixtures as described in Example 2.
Figure 27B:
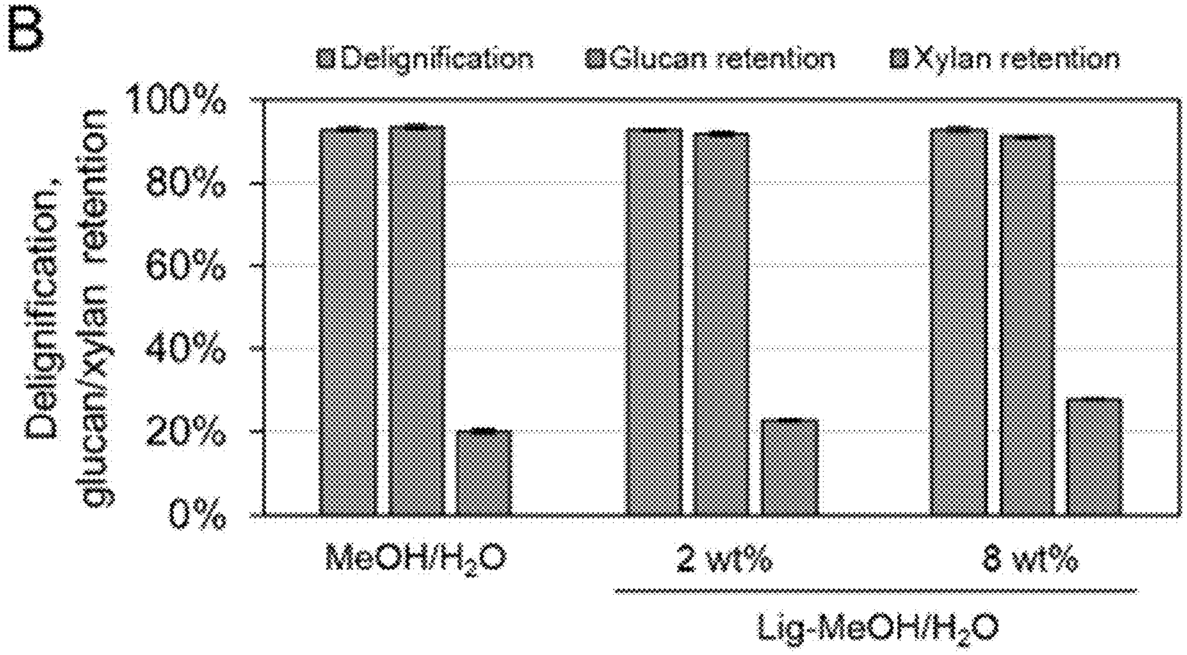
Figure 27C:
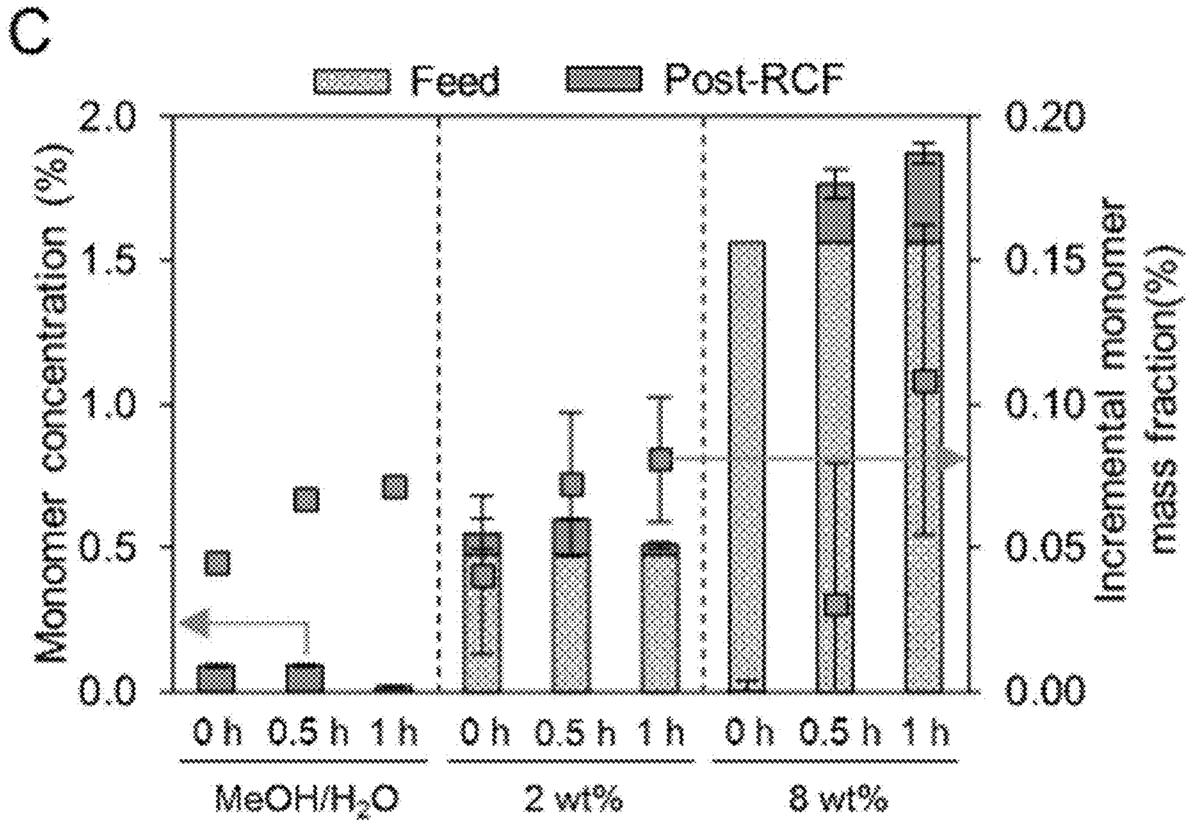

FT-RCF with MeOH/$H_2O$ extracted both lignin and hemicellulose with a delignification extent of 92.9±0.4% and a xylan retention of 20.0±0.5% (FIGS. 27A-27C). Conversely, glucan was not appreciably extracted from poplar, exhibiting 93.4±0.6% retention. The 2 and 8 wt % Lig-MeOH/$H_2O$ feeds were prepared by batch RCF of poplar with MeOH/$H_2O$. Thus, the feeds include not only lignin components, but also a more enriched hemicellulose content. After a 1 h heat ramp and a 1 h RCF reaction with the prepared 2 and 8 wt % solutions, similar extents of lignin extraction (92.6±0.1% and 92.6±0.6%, respectively) and glucan retention (91.9±0.6% and 90.9±0.2%, respectively) were achieved. This demonstrates that the recycled methanol-water mixture, with both enriched lignin and hemicellulose content in the feeds, could extract lignin and maintain glucan retention to a similar extent compared to MeOH/$H_2O$. Xylan extraction was slightly different in the 2 and 8 wt % feeds, exhibiting xylan retention of 22.7±0.2% and 27.9±0.2%, respectively.

Figure 28:
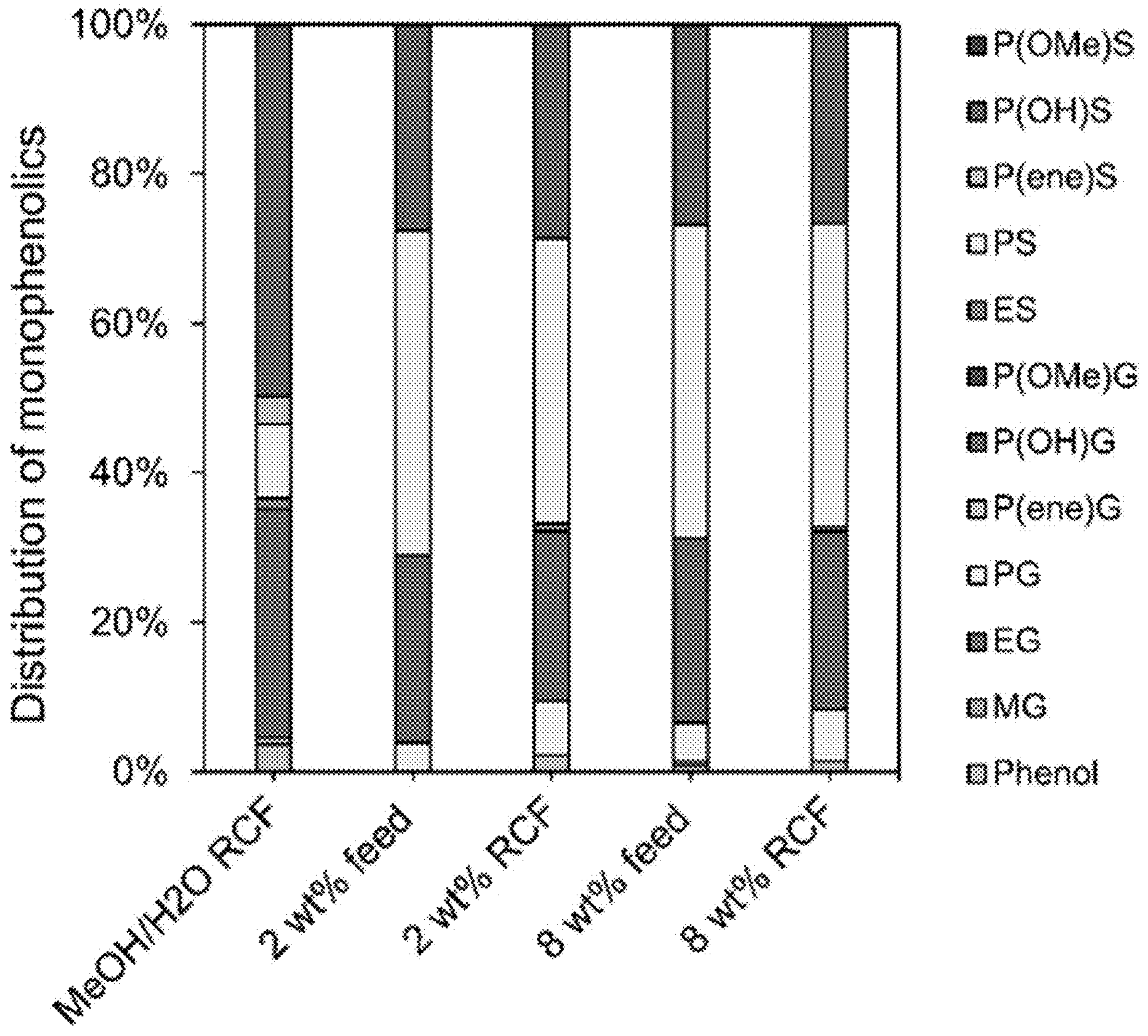
FIG. 28 shows FT-RCF reaction of poplar with various feed concentrations (MeOH/$H_2O$ and 2 and 8 wt % Lig-MeOH/$H_2O$). Distribution of monophenolics of feeds and post RCF samples. Reaction conditions: 2 mL/min feed solution, 3 g poplar, 1.2 g 5 wt % Ru/C (diluted with 2.8 g of fused silica), 1,600 psig, 200 sccm $H_2$, 225° C., and 1 h heating ramp and 1 h run.

Concerning the incremental monomer mass fraction (FIGS. 27C and 28), to minimize the effect of catalyst-limited conditions, we reduced the biomass-to-catalyst ratio from 5 g biomass/1.2 g catalyst to 3 g biomass/1.2 g catalyst. The incremental monomer mass fraction value obtained via FT-RCF with MeOH/$H_2O$ (0.071±0.001%), which corresponds to a 19% monomer yield, was maintained in the reaction with the 2 wt % feed (0.080±0.022%). A slightly higher incremental monomer mass fraction (0.108±0.054%) from the reaction with the 8 wt % feed might result from the cleavage of C—O bonds both in the lignin extracted from the biomass and in the lignin oil solubilized in the feed solution.

Discussion

As shown in this work, FT-RCF with 0.5-12 wt % Lig-MeOH feed solutions exhibited similar or higher lignin extraction and carbohydrate retention efficiency compared to FT-RCF with pure methanol. FT-RCF with the 12 wt % feed solution resulted in the solvent-to-biomass ratio of 1.9 L/kg (FIG. 9, Table 6), which is lower than the previously reported ratios in batch reactions (4-50 L/kg). In batch RCF reactions, further reducing the batch solvent loading would likely encounter severe mass transport limitations in lignin solvolysis due to the high solid fraction. In contrast, in multi-pass FT-RCF, the extracted lignin oil is solubilized, which avoids the use of high solid fractions and the resulting mass transfer issues. Because solvent usage linearly impacts energy demand and GHG emissions of RCF processes and the minimum selling price of RCF oil, the multi-pass FT-RCF with solvent usage down to 1.9 L/kg is economically and environmentally more beneficial than single-pass batch or FT-RCF.

The ultimate solvent-to-biomass ratio using the multi-pass concept could potentially be reduced further, but the 1.9 L/kg value reported shows the promise of this approach, and it was not practical to continue carrying out more consecutive runs with our current FT reactor systems. This initial study, however, motivates additional efforts for further solvent reduction using multi-pass RCF configurations. When recycling the solvent with concentrated RCF oil, it will be critical to understand the effect of the accumulated components therein, such as acetate, water, extractives, and sugar-derived compounds. Compositional analysis (FIG. 23A) revealed that acetate and extractives were extracted during FT-RCF and included in RCF oil. For example, a high concentration of acetic acid, hydrolyzed from hemicellulose side chains, could potentially promote the repolymerization of unstable lignin-derived intermediates.

In addition to FT-RCF, the multi-pass concept can be extended to other reactor configurations to enhance industrial relevance. Similar to multi-pass FT-RCF, a batch system with internal solvent recycles could also be considered. To this end, others have recently reported use of a high-pressure Soxhlet extractor, wherein biomass was physically separated from a solvent and the solvent is refluxed, extracting lignin from biomass and washing the delignified biomass. By adding a catalyst to the system, the extracted lignin could be depolymerized and stabilized. This system achieved 97% delignification in the presence of $CO_2$ with a solvent-to-biomass ratio of 6.6 L/kg. Additionally, traditional batch RCF processes, including via use of a catalyst basket, could directly use the multi-pass concept, recirculating the RCF oil and solvent multiple times to reduce solvent usage.

The most industrially favorable configuration may ultimately be a continuous RCF reactor configuration, wherein biomass and solvent are continuously fed into and removed from the reactor. As a multi-pass approach, the RCF effluent from a continuous process, after solid-liquid separation, could be re-injected to the reactor to delignify fresh biomass, thus reducing net solvent usage.

In summary, described herein is a multi-pass FT-RCF that can reuse RCF effluent without additional separation steps and extract lignin from biomass multiple times to a similar or higher extent (52-68%). The incremental monomer mass fraction remained around 0.15% through multi-pass FT-RCF with feeds up to 4 wt % when the catalyst loading was adjusted for total lignin content. With the catalyst loading suitable for ≤4 wt %, 8 and 12 wt % feed solutions reduced the incremental monomer mass fraction to 0.083-0.096%, resulting from operating in catalyst-limited conditions. Additional catalysis steps cleaved C—O linkages both in lignin extracted from biomass and in lignin oil solubilized in the feed, increasing the monomer mass fraction to 0.422%. The extracted lignin oil from each pass exhibited similar monomer selectivity, GPC traces, and NMR spectra. These results suggest the reusability of the lignin oil-containing solution without a detrimental effect on RCF performance including solvolysis, depolymerization, and stabilization under excess catalyst conditions. A reduction in overall solvent usage to 1.9 L/kg achieved by the multi-pass FT-RCF concept would reduce the energy demand and operating costs for solvent recovery and the net GHG emissions in the RCF process, suggestive of the industrial potential for multi-pass RCF concepts.

The described invention may be further understood by the following non-limiting examples:

Example 1. A method comprising:

treating biomass with a solvent, thereby extracting lignin and generating a solvolysis liquor;

reacting the solvolysis liquor in the presence of a catalyst, thereby generating at least one lignin monomer.

Example 2. The method of example 1 further comprising retreating the biomass with the solvolysis liquor to increase the concentration of lignin in the solvolysis liquor.

Example 3. The method of example 1 or 2, wherein the step of treating biomass occurs in a plurality of solvolysis chambers, and wherein each of the solvolysis chambers comprises a biomass bed.

Example 4. The method of example 3, wherein the plurality of solvolysis chambers are arranged in parallel.

Example 5. The method of any of examples 1-4, wherein the step of treating biomass in performed in the presence of a screw extruder.

Example 6. The method of example 3 or 4, wherein each of the plurality of solvolysis chambers comprises a screw extruder.

Example 7. The method of any of examples 1-6 further comprising a step of storing the solvolysis liquor prior to reacting the solvolysis liquor in the presence of a catalysis.

Example 8. The method of example 7, wherein the step of storing the solvolysis liquor comprises storing the solvolysis liquor for a time period greater than or equal to 1 day.

Example 9. The method of example 7 or 8, wherein the step of storing the solvolysis liquor further comprises analyzing the solvolysis liquor.

Example 10. The method of any of examples 1-9, wherein the solvent comprises an alcohol.

Example 11. The method of any of examples 1-10, wherein the solvent is methanol.

Example 12. The method of any of examples 1-11, wherein the catalyst comprises Ni/C.

Example 13. The method of any of examples 1-12, wherein the step of treating the biomass comprises providing a solvent at a ratio less than or equal to 4:1 wt % solvent to biomass.

Example 14. The method of any of examples 1-13, wherein the method yields greater than or equal to 15 wt % lignin monomers with respect to lignin weight.

Example 15. A solvolysis device comprising:

a solvent inlet;

a plurality of solvolysis chambers in fluid communication with the solvent inlet;

a solvolysis liquor outlet in fluid communication with the solvolysis chamber; and a recycle stream in fluid communication with the solvolysis liquor outlet and the solvent inlet for recycling a solvolysis liquor through the plurality of solvolysis chambers.

Example 16. The solvolysis device of example 15, wherein the plurality of solvolysis chambers are arranged in parallel.

Example 17. The solvolysis device of example 15 or 16, wherein each of the plurality of solvolysis chambers comprise a biomass bed.

Example 18. The solvolysis device of example 17, wherein the biomass bed comprises lignin.

Example 19. The solvolysis device of any of examples 15-18 further comprising at least on catalytic reaction chamber in fluid communication with the solvolysis liquor outlet.

Example 20. The solvolysis device of example 19, wherein the catalytic reaction chamber comprises at catalyst bed; and the catalyst bed comprises a Ni/C catalyst.

Example 21. The solvolysis device of any of examples 15-20 further comprising an alcohol solvent.

Example 22. The solvolysis device of example 21, wherein the alcohol solvent comprises methanol.

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

As used herein and in the appended claims, the singular forms “a”, “an”, and “the” include plural reference unless the context clearly dictates otherwise. Thus, for example, reference to “a cell” includes a plurality of such cells and equivalents thereof known to those skilled in the art. As well, the terms “a” (or “an”), “one or more” and “at least one” can be used interchangeably herein. It is also to be noted that the terms “comprising”, “including”, and “having” can be used interchangeably. The expression “of any of claims XX-YY” (wherein XX and YY refer to claim numbers) is intended to provide a multiple dependent claim in the alternative form, and in some embodiments is interchangeable with the expression “as in any one of claims XX-YY.”

When a group of substituents is disclosed herein, it is understood that all individual members of that group and all subgroups, are disclosed separately. When a Markush group or other grouping is used herein, all individual members of the group and all combinations and subcombinations possible of the group are intended to be individually included in the disclosure. For example, when a device is set forth disclosing a range of materials, device components, and/or device configurations, the description is intended to include specific reference of each combination and/or variation corresponding to the disclosed range.

Every formulation or combination of components described or exemplified herein can be used to practice the invention, unless otherwise stated.

Whenever a range is given in the specification, for example, a density range, a number range, a temperature range, a time range, or a composition or concentration range, all intermediate ranges and subranges, as well as all individual values included in the ranges given are intended to be included in the disclosure. It will be understood that any subranges or individual values in a range or subrange that are included in the description herein can be excluded from the claims herein.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when composition of matter is claimed, it should be understood that compounds known and available in the art prior to Applicant's invention, including compounds for which an enabling disclosure is provided in the references cited herein, are not intended to be included in the composition of matter claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

What is claimed is:

1. A method comprising:

treating biomass with a solvent in at least one solvolysis chamber, thereby extracting lignin and generating a solvolysis liquor;

reacting the solvolysis liquor in the presence of a catalyst, thereby generating at least one lignin monomer;

flowing the solvolysis liquor from the solvolysis chamber and recycling the solvolysis liquor back to the solvolysis chamber, thereby increasing the concentration of lignin in the solvolysis liquor.

2. The method of claim 1, wherein the step of treating biomass occurs in a plurality of solvolysis chambers, and wherein each of the solvolysis chambers comprises a biomass bed.

3. The method of claim 2, wherein the plurality of solvolysis chambers are arranged in parallel.

4. The method of claim 2, wherein each of the plurality of solvolysis chambers comprises a screw extruder.

5. The method of claim 1, wherein the step of treating biomass is performed in the presence of a screw extruder.

6. The method of claim 1 further comprising a step of storing the solvolysis liquor prior to reacting the solvolysis liquor in the presence of a catalyst.

7. The method of claim 6, wherein the step of storing the solvolysis liquor comprises storing the solvolysis liquor for a time period greater than or equal to 1 day.

8. The method of claim 6, wherein the step of storing the solvolysis liquor further comprises analyzing the solvolysis liquor.

9. The method of claim 1, wherein the solvent comprises an alcohol.

10. The method of claim 1, wherein the solvent is methanol.

11. The method of claim 1, wherein the catalyst comprises Ni/C.

12. The method of claim 1, wherein the step of treating the biomass comprises providing a solvent at a ratio less than or equal to 4:1 wt % solvent to biomass.

13. The method of claim 1, wherein the method yields greater than or equal to 15 wt % lignin monomers with respect to lignin weight.

* * * * *